US012615328B2

(12) United States Patent
Huang

(10) Patent No.: US 12,615,328 B2
(45) Date of Patent: Apr. 28, 2026

(54) NOTIFICATION MESSAGE DISPLAY METHOD AND ELECTRONIC DEVICE

(71) Applicant: Honor Device Co., Ltd., Shenzhen (CN)

(72) Inventor: Shijun Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 302 days.

(21) Appl. No.: 18/282,626

(22) PCT Filed: Apr. 27, 2022

(86) PCT No.: PCT/CN2022/089616
§ 371 (c)(1),
(2) Date: Sep. 18, 2023

(87) PCT Pub. No.: WO2023/015960
PCT Pub. Date: Feb. 16, 2023

(65) Prior Publication Data
US 2024/0163360 A1    May 16, 2024

(30) Foreign Application Priority Data

Aug. 12, 2021    (CN) .......................... 202110927031.1

(51) Int. Cl.
*H04M 1/72403*        (2021.01)
*G06F 3/0482*        (2013.01)

(52) U.S. Cl.
CPC ...... *H04M 1/72403* (2021.01); *G06F 3/0482* (2013.01)

(58) Field of Classification Search
CPC .............. H04M 1/72403; G06F 3/0482; G06F 3/04842; G06F 3/04883; G06F 9/451; G06F 2203/04808; G06F 9/542
See application file for complete search history.

(56) References Cited

U.S. PATENT DOCUMENTS

2002/0140746 A1    10/2002  Gargi
2012/0081318 A1    4/2012  Sirpal et al.
(Continued)

FOREIGN PATENT DOCUMENTS

AU        2020239726 B1    8/2021
CN        110162239 A    8/2019
(Continued)

OTHER PUBLICATIONS

Milan Vyšata, "Notification Widget," Retrieved from the Internet, URL: http://www.youtube.com/watch?v=Z7k7R3jT1Fk (Dec. 17, 2020).

*Primary Examiner* — Cao H Nguyen
(74) *Attorney, Agent, or Firm* — Leydig, Voit & Mayer, Ltd.

(57)        ABSTRACT

This application provides a notification message display method and an electronic device. The electronic device includes a home screen application, a first application, and a second application. The home screen application includes a home screen widget. The method includes: the home screen widget receives an operation performed by a user on the control configured to create a card stack; the home screen widget sends indication information to the first application, where the indication information is used to indicate the first application to provide display information; the home screen application receives the display information sent by the first application; the home screen application generates a first card corresponding to the display information; the home screen application creates a sequence list based on the first card; the home screen application creates a card stack corresponding to the sequence list; and the home screen application displays the first card.

20 Claims, 33 Drawing Sheets

(56)　　　　　References Cited

U.S. PATENT DOCUMENTS

| | | |
|---|---|---|
| 2014/0059496 A1 | 2/2014 | White et al. |
| 2014/0189595 A1 | 7/2014 | Waldman et al. |
| 2022/0224665 A1* | 7/2022 | Zhou ..................... G06F 3/0482 |
| 2022/0244819 A1* | 8/2022 | Wang .................... G06F 3/0483 |
| 2023/0077467 A1* | 3/2023 | Xu ........................ G06F 3/0481 |
| | | 715/835 |
| 2024/0211117 A1 | 6/2024 | Tyler et al. |

FOREIGN PATENT DOCUMENTS

| | | |
|---|---|---|
| CN | 110351422 A | 10/2019 |
| CN | 110673913 A | 1/2020 |
| CN | 110750317 A | 2/2020 |
| CN | 110837327 A | 2/2020 |
| CN | 111182145 A | 5/2020 |
| CN | 111580906 A | 8/2020 |
| CN | 111857508 A | 10/2020 |
| CN | 1111966251 A | 11/2020 |
| CN | 1 12286416 A | 1/2021 |
| CN | 112825048 A | 5/2021 |
| CN | 113722027 A | 11/2021 |
| CN | 113805765 A | 12/2021 |
| CN | 113824842 A | 12/2021 |
| WO | 2021017837 A1 | 2/2021 |

* cited by examiner

CONT.
FROM

TO

102

CONT.
FROM

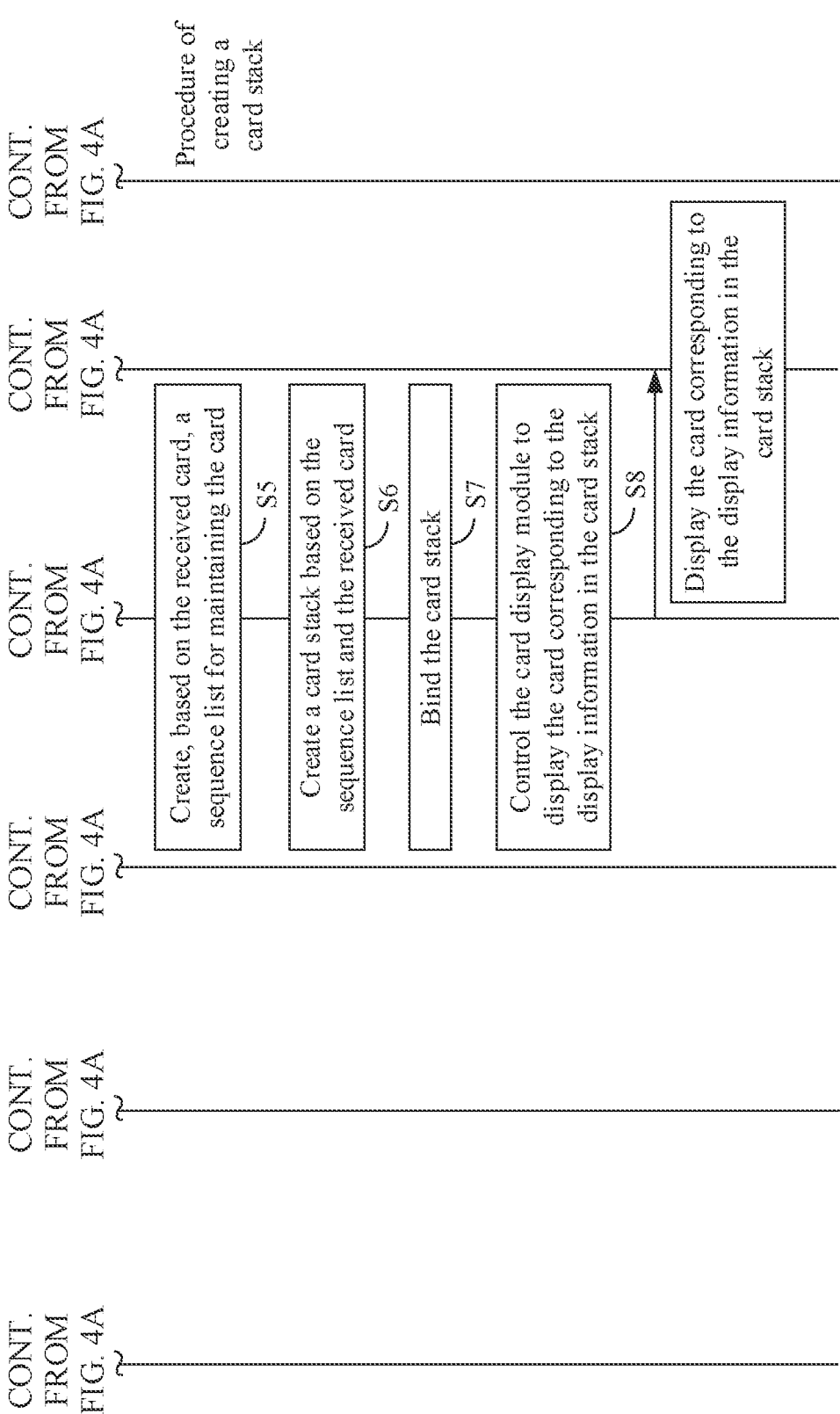

FIG. 4B

CONT. FROM FIG. 4A

Procedure of creating a card stack

Create, based on the received card, a sequence list for maintaining the card

S5

Create a card stack based on the sequence list and the received card

S6

Bind the card stack

S7

Control the card display module to display the card corresponding to the display information in the card stack

S8

Display the card corresponding to the display information in the card stack

CONT.
FROM

502

TO a b

A o ──────────────────── x y

B

Stacked manner 1        Stacked manner 2

A        B

Stacked manner 3

C

CONT.
FROM

TO

CONT.
FROM

1201

CONT.
FROM

1202

NOTIFICATION MESSAGE DISPLAY METHOD AND ELECTRONIC DEVICE

CROSS-REFERENCE TO RELATED APPLICATIONS

This application is a national stage of International Application No. PCT/CN2022/089616, filed on Apr. 27, 2022, which claims priority to Chinese Patent Application No. 202110927031.1, filed on Aug. 12, 2021. The disclosures of both of the aforementioned applications are hereby incorporated by reference in their entireties.

TECHNICAL FIELD

This application relates to the field of electronic device technologies, and in particular, to a notification message display method and an electronic device.

BACKGROUND

Currently, after receiving a notification message, for example, an SMS message or travel information, a mobile phone may display the notification message to a user in a notification bar. The user may open the notification bar when the mobile phone is unlocked, to view the notification message.

SUMMARY

This application provides a notification message display method and an electronic device.

According to a first aspect, this application provides a notification message display method, applied to an electronic device. The electronic device includes a home screen application, a first application, and a second application. The home screen application includes a home screen widget, and the home screen widget includes a control configured to create a card stack. The method includes: The home screen widget receives an operation performed by a user on the control configured to create a card stack; the home screen widget sends indication information to the first application, where the indication information is used to indicate the first application to provide display information; the home screen application receives the display information sent by the first application; the home screen application generates a first card corresponding to the display information; the home screen application creates a sequence list based on the first card, where the sequence list includes the first card and information used to indicate a display ranking of the first card; the home screen application creates a card stack corresponding to the sequence list; the home screen application displays the first card; the home screen application receives a notification message from the second application; the home screen application in the electronic device generates a second card of the notification message; the home screen application in the electronic device updates the sequence list based on the generated second card, where an updated sequence list further includes at least one second card and information used to indicate a display sequence of the at least one second card; and the home screen application displays a card stack on a home screen of the electronic device, where the card stack includes the first card and the at least one second card that are sequentially stacked based on the sequence list.

In the foregoing example, in the notification message display method provided in this application, when the home screen widget receives the operation performed by the user on the control configured to create a card stack, the home screen widget sends the indication information to the first application, so that the first application provides the display information according to the indication information. In this way, after receiving the display information, the home screen application may generate the first card corresponding to the display information based on the display information; the home screen application creates the sequence list based on the first card; the home screen application creates the card stack corresponding to the sequence list; and the home screen application displays the first card. Then, the home screen application receives the notification message from the second application; the home screen application in the electronic device generates the second card of the notification message; the home screen application in the electronic device updates the sequence list based on the generated second card; and the home screen application displays the card stack on the home screen of the electronic device, where the card stack includes the first card and the at least one second card that are sequentially stacked based on the sequence list. In this way, when the home screen application receives a new notification message, the user does not need to view the notification message in a system notification bar after unlocking the mobile phone, but instead may directly view a card corresponding to the notification message on the home screen of the electronic device. This improves man-machine interaction efficiency.

For example, the electronic device is a mobile phone, the first application is a weather application, and the second application is a calendar application. When the home screen widget receives the operation performed by the user on the control configured to create a card stack, the home screen widget sends indication information to the weather application, so that the weather application provides display information according to the indication information. In this way, after receiving the display information, the home screen application may generate a first card corresponding to the display information based on the display information; the home screen application creates a sequence list based on the first card; the home screen application creates a card stack corresponding to the sequence list; and the home screen application displays the first card. Then, the home screen application receives a notification message from the calendar application; the home screen application in the electronic device generates a second card of the notification message; the home screen application in the electronic device updates the sequence list based on the generated second card; and the home screen application displays a card stack on the home screen of the electronic device, where the card stack includes the first card and at least one second card that are sequentially stacked based on the sequence list. It may be learned that when the home screen application receives the notification message sent by the calendar application, the user does not need to view the notification message in the system notification bar after unlocking the mobile phone, but instead may directly view a card corresponding to the notification message on the home screen of the electronic device. This improves man-machine interaction efficiency.

With reference to the first aspect, in a possible implementation, the sequence list further includes a card identifier used to indicate the first card or the second card, and the notification message display method provided in this application further includes: when the home screen application generates the first card again, and the sequence list does not include the card identifier of the first card, adding the first card, the card identifier corresponding to the first card, and the information used to indicate the display ranking of the first card to the sequence list; or when the home screen application generates the first card again, and the sequence list includes the card identifier of the first card, and when the sequence list includes the card identifier of the first card, replacing an existing card corresponding to the card identifier with the first card.

In the foregoing example, in the notification message display method provided in this application, one card identifier is allocated to each card, so that it can be determined, based on the card identifier, whether the card identifier exists in the sequence list. If the card identifier exists in the sequence list, the existing card corresponding to the card identifier is replaced with the first card. If the card identifier does not exist in the sequence list, the first card, the card identifier corresponding to the first card, and the information used to indicate the display ranking of the first card are added to the sequence list. In this way, the sequence list can be better managed.

With reference to the first aspect, in a possible implementation, the notification message display method provided in this application further includes: The home screen application receives information that is from the first application and that is used to indicate to delete a target card; and the home screen application deletes the target card and information used to indicate a display ranking of the target card from the sequence list based on the information used to indicate to delete the target card; and that the home screen application displays a card stack on a home screen of the electronic device, where the card stack includes the first card and the at least one second card that are sequentially stacked based on the sequence list includes: The home screen application displays a card stack on the home screen of the electronic device, where the card stack includes the first card and the at least one second card that are sequentially stacked based on a sequence list obtained after the target card is deleted.

In the foregoing example, in the notification message display method provided in this application, a card has a display period. Therefore, a card whose display period ends needs to be deleted, so that the user can view a card whose display period does not end.

With reference to the first aspect, in a possible implementation, the notification message display method provided in this application further includes: The home screen application receives an operation used to indicate to delete a target card; the home screen application deletes the target card in response to the operation, and continues to display each card in the sequence list based on the sequence list; and the home screen application deletes the target card and information used to indicate a display ranking of the target card from the sequence list; and that the home screen application displays a card stack on a home screen of the electronic device, where the card stack includes the first card and the at least one second card that are sequentially stacked based on the sequence list includes: The home screen application displays a card stack on the home screen of the electronic device, where the card stack includes the first card and the at least one second card that are sequentially stacked based on a sequence list obtained after the target card is deleted.

In the foregoing example, in the notification message display method provided in this application, the user may delete an unnecessary card. In this way, man-machine interaction efficiency can be improved.

With reference to the first aspect, in a possible implementation, in the notification message display method provided in this application, the first application is a weather application, and the second application is a calendar application.

According to a second aspect, this application provides a notification message display method, applied to an electronic device. The electronic device includes a home screen application and a first application. The home screen application includes a view preprocessing module, a data management module, and a card display module. The method includes: The view preprocessing module receives a notification message sent by the first application; the view preprocessing module generates a first card corresponding to the notification message, and sends the first card to the data management module; and the data management module controls, when an operation of unlocking the electronic device is received, the card display module to display the first card in a card stack on a home screen of the electronic device, where the card stack includes the first card and at least one second card generated before the notification message is received, and an application corresponding to the first card is different from an application corresponding to the second card.

In the foregoing example, in the notification message display method provided in this application, the view preprocessing module receives the notification message sent by the first application; the view preprocessing module generates the first card corresponding to the notification message, and sends the first card to the data management module; and the data management module controls, when the operation of unlocking the electronic device is received, the card display module to display the first card on the home screen of the electronic device. In this way, when the home screen application receives a new notification message, a user does not need to view the notification message in a system notification bar after unlocking the mobile phone, but instead may directly view a card corresponding to the notification message on the home screen of the electronic device. This improves man-machine interaction efficiency.

For example, the electronic device is a mobile phone and the first application is a calendar application. The view preprocessing module receives a notification message sent by the calendar application; the view preprocessing module generates a first card corresponding to the notification message, and sends the first card to the data management module; and the data management module controls, when the operation of unlocking the electronic device is received, the card display module to display the first card on the home screen of the electronic device. It may be learned that when the home screen application receives the notification message sent by the calendar application, the user does not need to view the notification message in the system notification bar after unlocking the mobile phone, but instead may directly view a card corresponding to the notification message on the home screen of the electronic device. This improves man-machine interaction efficiency.

With reference to the second aspect, in a possible implementation, the electronic device further includes a second application, and the at least one second card includes an initial card; before the view preprocessing module receives the notification message sent by the first application, the notification message display method provided in this application further includes: The view preprocessing module receives display information sent by the second application; the view preprocessing module generates an initial card corresponding to the notification message, and sends the initial card to the data management module; the data management module creates a sequence list based on the initial card, where the sequence list includes the initial card and information used to indicate a display ranking of the initial card; the data management module creates a card stack corresponding to the sequence list; and the data management module controls the card display module to display the initial card; and the data management module updates the sequence list when receiving again the first card sent by the view preprocessing module, where the sequence list further includes the first card and information used to indicate a display ranking of the first card; and that the data management module controls, when an operation of unlocking the electronic device is received, the card display module to display the first card in a card stack on a home screen of the electronic device includes: The data management module controls, when the operation of unlocking the electronic device is received, the card display module to sequentially stack and display the first card and the at least one second card on the home screen of the electronic device based on a sequence list corresponding to the card stack.

In the foregoing example, in the notification message display method provided in this application, to view a card corresponding to a notification message on the home screen of the electronic device, the user needs to create a card stack on the home screen of the electronic device. When the operation of unlocking the electronic device is received, the data management module controls the card display module to sequentially stack and display the first card and the at least one second card on the home screen of the electronic device based on the sequence list corresponding to the card stack. It may be learned that the user does not need to view the notification message in the system notification bar after unlocking the mobile phone, but instead may directly view a card corresponding to the notification message on the home screen of the electronic device. This improves man-machine interaction efficiency.

With reference to the second aspect, in a possible implementation, the home screen application further includes a home screen widget, the home screen widget includes a control configured to create a card stack, and before the view preprocessing module receives the display information sent by the first application, the notification message display method provided in this application further includes: The home screen widget receives an operation performed by the user on the control configured to create a card stack; and the home screen widget sends indication information to the second application, where the indication information is used to indicate the second application to provide the display information.

With reference to the second aspect, in a possible implementation, the sequence list further includes a card identifier used to indicate the first card or the second card; and that the data management module updates the sequence list when receiving again the first card sent by the view preprocessing module includes: when the sequence list does not include the card identifier of the first card sent by the view preprocessing module, adding the first card, the card identifier corresponding to the first card, and the information used to indicate the display ranking of the first card to the sequence list; or when the sequence list includes the card identifier of the first card sent by the view preprocessing module, replacing an existing card corresponding to the card identifier with the first card.

In the foregoing example, in the notification message display method provided in this application, one card identifier is allocated to each card, so that it can be determined, based on the card identifier, whether the card identifier exists in the sequence list. If the card identifier exists in the sequence list, the existing card corresponding to the card identifier is replaced with the first card. If the card identifier does not exist in the sequence list, the first card, the card identifier corresponding to the first card, and the information used to indicate the display ranking of the first card are added to the sequence list. In this way, the sequence list can be better managed.

With reference to the second aspect, in a possible implementation, the notification message display method provided in this application further includes: The data management module receives information that is from the first application and that is used to indicate to delete a target card; the data management module deletes the target card and information used to indicate a display ranking of the target card from the sequence list based on the information used to indicate to delete the target card; and the data management module controls the card display module to display, based on the sequence list obtained after the target card is deleted, each card in a sequence list obtained after the target card is deleted.

In the foregoing example, in the notification message display method provided in this application, a card has a display period. Therefore, a card whose display period ends needs to be deleted, so that the user can view a card whose display period does not end.

With reference to the second aspect, in a possible implementation, the notification message display method provided in this application further includes: The card display module receives an operation used to indicate to delete a target card; the card display module deletes the target card in response to the operation, and continues to display each card in the sequence list based on the sequence list; the data management module deletes the target card and information used to indicate a display ranking of the target card from the sequence list based on information that is used to delete the target card and that is sent by the card display module; and the data management module controls the card display module to display, based on the sequence list obtained after the target card is deleted, each card in a sequence list obtained after the target card is deleted.

In the foregoing example, in the notification message display method provided in this application, the user may delete an unnecessary card. In this way, man-machine interaction efficiency can be improved.

According to a third aspect, this application provides a notification message display method, applied to an electronic device. The electronic device includes a home screen application and a first application. The method includes: The home screen application in the electronic device receives a notification message from the first application; the home screen application in the electronic device generates a first card of the notification message; the home screen application in the electronic device updates a sequence list based on the generated first card, where the sequence list includes the first card, at least one second card generated before the notification message is received, information used to indicate a display ranking of the first card, and information used to indicate a display sequence of the at least one second card; the home screen application in the electronic device displays a card stack on a home screen of the electronic device, where the card stack includes the first card displayed on top based on the sequence list, and the at least one second card sequentially stacked after the first card; the home screen application in the electronic device receives a switching operation performed by a user on the card stack; and in response to the switching operation, the home screen application in the electronic device displays, on top of the card stack, a next card located after the first card in the sequence list, and sequentially stacks other cards after the next card after the first card.

In the foregoing example, in the notification message display method provided in this application, the home screen application in the electronic device receives the notification message from the first application; the home screen application in the electronic device generates the first card of the notification message; the home screen application in the electronic device updates the sequence list based on the generated first card; the home screen application in the electronic device displays the card stack on the home screen of the electronic device, where the card stack includes the first card and the at least one second card that are sequentially stacked based on the sequence list; the home screen application in the electronic device receives the switching operation performed by a user on the card stack; and in response to the switching operation, the home screen application in the electronic device updates a stacking sequence of the first card and the at least one second card in the card stack based on the sequence list. In this way, when the home screen application receives a new notification message, the user does not need to view the notification message in a system notification bar after unlocking the mobile phone, but instead may directly view a card corresponding to the notification message on the home screen of the electronic device. This improves man-machine interaction efficiency.

For example, the electronic device is a mobile phone and the first application is a calendar application. The home screen application in the electronic device receives a notification message from the calendar application; the home screen application in the electronic device generates a first card of the notification message; the home screen application in the electronic device updates a sequence list based on the generated first card; the home screen application in the electronic device displays a card stack on the home screen of the electronic device, where the card stack includes the first card and at least one second card that are sequentially stacked based on the sequence list; the home screen application in the electronic device receives the switching operation performed by the user on the card stack; and in response to the switching operation, the home screen application in the electronic device updates a stacking sequence of the first card and the at least one second card in the card stack based on the sequence list. It may be learned that when the home screen application receives the notification message sent by the calendar application, the user does not need to view the notification message in the system notification bar after unlocking the mobile phone, but instead may directly view a card corresponding to the notification message on the home screen of the electronic device. This improves man-machine interaction efficiency.

With reference to the third aspect, in a possible implementation, the electronic device further includes a second application, and before the home screen application in the electronic device receives the notification message from the first application, the notification message display method provided in this application further includes: The home screen application in the electronic device receives display information sent by the second application; the home screen application in the electronic device generates a second card corresponding to the notification message; the home screen application in the electronic device creates a sequence list based on the second card, where the sequence list includes the second card and information used to indicate a display ranking of the second card; the home screen application in the electronic device creates a card stack corresponding to the sequence list; and the home screen application in the electronic device displays the second card.

In the foregoing example, in the notification message display method provided in this application, to view a card corresponding to a notification message on the home screen of the electronic device, the user needs to create a card stack on the home screen of the electronic device. When an operation of unlocking the electronic device is received, a data management module controls a card display module to sequentially stack and display the first card and the at least one second card on the home screen of the electronic device based on the sequence list corresponding to the card stack. It may be learned that the user does not need to view the notification message in the system notification bar after unlocking the mobile phone, but instead may directly view a card corresponding to the notification message on the home screen of the electronic device. This improves man-machine interaction efficiency.

With reference to the third aspect, in a possible implementation, before the home screen application in the electronic device receives the display information sent by the second application, the notification message display method provided in this application further includes: The home screen application in the electronic device sends indication information to the second application, where the indication information is used to indicate the second application to provide the display information.

With reference to the third aspect, in a possible implementation, the sequence list further includes a card identifier used to indicate the first card or the second card; and that the home screen application in the electronic device updates a sequence list based on the generated first card includes: When the sequence list does not include the card identifier of the first card, the home screen application in the electronic device adds the first card, the card identifier corresponding to the first card, and the information used to indicate the display ranking of the first card to the sequence list; or when the sequence list includes the card identifier of the first card, the home screen application in the electronic device replaces an existing card corresponding to the card identifier with the first card.

In the foregoing example, in the notification message display method provided in this application, one card identifier is allocated to each card, so that it can be determined, based on the card identifier, whether the card identifier exists in the sequence list. If the card identifier exists in the sequence list, the existing card corresponding to the card identifier is replaced with the first card. If the card identifier does not exist in the sequence list, the first card, the card identifier corresponding to the first card, and the information used to indicate the display ranking of the first card are added to the sequence list. In this way, the sequence list can be better managed.

With reference to the third aspect, in a possible implementation, the notification message display method provided in this application further includes: The home screen application in the electronic device receives information that is from the first application and that is used to indicate to delete a target card; and the home screen application in the electronic device deletes the target card and information used to indicate a display ranking of the target card from the sequence list based on the information used to indicate to delete the target card; and that the home screen application in the electronic device displays a card stack on a home screen of the electronic device, where the card stack includes the first card and the at least one second card that are sequentially stacked based on the sequence list includes: The home screen application in the electronic device displays a card stack on the home screen of the electronic device, where the card stack includes the first card and the at least one second card that are sequentially stacked based on a sequence list obtained after the target card is deleted.

In the foregoing example, in the notification message display method provided in this application, a card has a display period. Therefore, a card whose display period ends needs to be deleted, so that the user can view a card whose display period does not end.

With reference to the third aspect, in a possible implementation, the notification message display method provided in this application further includes: The home screen application in the electronic device receives an operation used to indicate to delete a target card; the home screen application in the electronic device deletes the target card in response to the operation, and continues to display each card in the sequence list based on the sequence list; and the home screen application in the electronic device deletes the target card and information used to indicate a display ranking of the target card from the sequence list; and that the home screen application in the electronic device displays a card stack on a home screen of the electronic device, where the card stack includes the first card and the at least one second card that are sequentially stacked based on the sequence list includes: The home screen application in the electronic device displays a card stack on the home screen of the electronic device, where the card stack includes the first card and the at least one second card that are sequentially stacked based on a sequence list obtained after the target card is deleted.

In the foregoing example, in the notification message display method provided in this application, the user may delete an unnecessary card. In this way, man-machine interaction efficiency can be improved.

According to a fourth aspect, this application provides a notification message display apparatus, applied to an electronic device. The electronic device includes a home screen application, a first application, and a second application. The home screen application includes a notification message display apparatus and a home screen widget. The home screen widget includes a control configured to create a card stack. The notification message display apparatus includes a view preprocessing module, a data management module, and a card display module. The home screen widget receives an operation performed by a user on the control configured to create a card stack. The home screen widget sends indication information to the first application. The indication information is used to indicate the first application to provide display information. The view preprocessing module is configured to receive the display information sent by the first application. The view preprocessing module is further configured to generate a first card corresponding to the display information. The data management module creates a sequence list based on the first card generated by the view preprocessing module. The sequence list includes the first card and information used to indicate a display ranking of the first card. The data management module is configured to create a card stack corresponding to the sequence list. The card display module is configured to display the first card generated by the view preprocessing module. The view preprocessing module is configured to receive a notification message from the second application. The view preprocessing module is configured to generate a second card of the notification message. The data management module is configured to update the sequence list based on the generated second card. The sequence list further includes at least one second card and information used to indicate a display sequence of the at least one second card. The card display module is configured to display a card stack on a home screen of the electronic device. The card stack includes the first card and the at least one second card that are sequentially stacked based on the sequence list.

With reference to the fourth aspect, in a possible implementation, the sequence list further includes a card identifier used to indicate the first card or the second card, and when the view preprocessing module is further configured to generate the first card again, and the sequence list does not include the card identifier of the first card, the first card, the card identifier corresponding to the first card, and the information used to indicate the display ranking of the first card are added to the sequence list; or when the view preprocessing module is further configured to generate the first card again, and the sequence list includes the card identifier of the first card, and when the sequence list includes the card identifier of the first card, an existing card corresponding to the card identifier is replaced with the first card.

With reference to the fourth aspect, in a possible implementation, the data management module is further configured to receive information that is from the first application and that is used to indicate to delete a target card; and the data management module is further configured to delete the target card and information used to indicate a display ranking of the target card from the sequence list based on the information used to indicate to delete the target card; and that the card display module is further configured to display a card stack on a home screen of the electronic device, where the card stack includes the first card and the at least one second card that are sequentially stacked based on the sequence list includes: The home screen application displays a card stack on the home screen of the electronic device, where the card stack includes the first card and the at least one second card that are sequentially stacked based on a sequence list obtained after the target card is deleted.

With reference to the fourth aspect, in a possible implementation, the card display module is further configured to receive an operation used to indicate to delete a target card; the card display module is further configured to: delete the target card in response to the operation, and continue to display each card in the sequence list based on the sequence list; and the data management module is further configured to delete the target card and information used to indicate a display ranking of the target card from the sequence list; and that the card display module is further configured to display a card stack on a home screen of the electronic device, where the card stack includes the first card and the at least one second card that are sequentially stacked based on the sequence list includes: The home screen application displays a card stack on the home screen of the electronic device, where the card stack includes the first card and the at least one second card that are sequentially stacked based on a sequence list obtained after the target card is deleted.

With reference to the fourth aspect, in a possible implementation, the first application is a weather application, and the second application is a calendar application.

According to a fifth aspect, this application provides a notification message display apparatus, applied to an electronic device. The electronic device includes a home screen application and a first application. The home screen application includes a notification message display apparatus. The notification message display apparatus includes a view preprocessing module, a data management module, and a card display module. The view preprocessing module is configured to receive a notification message sent by the first application. The view preprocessing module is configured to: generate a first card corresponding to the notification message, and send the first card to the data management module. When an operation of unlocking the electronic device is received, the data management module is configured to control the card display module to display the first card on a home screen of the electronic device.

With reference to the fifth aspect, in a possible implementation, the electronic device further includes a second application; before the view preprocessing module receives the notification message sent by the first application, the view preprocessing module is further configured to receive display information sent by the second application; the view preprocessing module is further configured to: generate a second card corresponding to the notification message, and send the second card to the data management module; the data management module is further configured to create a sequence list based on the second card, where the sequence list includes at least one second card and information used to indicate a display sequence of the at least one second card; the data management module is further configured to create a card stack corresponding to the sequence list; the data management module is further configured to control the card display module to display the second card; and the data management module is further configured to update the sequence list when receiving again the first card sent by the view preprocessing module, where the sequence list further includes the first card and information used to indicate a display ranking of the first card; and when the operation of unlocking the electronic device is received, the data management module is further configured to control the card display module to sequentially stack and display the first card and the at least one second card on the home screen of the electronic device based on a sequence list corresponding to the card stack.

With reference to the fifth aspect, in a possible implementation, the home screen application further includes a home screen widget, the home screen widget includes a control configured to create a card stack, and before the view preprocessing module receives the display information sent by the first application, the home screen widget receives an operation performed by a user on the control configured to create a card stack; and the home screen widget sends indication information to the second application, where the indication information is used to indicate the second application to provide the display information.

With reference to the fifth aspect, in a possible implementation, the sequence list further includes a card identifier used to indicate the first card or the second card; and when the sequence list does not include the card identifier of the first card sent by the view preprocessing module, the data management module is further configured to add the first card, the card identifier corresponding to the first card, and the information used to indicate the display ranking of the first card to the sequence list; or when the sequence list includes the card identifier of the first card sent by the view preprocessing module, the data management module is further configured to replace an existing card corresponding to the card identifier with the first card.

With reference to the fifth aspect, in a possible implementation, the data management module is further configured to receive information that is from the first application and that is used to indicate to delete a target card; the data management module is further configured to delete the target card and information used to indicate a display ranking of the target card from the sequence list based on the information used to indicate to delete the target card; and the data management module is further configured to control the card display module to display, based on the sequence list obtained after the target card is deleted, each card in a sequence list obtained after the target card is deleted.

With reference to the fifth aspect, in a possible implementation, the card display module receives an operation used to indicate to delete a target card; the card display module is further configured to: delete the target card in response to the operation, and continue to display each card in the sequence list based on the sequence list; the data management module is further configured to delete the target card and information used to indicate a display ranking of the target card from the sequence list based on information that is used to delete the target card and that is sent by the card display module; and the data management module is further configured to control the card display module to display, based on the sequence list obtained after the target card is deleted, each card in a sequence list obtained after the target card is deleted.

According to a sixth aspect, this application provides a notification message display apparatus, applied to an electronic device. The electronic device includes a home screen application and a first application. The home screen application includes a notification message display apparatus. The notification message display apparatus includes a view preprocessing module, a data management module, and a card display module. The view preprocessing module is configured to receive a notification message from the first application. The view preprocessing module is further configured to generate a first card of the notification message. The data management module is configured to update a sequence list based on the first card generated by the view preprocessing module. The sequence list includes the first card, at least one second card generated before the notification message is received, information used to indicate a display ranking of the first card, and information used to indicate a display sequence of the at least one second card. The card display module displays, on a home screen of the electronic device, a card stack generated by the data management module. The card stack includes the first card and the at least one second card that are sequentially stacked based on the sequence list. The card display module is further configured to receive a switching operation performed by a user on the card stack. The card display module is further configured to update a stacking sequence of the first card and the at least one second card in the card stack based on the sequence list in response to the switching operation.

With reference to the sixth aspect, in a possible implementation, the card display module is further configured to display the first card on top of the card stack before receiving the switching operation; and the card display module is further configured to: after receiving the switching operation, display, on top of the card stack, a next card located after the first card in the sequence list.

With reference to the sixth aspect, in a possible implementation, the electronic device further includes a second application, and the view preprocessing module is further configured to receive display information sent by the second application; the view preprocessing module is further configured to generate a second card corresponding to the notification message; the data management module is further configured to create a sequence list based on the second card generated by the view preprocessing module, where the sequence list includes the second card and information used to indicate a display ranking of the second card; the data management module is further configured to create a card stack corresponding to the sequence list; and the card display module displays the second card generated by the view preprocessing module.

With reference to the sixth aspect, in a possible implementation, the home screen widget sends indication information to the second application, where the indication information is used to indicate the second application to provide the display information.

With reference to the sixth aspect, in a possible implementation, the sequence list further includes a card identifier used to indicate the first card or the second card; and the data management module is specifically configured to: when the sequence list does not include the card identifier of the first card, add the first card, the card identifier corresponding to the first card, and the information used to indicate the display ranking of the first card to the sequence list; or the data management module is specifically configured to: when the sequence list includes the card identifier of the first card, replace an existing card corresponding to the card identifier with the first card.

With reference to the sixth aspect, in a possible implementation, the data management module is further configured to receive information that is from the first application and that is used to indicate to delete a target card; and the data management module is further configured to delete the target card and information used to indicate a display ranking of the target card from the sequence list based on the information used to indicate to delete the target card; and the card display module displays a card stack on the home screen of the electronic device, where the card stack includes the first card and the at least one second card that are sequentially stacked based on a sequence list obtained after the target card is deleted.

With reference to the sixth aspect, in a possible implementation, the card display module is further used by the home screen application in the electronic device to receive an operation used to indicate to delete a target card; the card display module is further configured to: delete the target card in response to the operation, and continue to display each card in the sequence list based on the sequence list; and the data management module deletes the target card and information used to indicate a display ranking of the target card from the sequence list; and the card display module displays, on the home screen of the electronic device, a card stack generated by the data management module, where the card stack includes the first card and the at least one second card that are sequentially stacked based on a sequence list obtained after the target card is deleted.

According to a seventh aspect, this application provides an electronic device, including a communication interface, a processor, a memory, and a bus. The memory is configured to store computer-executable instructions. The processor is connected to the memory by using the bus. When the electronic device runs, the processor executes the computer-executable instructions stored in the memory, to enable the electronic device to perform the method according to any one of the first aspect, the second aspect, the third aspect, and the possible design manners of the first aspect, the second aspect, and the third aspect.

According to an eighth aspect, this application provides a computer-readable storage medium. When instructions in the storage medium are executed by a processor of an electronic device, the electronic device is enabled to perform the method according to any one of the first aspect, the second aspect, the third aspect, and the possible design manners of the first aspect, the second aspect, and the third aspect.

According to a ninth aspect, this application provides a computer program product. When the computer program product runs on a computer, the computer is enabled to perform the method according to any one of the first aspect, the second aspect, the third aspect, and the possible design manners of the first aspect, the second aspect, and the third aspect.

It may be understood that for beneficial effects that can be achieved by the electronic devices according to any one of the fourth aspect, the fifth aspect, the sixth aspect, the seventh aspect, and the possible design manners of the fourth aspect, the fifth aspect, the sixth aspect, and the seventh aspect, the computer storage medium according to the eighth aspect, and the computer program product according to the ninth aspect, refer to the beneficial effects according to any one of the first aspect, the second aspect, the third aspect, and the possible design manners of the first aspect, the second aspect, and the third aspect. Details are not described herein.

BRIEF DESCRIPTION OF DRAWINGS

FIG. 4A and FIG. 4B are a schematic flowchart 1 of a notification message display method according to this application;

DESCRIPTION OF EMBODIMENTS

Related concepts used in this application are explained below:

A web widget (web widget, or widget) is a derivative of Web2.0, is similar to a small application, and may be applied to the field of mobile devices. The widget may be a clock, a journal, a video, a weather forecast, a Flash game, or the like.

All of "a home screen widget", "a card", and "a card stack" are representation forms of the widget, and are used to display various types of related information, for example, a text, an image, a button, and a map.

Figure 1A:
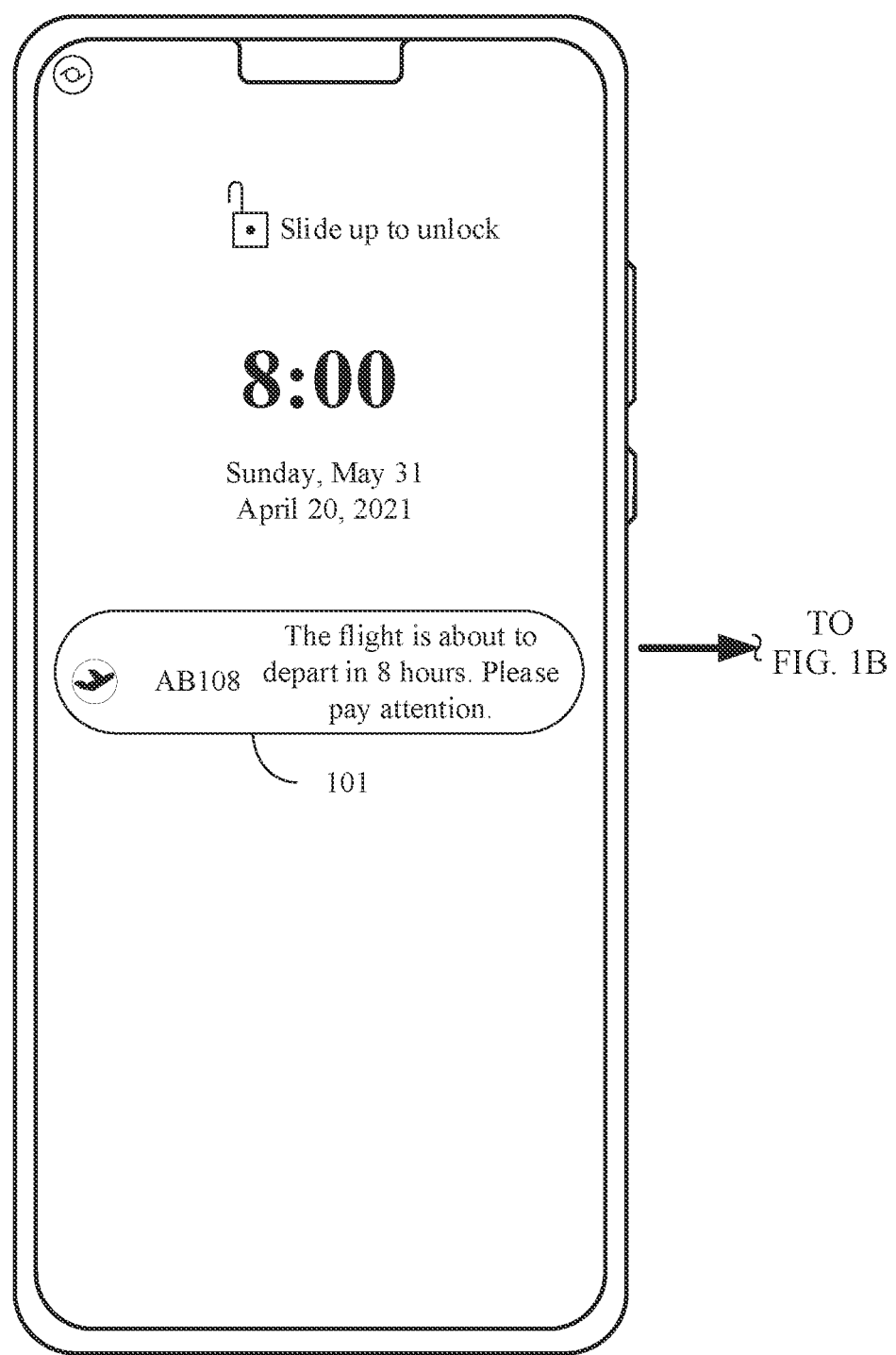
FIG. 1A, FIG. 1B, and FIG. 1C are a schematic diagram of a scenario of reading a notification message on a mobile phone in the conventional technology.
Figures 1A, 1B, 1C:
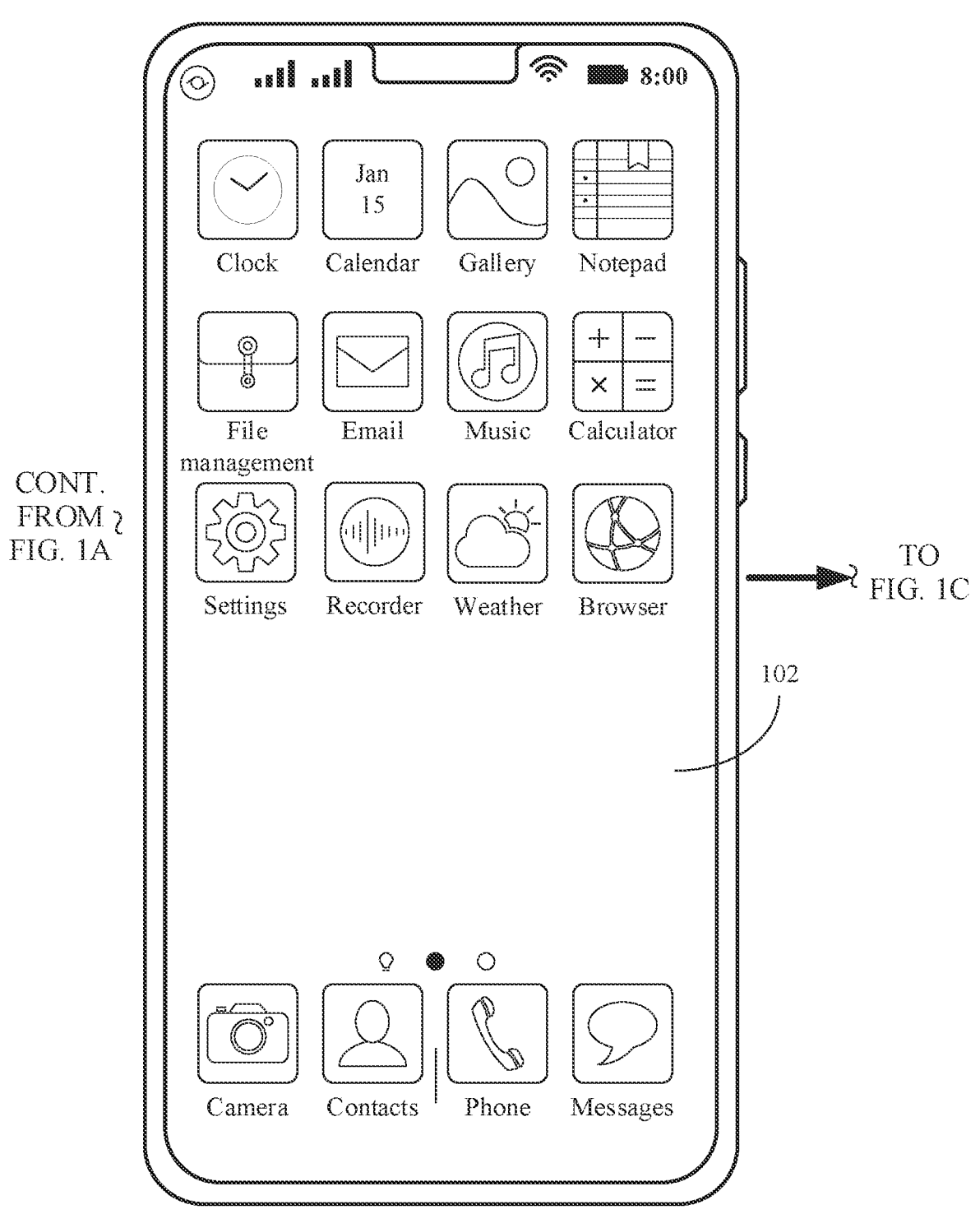
Figures 1B, 1C:
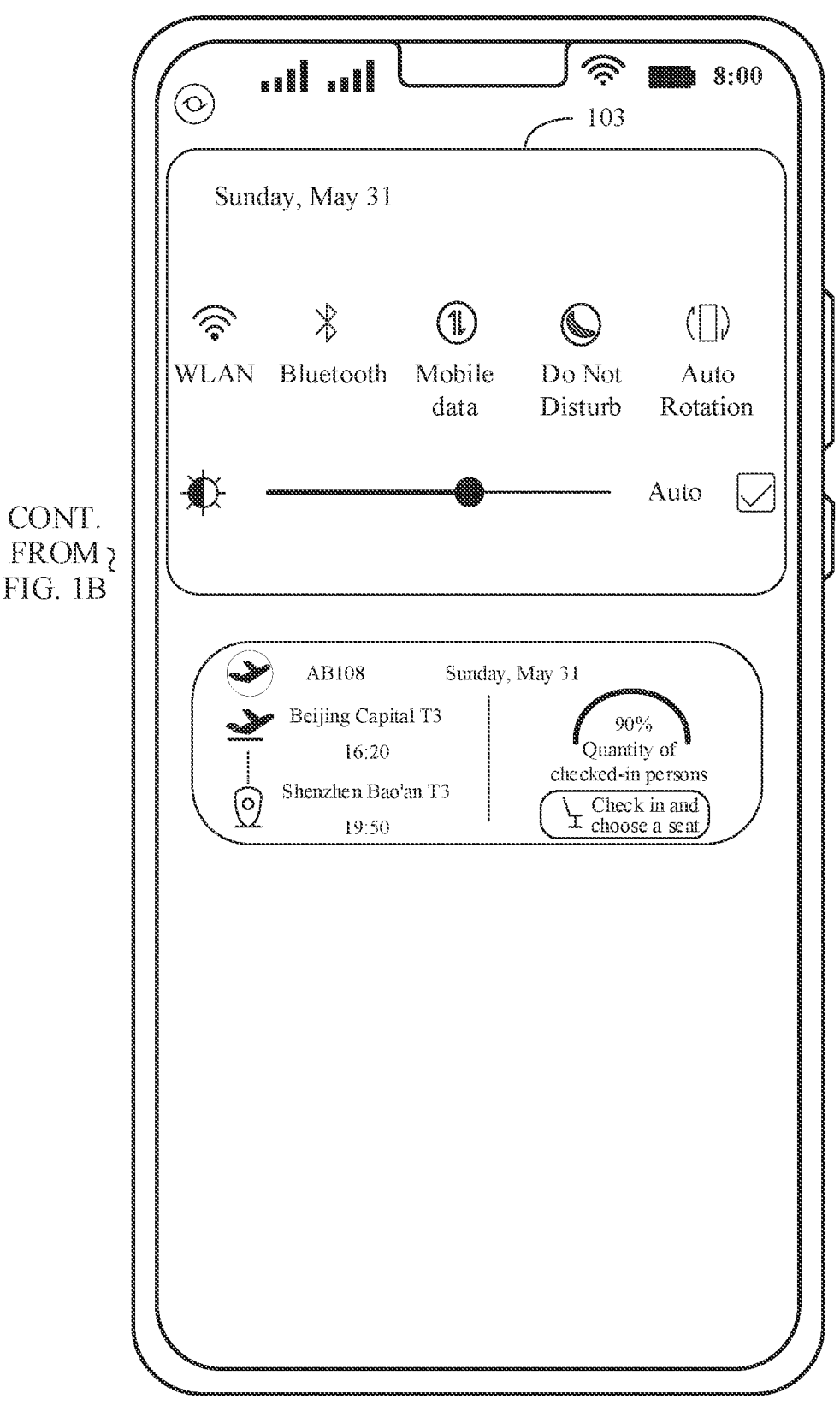

Currently, after unlocking a mobile phone, a user needs to view, in a notification bar, a notification message received by the mobile phone. For example, the mobile phone is currently in a screen-locked state, and the mobile phone receives flight information of AB 108. As shown in FIG. TA, the mobile phone may display a corresponding notification message 101 in a lock screen interface. After the mobile phone receives an operation of unlocking the mobile phone by the user, for example, an operation of sliding upward from a lower edge of a display of the mobile phone, the mobile phone is unlocked, and displays a home screen 102 shown in FIG. 1B. Then, the mobile phone receives an operation that is performed by the user and that is used to trigger display of the notification bar, for example, an operation of sliding downward from an upper edge of the display of the mobile phone, the mobile phone may display the notification bar 103 shown in FIG. 1C. The notification bar 103 may include a notification message received by the mobile phone, for example, the flight information of AB 108, for the user to view. That is, the notification message received by the mobile phone can be viewed only after the notification bar is opened when the mobile phone is unlocked. Consequently, man-machine interaction efficiency is relatively low.

This application provides a notification message display method that may be applied to an electronic device. The electronic device may display a card corresponding to a notification message on a home screen of the electronic device, without a need for a user to open a notification bar. This improves man-machine interaction efficiency and user experience.

For example, the electronic device in this application may be a portable computer (for example, a mobile phone), a tablet computer, a notebook computer, a personal computer (PC), a wearable electronic device (for example, a smart watch), an augmented reality (AR) virtual reality (VR) device, or a vehicle-mounted computer. A specific form of the electronic device is not specially limited in the following embodiments.

Figure 2:
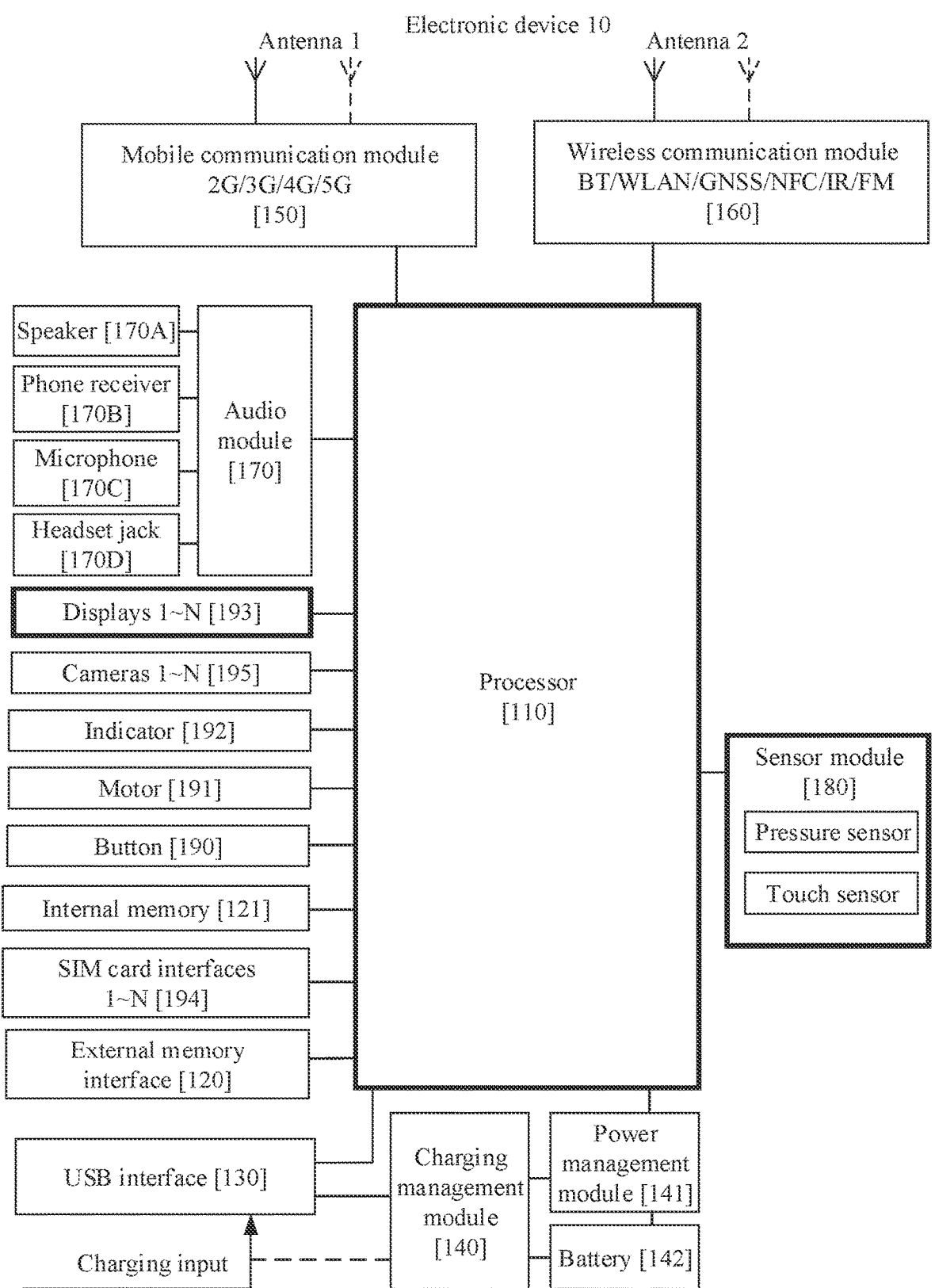
FIG. 2 is a schematic diagram 1 of a structure of an electronic device according to this application.

For example, the electronic device is a mobile phone. FIG. 2 is a schematic diagram of a structure of an electronic device 10 according to this application. The electronic device 10 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a button 190, a motor 191, an indicator 192, a display 193, a subscriber identification module (SIM) card interface 194, a camera 195, and the like. The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment of the present disclosure does not constitute a specific limitation on the electronic device 10. In some other embodiments of this application, the electronic device 10 may include more or fewer components than those shown in the figure, some components may be combined, some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the electronic device 10. The controller may generate an operation control signal based on instruction operation code and a timing signal, to complete control of instruction fetching and instruction execution. The memory may be configured to store computer-executable program code, for example, a computer program corresponding to an application and an operating system. The processor 110 may invoke the computer program stored in the memory, to implement a function defined by the computer program.

A memory may be further disposed in the processor 110, and is configured to store instructions and data. In some embodiments, the memory may be configured to store computer-executable program code, for example, a computer program corresponding to an application and an operating system. The processor 110 may invoke the computer program stored in the memory, to implement a function defined by the computer program. For example, the processor 110 may store code corresponding to the operating system in the memory, and then execute the code corresponding to the operating system in the memory, to implement various functions of the operating system on the electronic device 10. Alternatively, the processor 110 may store code corresponding to the application in the memory, and then execute the code corresponding to the application, to implement various functions of the application on the electronic device 10. The operating system may be a Windows system, a MAC OS system, a Linux system, an Android system, or the like, or certainly may be a future-oriented computer system. This is not limited in this application.

In some embodiments, the processor 110 may include one or more interfaces. The interface may include an inter-integrated circuit (I2C) interface. The I2C interface is a bidirectional synchronous serial bus, including a serial data line (SDA) and a serial clock line (SCL). In some embodiments, the processor 110 may include a plurality of groups of I2C buses. The processor 110 may be respectively coupled to the touch sensor, a charger, a flash light, a camera 195, and the like through different I2C bus interfaces. For example, the processor 110 may be coupled to the touch sensor through the I2C interface, so that the processor 110 communicates with the touch sensor through the I2C bus interfaces to implement a touch function of the electronic device 10.

The touch sensor is also referred to as a "touch panel". The touch sensor may be disposed on the display 193. The touch sensor and the display 193 form a touchscreen. The touch sensor is configured to detect a touch operation performed on or near the touch sensor. The touch sensor may transfer a detected touch operation to the application processor to determine a touch event type. A visual output related to the touch operation may be provided by using the display 193. In some other embodiments, the touch sensor may alternatively be disposed on a surface of the electronic device 10 at a position different from a position of the display 193. The pressure sensor is configured to sense a pressure signal, and may convert the pressure signal into an electrical signal. In some embodiments, the pressure sensor may be disposed on the display 193. There are many types of pressure sensors, such as a resistive pressure sensor, an inductive pressure sensor, and a capacitive pressure sensor. The capacitive pressure sensor may include at least two parallel plates having an electrically conductive material. When force is exerted on the pressure sensor, capacitance between electrodes changes. The electronic device 10 determines strength of pressure based on a change of the capacitance. When a touch operation is performed on the display 193, the electronic device 10 detects strength of the touch operation by using the pressure sensor. The electronic device 10 may calculate a touch location based on a detected signal of the pressure sensor. In some embodiments, touch operations that are performed at a same touch location but have different touch operation strength may correspond to different operation instructions. For example, when a touch operation whose touch operation strength is less than a first pressure threshold is performed on a Messages application icon, an instruction for viewing an SMS message is executed. When a touch operation whose touch operation strength is greater than or equal to the first pressure threshold is performed on the Messages application icon, an instruction for creating a new SMS message is executed.

It may be understood that a function of the electronic device needs to be implemented based on cooperation of software in addition to support of the hardware. In some embodiments, a software architecture of the electronic device may include an application layer and an application framework layer. The application layer may include each application installed in the electronic device, for example, a home screen application and a first application installed in the terminal. The first application is configured to send target information to the home screen application, so that the home screen application displays, deletes, or updates a card corresponding to the target information in an interface of the mobile phone based on the target information. For example, the target information may be display information, a notification message, information for deleting a target card, or information for updating a target card. The first application may include Messages, Music Player, File Manager, Gallery, Browser, Notepad, Calendar, Email, or the like. The first application may be a system application in the electronic device or a third-party application. This is not specifically limited herein in this application. The application layer may further include a system notification service and a home screen application. The system notification service is configured to send target information to the home screen application, so that the home screen application displays, deletes, or updates a card corresponding to the target information in an interface of the mobile phone based on the target information. For example, the target information may be display information, a notification message, information for deleting a target card, or information for updating a target card.

The application framework layer provides an application programming interface (API) and a programming framework to an application at the application layer, for example, an input manager service, and is configured to: manage an operation (for example, a sliding operation, a delete operation, or a tap operation) performed by a user on the mobile phone, and feed back the operation performed by the user on the mobile phone to the home screen application by using a window manager service (WMS), so that the home screen application performs a corresponding operation based on the operation performed by the user on the mobile phone.

Specifically, the application layer interacts with the application framework layer, so that each application at the application layer can complete a corresponding function. For example, the user performs a user operation in the interface of the mobile phone. After the window manager service receives the user operation, the user operation is fed back to a card display module of the home screen application by using the window manager service, so that the home screen application performs a corresponding operation based on the operation performed by the user on the mobile phone.

In this application, the first application or the system notification service may serve as a service requester, and send a notification message to the home screen application, to trigger the home screen application to add a card corresponding to the notification message to a home screen of the electronic device. The first application or the system notification service may further send the information for updating the target card to the home screen application, to trigger the home screen application to update information about the target card displayed on the home screen of the electronic device. The first application or the system notification service may further send the information for deleting the target card to the home screen application, to trigger the home screen application to delete the target card on the home screen of the electronic device. Alternatively, the input manager service receives a user operation (for example, a delete operation on the target card), and feeds back the delete operation on the target card to the home screen application by using the window manager service, to trigger, based on the delete operation on the target card that is fed back by the input manager service, the home screen application to delete the target card on the home screen of the electronic device.

Figure 3:
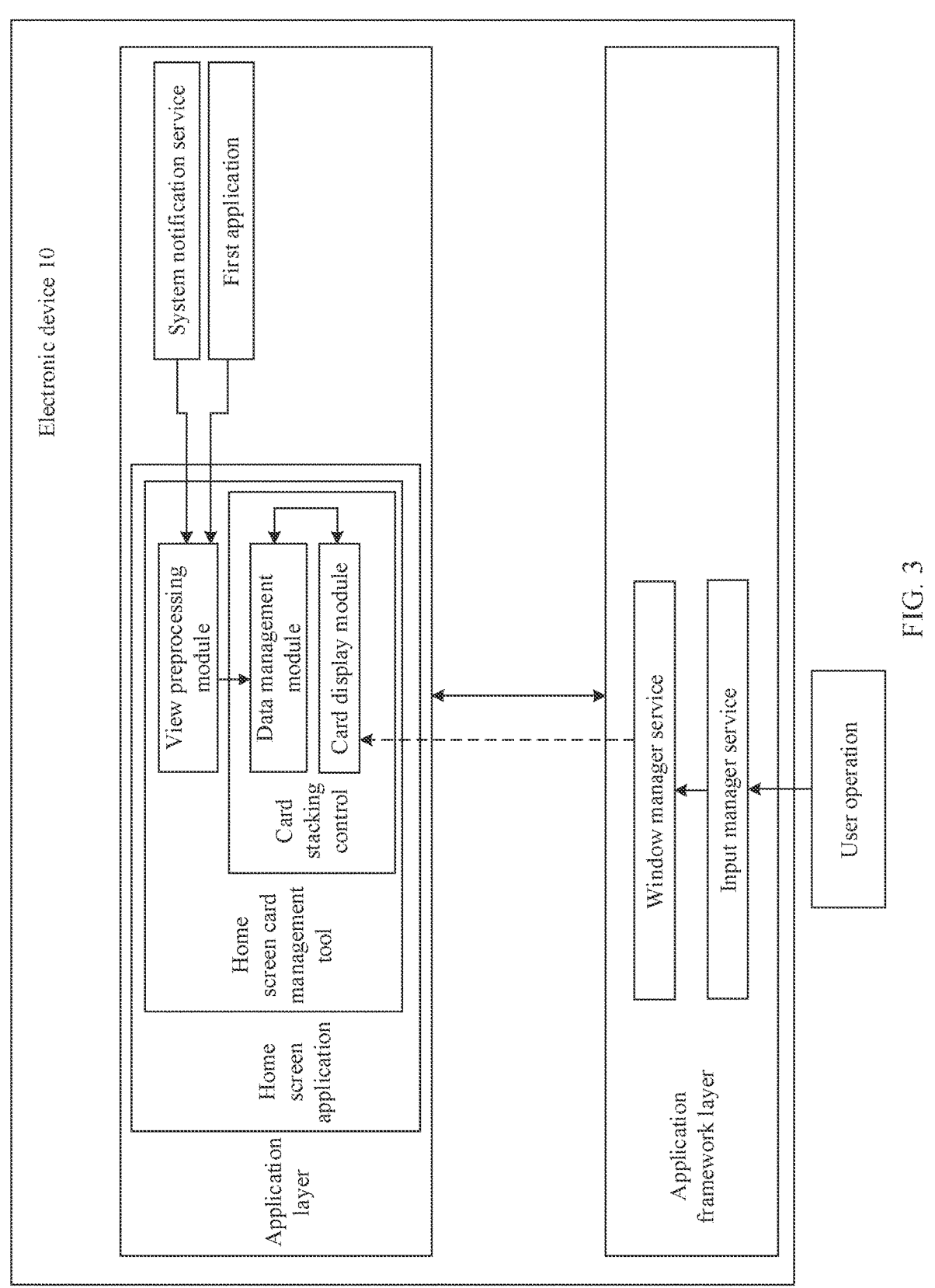
FIG. 3 is a schematic diagram 2 of a structure of an electronic device according to this application.

In an example, as shown in FIG. 3, the home screen application may include a home screen card management tool. The first application or the system notification service may send a notification message to the home screen card management tool of the home screen application, to trigger the home screen application to add a card corresponding to the notification message to the home screen of the electronic device. The first application or the system notification service may further send the information for updating the target card to the home screen card management tool of the home screen application, to trigger the home screen application to update information about the target card displayed on the home screen of the electronic device. The first application or the system notification service may send the information for deleting the target card to the home screen card management tool of the home screen application, to trigger the home screen application to delete the target card on the home screen of the electronic device. Alternatively, the input manager service receives a user operation (for example, a delete operation on the target card), and feeds back the delete operation on the target card to the home screen card management tool by using the window manager service, to trigger, based on the delete operation on the target card that is fed back by the input manager service, the home screen application to delete the target card on the home screen of the electronic device.

In some examples, the home screen card management tool may include a view preprocessing module and a card stacking control, and the card stacking control includes a data management module and a card display module. The first application or the system notification service may send a notification message to the view preprocessing module, and cooperate with each module of the view preprocessing module and the card stacking control, to trigger the home screen application to add a card corresponding to the notification message to the home screen of the electronic device. Alternatively, the first application or the system notification service may send the information for updating the target card to the view preprocessing module, to trigger the home screen application to update information about the target card displayed on the home screen of the electronic device. The first application or the system notification service may send the information for deleting the target card to the data management module, to trigger the home screen application to delete the target card on the home screen of the electronic device. Alternatively, the input manager service receives a user operation (for example, a delete operation on the target card), and feeds back the delete operation on the target card to the card stacking control by using the window manager service, to trigger, based on the delete operation on the target card that is fed back by the input manager service, the home screen application to delete the target card on the home screen of the electronic device.

For example, before the view preprocessing module receives the notification message sent by the first application or the system notification service, the view preprocessing module may generate an initial card. The view preprocessing module sends the initial card to the data management module. The data management module creates a sequence list based on the initial card sent by the view preprocessing module. The data management module currently receives only one initial card, and therefore the created list currently includes only one initial card. The data management module controls the card display module to display the initial card.

Then, after receiving the notification message sent by the first application or the system notification service, the view preprocessing module processes the notification message to generate the card corresponding to the notification message. The view preprocessing module sends the generated card to the data management module. The data management module maintains the sequence list based on the card sent by the view preprocessing module. The maintaining the sequence list means that each time a card sent by the view preprocessing module is received, the data management module creates an entry corresponding to the card in the sequence list. In this way, the home screen application adds the card corresponding to the notification message to the home screen of the electronic device. The data management module controls the card display module to display each card based on the sequence list.

Then, the first application or the system notification service may send the information for updating the target card to the view preprocessing module. The view preprocessing module receives the information for updating the target card, and the view preprocessing module processes the information for updating the target card to generate a to-be-updated card. The view preprocessing module sends the to-be-updated card to the data management module. The data management module replaces the target card in the sequence list with the to-be-updated card based on the to-be-updated card sent by the view preprocessing module. The data management module maintains the sequence list. In this way, the home screen application updates the information about the target card displayed on the home screen of the electronic device.

Then, the first application or the system notification service may send the information for deleting the target card to the data management module. The data management module deletes the target card from the sequence list based on the information for deleting the target card. The data management module maintains the sequence list. In this way, the home screen application deletes the target card from a card displayed on the home screen of the electronic device. Alternatively, the input manager service receives a user operation (for example, a delete operation on the target card), and feeds back the delete operation on the target card to the card display module by using the window manager service, so that the card display module deletes the target card based on the delete operation on the target card that is fed back by the input manager service. The card display module keeps continuing to display each card based on the sequence list. The card display module sends the information for deleting the target card to the data management module. The data management module deletes the target card from the sequence list based on the information that is about deleting the target card and that is sent by the card display module. The data management module maintains the sequence list. In this way, the home screen application deletes the target card on the home screen of the electronic device.

Similarly, the first application or the system notification service may further send a notification message to the view preprocessing module, to create another card. When a plurality of cards are created, if a quantity of cards is greater than or equal to 2, the plurality of cards may be displayed on the home screen in a form of a card stack.

In some examples, the home screen application may further include a home screen widget, configured to cooperate with the home screen card management tool to create a card stack on the home screen.

The notification message display method provided in this application is described in detail below by using an example in which the electronic device is a mobile phone and with reference to FIG. 3. The notification message display method provided in this application may include "a procedure of creating a card stack", "a procedure of adding a card to the card stack", "a procedure of deleting a card from the card stack", and "a procedure of updating a card in the card stack".

Figure 4A:
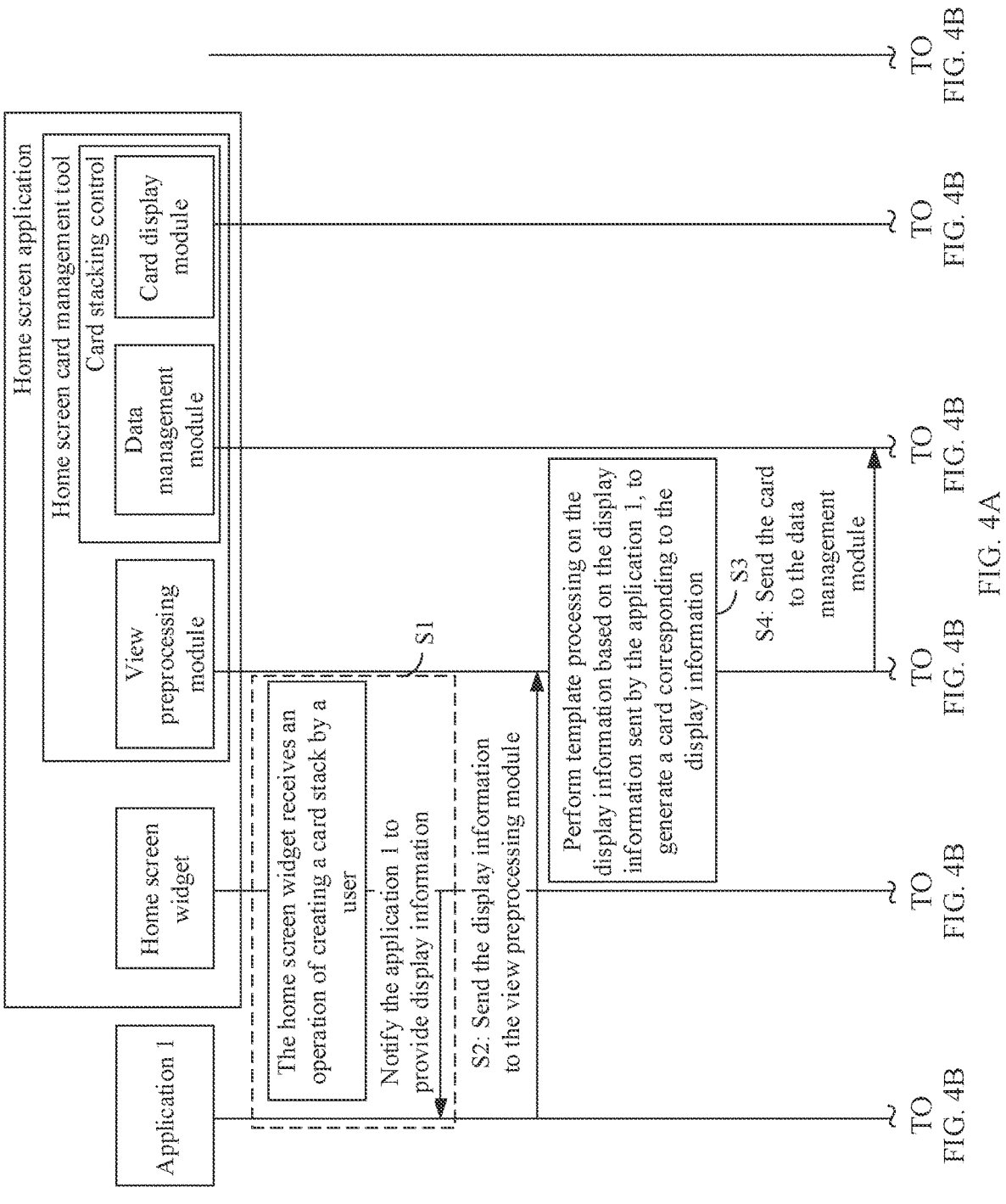

As shown in FIG. 4A and FIG. 4B, the "procedure of creating a card stack" may include S1-S8.

S1: A home screen widget receives an operation of creating a card stack by a user, and the home screen widget notifies an application 1 to provide display information.

In some examples, the user may create a card stack on a home screen of a mobile phone, so that after receiving a new notification message, a home screen application may display the notification message by using a card in the card stack. For example, when the user wants to create a card stack on the home screen of the mobile phone, the user may perform a corresponding create operation, and the mobile phone, for example, the home screen widget in the home screen application in the mobile phone, may receive the create operation. After receiving the create operation, the home screen widget may notify a corresponding application, for example, the application 1, to provide display information, so that a card (for example, which is referred to as an initial card) may be displayed in the created card stack based on the display information, to identify a display location of the card stack on the home screen.

In some examples, the foregoing first application may also be referred to as the application 1. When the application 1 provides display information to a view preprocessing module, the first card is a card corresponding to the display information provided by the application 1. When the application 1 provides a notification message to the view preprocessing module, the first card is a card corresponding to the notification message provided by the application 1. For example, the application 1 may be a default application in the mobile phone, for example, a calendar application or a weather application, may be an application preset by the user, for example, a news application or a shopping application, or may be determined by the mobile phone based on a use parameter of the application. For example, the use parameter includes any one or more of a use frequency and a last use time. For example, the use parameter is the use frequency. The mobile phone determines, based on a use frequency of each application, that an instant messaging application is most frequently used, and the mobile phone determines that the instant messaging application is the application 1.

The create operation may include one operation or a plurality of operations. For example, the create operation may include an operation for triggering display of the home screen widget and an operation for selecting a card stack. For example, the operation for triggering display of the home screen widget may be a two-finger pinch operation, and the operation for selecting a card stack may be a tap operation or a drag operation.

Figure 5A:
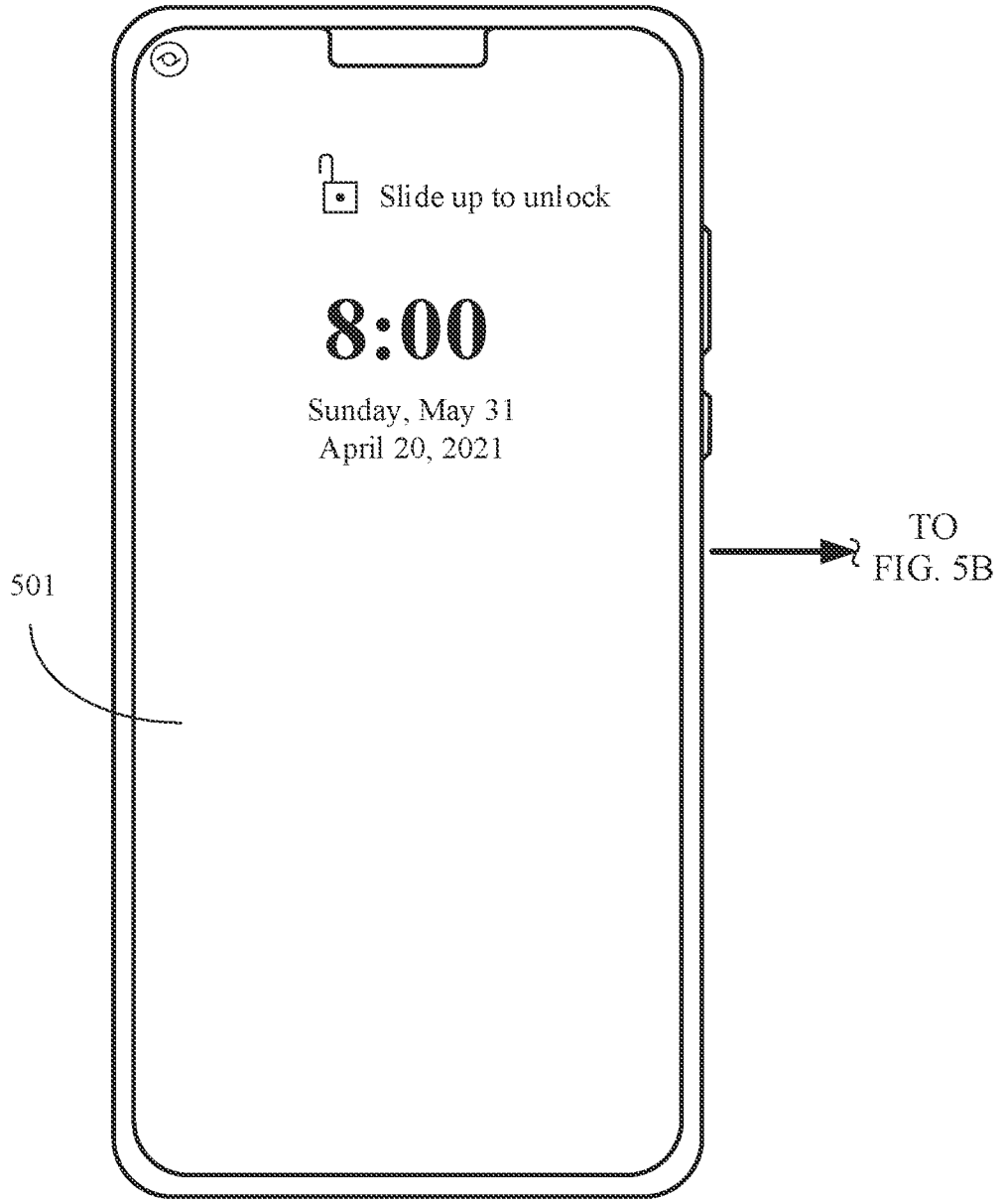
FIG. 5A, FIG. 5B, FIG. 5C, and FIG. 5D are a schematic diagram 1 of a scenario of a notification message display method according to this application.
Figures 5A, 5B, 5C:
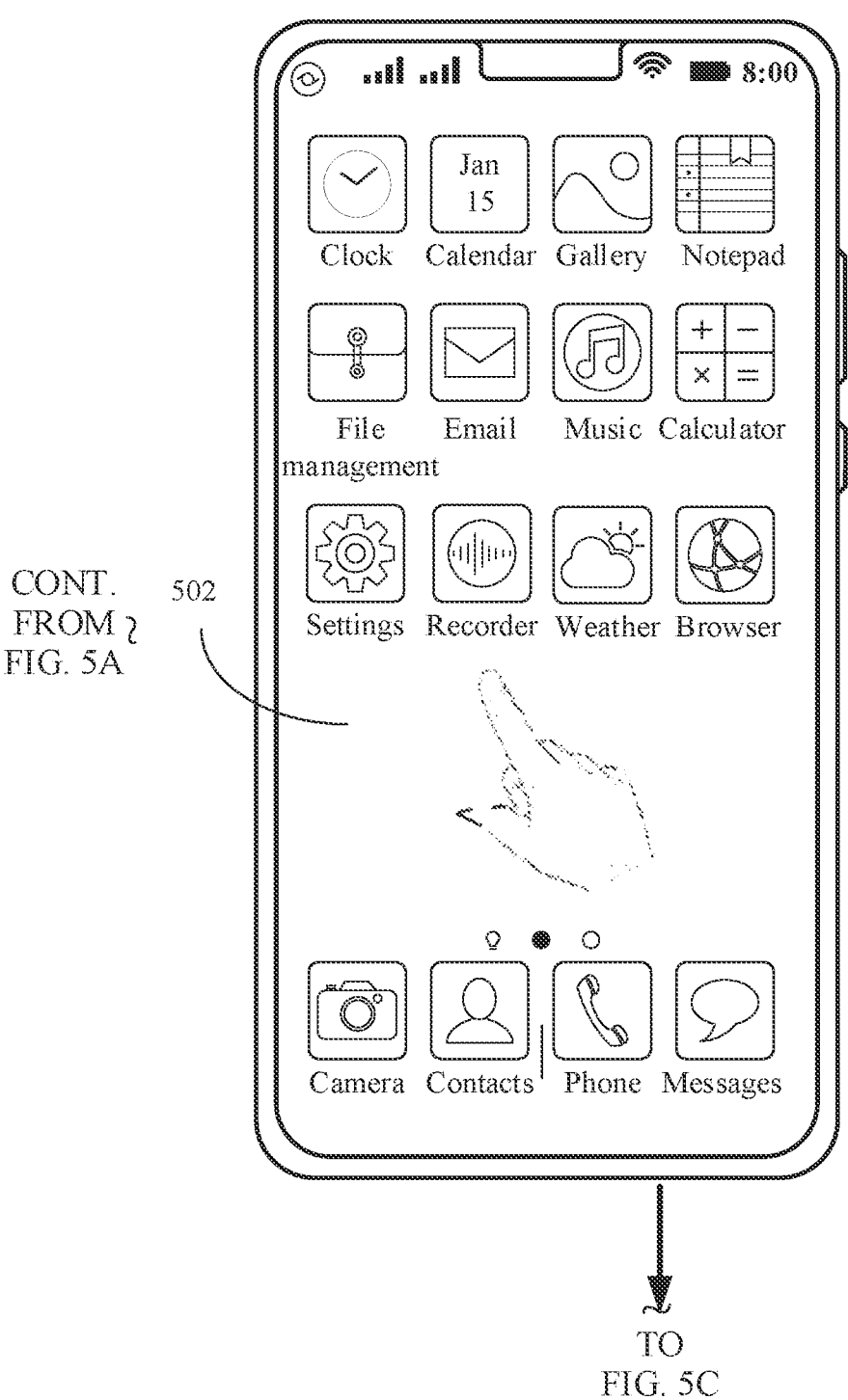
Figure 5C:
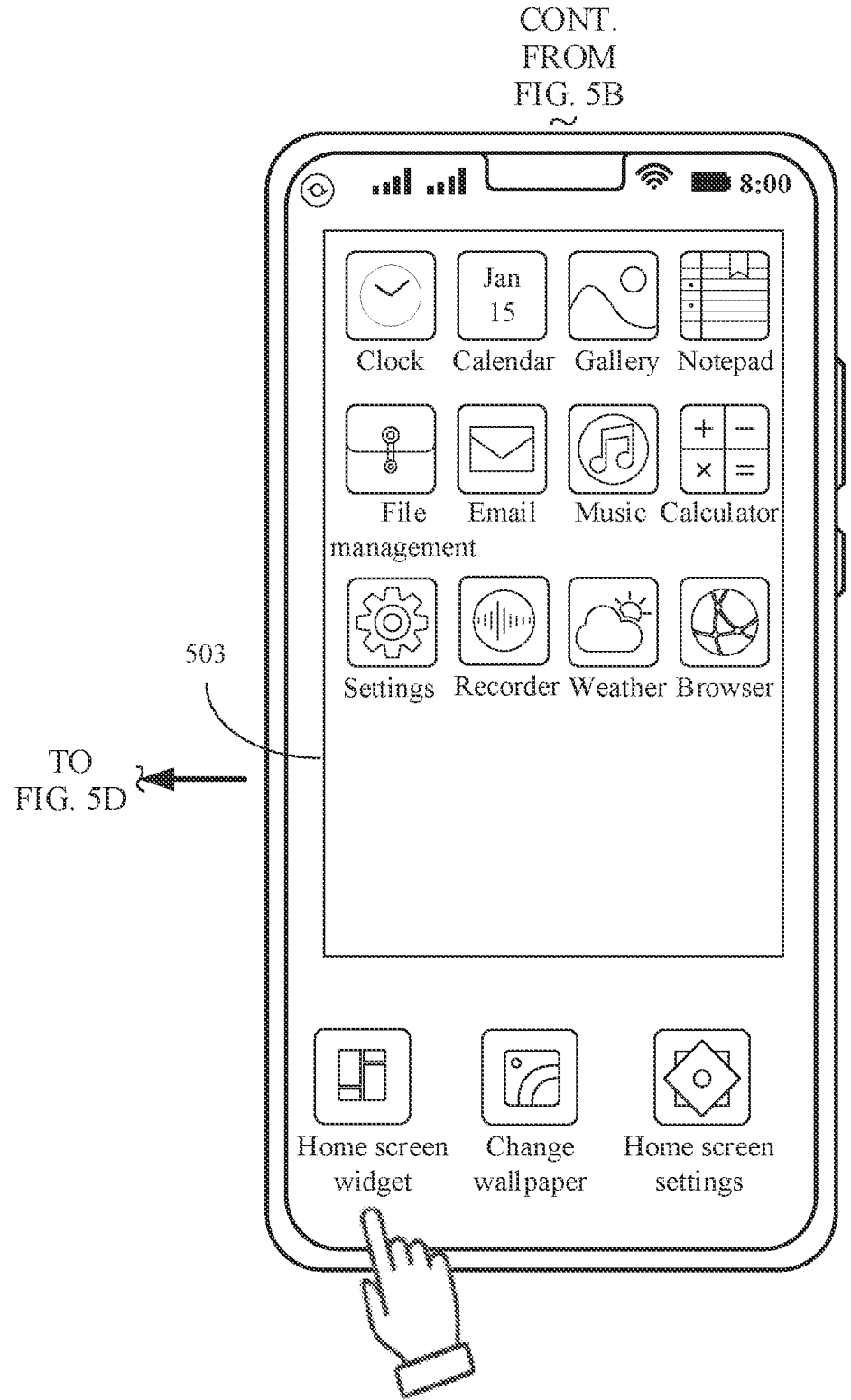
Figure 5D:
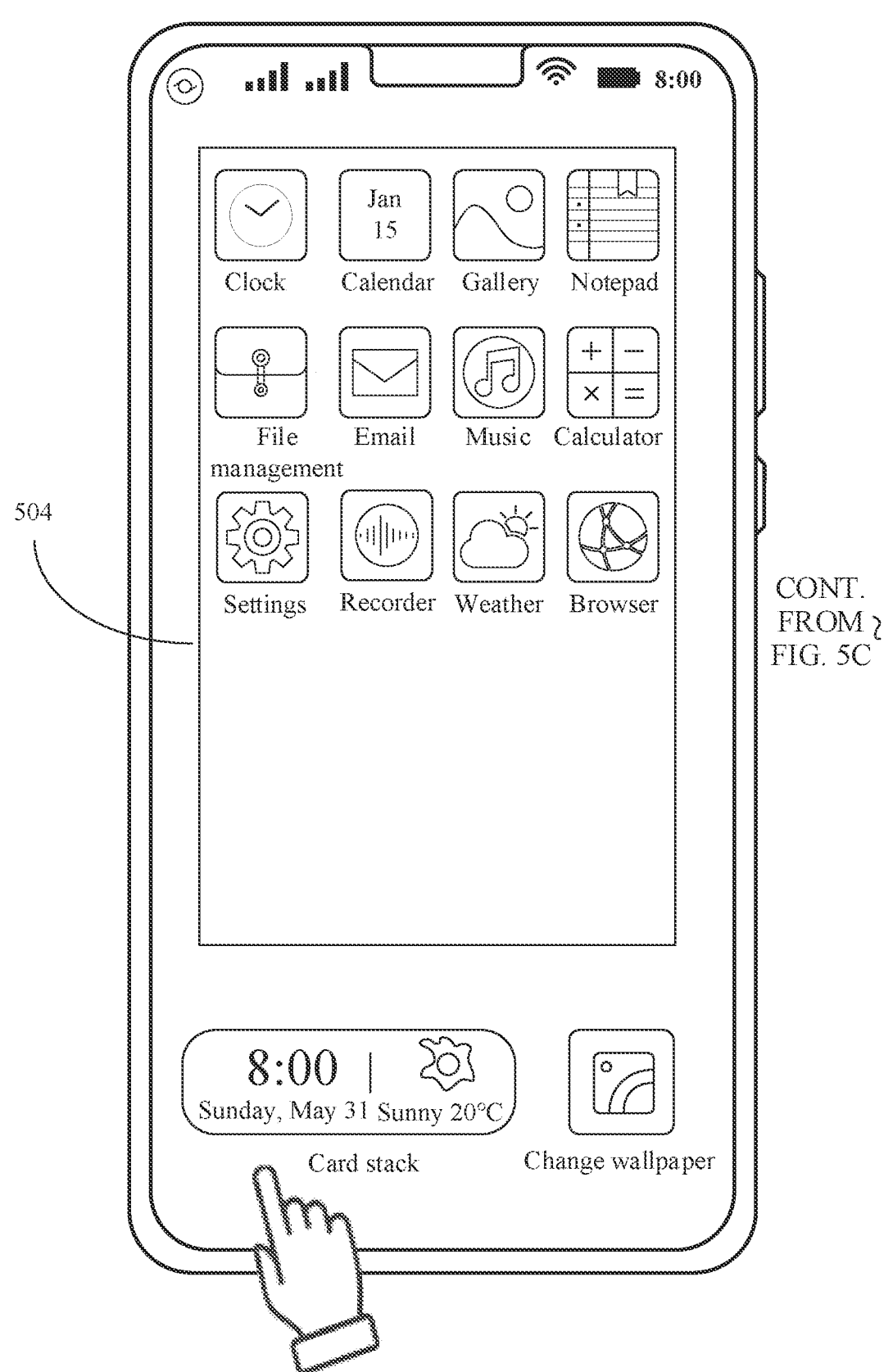

An example in which the application 1 is a weather application and the create operation includes the two-finger pinch operation and the tap operation is used for description. After the user turns on the mobile phone, the mobile phone displays a lock screen interface 501 shown in FIG. 5A. After receiving an unlock operation performed by the user, the mobile phone unlocks the mobile phone, and displays a home screen 502 shown in FIG. 5B. In this case, the user may perform a two-finger pinch operation. After receiving the two-finger pinch operation, the mobile phone may display, in response to the operation, an interface 503 that includes the home screen widget and that is shown in FIG. 5C. After receiving a select operation, the home screen widget may display, in response to the operation, an interface 504 that includes a card stack and that is shown in FIG. 5D. Subsequently, the user may perform a tap operation on the card stack on the mobile phone. After the mobile phone receives the tap operation on the card stack, the home screen widget may notify the application 1 to provide display information, so that the home screen application displays, on the home screen of the electronic device, a card, for example, referred to as an initial card, corresponding to the display message.

The foregoing example is described by using an example in which after receiving the operation of creating a card stack by the user, the mobile phone generates the initial card based on the display information provided by the application 1, and displays the initial card on the home screen of the mobile phone, to identify the display location of the card stack on the home screen. In some other examples, after receiving the create operation, the mobile phone may create a blank card as the initial card to identify the display location of the card stack on the home screen, without notifying the application 1 to provide the display information. The blank card may be a card that includes only a card boundary and does not include any information, or may be a card that includes only a card outline and does not include any information.

S2: The application 1 sends the display information to the view preprocessing module.

S3: The view preprocessing module performs template processing on the display information based on the display information sent by the application 1, to generate a card corresponding to the display information.

In some examples, the display information may include one or more of an icon, a title, and a view. The icon may be an application icon of the application 1. The title may be a title of display content. The view may be display content. For example, the display content may be a user-defined picture or a motto. For another example, the display content may be data displayed on the application 1, for example, weather, a temperature, time, and a date. After receiving the display information, the view preprocessing module may process the display information, for example, perform template processing, to generate the card corresponding to the display information.

In some examples, different display information may be displayed to the user in different display styles (for example, layout manners), to implement diversified card display. In this example, a plurality of card templates may be preconfigured in the mobile phone, and different card templates correspond to different display styles. For example, display styles of display information of applications of a same type may be the same, and display styles of display information of applications of different types are different. In this way, different card templates may correspond to different application types. Based on this, in a possible implementation, the view preprocessing module may determine a card template based on an application type of the application 1, and implement template processing on the display information based on the card template, to generate the card with a corresponding display style. For another example, display information corresponding to different card types (cardType) is displayed to the user in different display styles, and display information corresponding to a same card type is displayed to the user in a same display style. In this way, different card templates may correspond to different card types. Based on this, in another possible implementation, the application 1 may notify the view preprocessing module of a corresponding card type. For example, the display information further includes the card type. The video preprocessing module may determine a corresponding card template based on the card type in the received display information, and perform template processing on the display information based on the card template, to generate the card with a corresponding display style. In this way, the application can select a card template to be used, that is, the application can select a display style.

Figure 6:
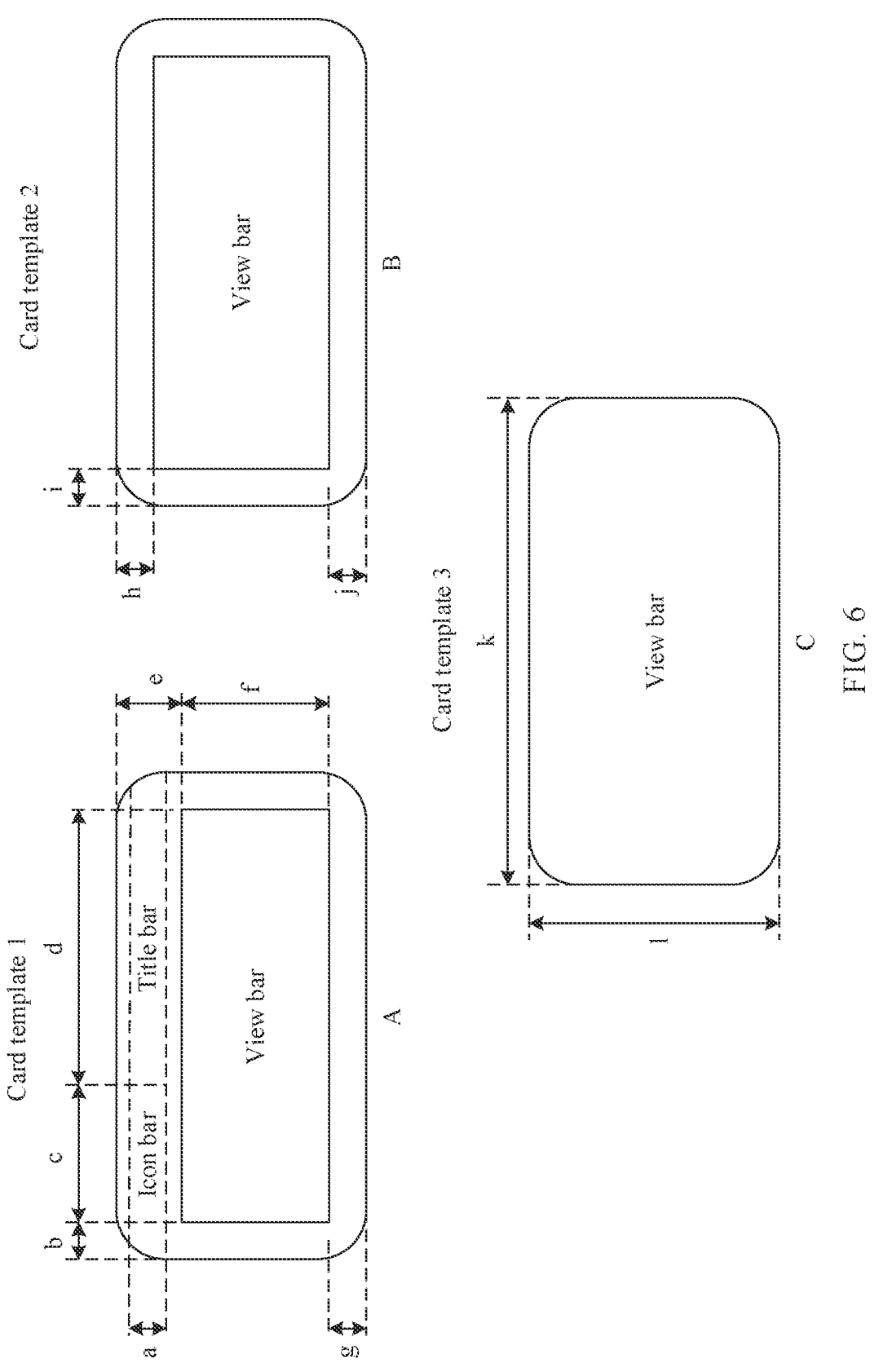
FIG. 6 is a schematic diagram of a card module in a notification message display method according to this application.

For example, different card templates correspond to different card types. As shown in FIG. 6, the card templates preconfigured in the mobile phone may include a card template 1 shown in A in FIG. 6, a card template 2 shown in B in FIG. 6, and a card template 3 shown in C in FIG. 6. A display style corresponding to the card template 1 is an icon bar, a title bar, and a view bar laid out in a layout manner shown in A in FIG. 6. A display style corresponding to the card template 2 is a view bar laid out in a layout manner shown in B in FIG. 6. A display style corresponding to the card template 3 is a view bar laid out in a layout manner shown in C in FIG. 6. In this way, different card templates may match different card types, to implement a function of displaying corresponding display information to the user in different display styles.

Specifically, different card templates use different layout manners, and different layout manners correspond to different layout information. The layout information includes at least a layout size and layout content. The layout size includes one or more of an icon bar size, a title bar size, and a view bar size. The layout content includes one or more of an icon bar, a title bar, and a view bar. For example, in the card template 1 shown in A in FIG. 6, widths of both the icon bar and the title bar are a, a length of the icon bar is c, a length of the title bar is d, a width of the view bar is f, a length of the view bar is c+d, a distance between an upper edge of the view bar and an upper edge of the card template is e, a distance between a lower edge of the view bar and a lower edge of the card template is g, and a distance between a left side of each of the icon bar and the view bar and a left side of the card template is b; in the card template 2 shown in B in FIG. 6, a distance between an upper edge of the view bar and an upper edge of the card template is h, a distance between a lower edge of the view bar and a lower edge of the card template is j, and a distance between a left side of the view bar and a left side of the card template is i; and in the card template 3 shown in C in FIG. 6, a width of the view bar is 1, a length of the view bar is k, and arc processing is performed on four corners of the view bar.

It may be understood that different element information may be displayed in different card templates, and the element information includes at least one or more of an icon, a title, and a view. For example, element information that may be displayed in the card template 1 includes an icon, a title, and a view, and element information that may be displayed in the card template 2 includes a view. Correspondingly, when the application notifies the view preprocessing module of the card template to be used, the display information sent by the application to the view preprocessing module includes at least element information that needs to be displayed. If the card template that is to be used and that is notified by the application to the view preprocessing module is the card template 1, the display information sent by the application to the view preprocessing module includes at least an icon, a title, and a view. For example, with reference to the foregoing example, different card types correspond to different card templates, and the card type is added to the display information by the application 1 and is notified to the view preprocessing module. After the view preprocessing module receives the display information sent by the application 1, the view preprocessing module may determine, based on the card type in the display information, the card template to be used for the display information. Then, the view preprocessing module performs template processing on the display information based on the card template, to generate the card corresponding to the display information. For example, the element information in the display information sent by the application 1 to the view preprocessing module includes an icon, a title, a view, and a card type 1. The card type 1 corresponds to the card template 1. The view preprocessing module may determine, based on the card type 1 in the received display information, that the card template to be used for the display information is the card template 1 shown in A in FIG. 6. The view preprocessing module performs template processing on the icon, the title, and the view in the display information based on the card template. For example, the view preprocessing module fills the icon bar in the card template 1 with the icon, fills the title bar in the card template 1 with the title in the display information, and fills the view bar in the card template 1 with the view in the notification message, to generate the card corresponding to the display information, for example, the initial card.

In addition, when the element information in the display information sent by the application to the view preprocessing module does not match the element information that may be displayed in the card template, the view preprocessing module performs template processing only on an element that may be displayed in the card template, to generate the corresponding card. For example, with reference to the foregoing example, the element information in the display information sent by the application to the view preprocessing module includes an icon, a title, a view, and a card type 2. The card type 2 corresponds to the card template 2. The view preprocessing module may determine, based on the card type 2 in the received display information, that the card template to be used for the display information is the card template 2 shown in B in FIG. 6. The element information that may be displayed in the card template 2 includes a view. The element information in the display information sent by the application to the view preprocessing module does not match the element information that may be displayed in the card template. Therefore, the view preprocessing module performs template processing only on an element that may be displayed in the card template 2, for example, the view, to generate the card corresponding to the display information, for example, the initial card.

It should be noted that the scenario in which a plurality of card templates are configured in the mobile phone, and different card templates correspond to different card types are described by using the foregoing example in which the card type is carried in the display information. In some other examples, when the display information carries no card type, the view preprocessing module considers, by default, that the card template corresponding to the display information is a default template, to perform template processing on the display information. The default template may be a card template set by the user or a card template preconfigured in the mobile phone. The view preprocessing module may process the display information, for example, perform template processing, by using the default template, to generate the card corresponding to the display information. For example, with reference to the foregoing example, the element information in the display information sent by the application to the view preprocessing module includes an icon, a title, and a view. When the display information carries no card type, the view preprocessing module considers, by default, that the card template corresponding to the display information is the default template. For example, the default template corresponds to the card template 2 shown in B in FIG. 6. The element information that may be displayed in the card template 2 includes a view. The element information in the display information sent by the application to the view preprocessing module does not match the element information that may be displayed in the card template. Therefore, the view preprocessing module performs template processing only on an element that may be displayed in the card template 2, for example, the view, to generate the card corresponding to the display information, for example, the initial card. Alternatively, in some other examples, only one card template may be configured in the mobile phone. In this case, the view preprocessing module performs template processing on all display information based on the card template, so that display styles of generated cards corresponding to all the display information are the same and displayed element information is the same. In this way, there is more uniform card display.

S4: The view preprocessing module sends the card to a data management module.

In some examples, after generating the card corresponding to the display information, the view preprocessing module may send the card to the data management module, so that the data management module maintains the card. For example, maintenance of the card by the data management module includes S5-S8.

S5: The data management module creates, based on the received card, a sequence list for maintaining the card.

It may be understood that in this example, the procedure of creating a card stack is described. When a card stack is created, to facilitate management of a display sequence of cards in the card stack, after receiving a card, the data management module may create a sequence list for maintaining the card. The sequence list may include a card identifier of the card. Then, if another card needs to be added to the card stack, a card identifier of the another card may be added to the sequence list. In some examples, the card identifier corresponding to the card may be used to indicate a display ranking of the corresponding card in the card stack. With reference to the foregoing example, an example in which the card identifier is an identity document ("id") is used for description. After receiving a card, the data management module allocates one id to each card, and the data management module determines the sequence list based on the id corresponding to each card. For example, ids corresponding to all the cards are sorted in descending order to determine the sequence list.

In some other examples, a receiving time of a card or a priority preconfigured for an application in the mobile phone may be used to indicate a display ranking of the corresponding card in the card stack. For example, the data management module may perform sorting based on a sequence of receiving times of receiving all cards, to determine the sequence list. Alternatively, the data management module may perform sorting based on a sequence of priorities of applications corresponding to all cards, to determine the sequence list.

The foregoing example is described by using an example in which the data management module allocates a card identifier to each card after receiving the card. In some other examples, the card identifier may be notified by the application to the data management module. For example, the display information further includes the card identifier. After generating the card corresponding to the display information, the view preprocessing module may send the card and the card identifier to the data management module. After receiving the card, the data management module may create the sequence list for maintaining the card. The sequence list may include the card identifier of the card. Then, if another card needs to be added to the card stack, a card identifier of the another card may be added to the sequence list.

It should be noted that in this application, an example in which the card is maintained by using the sequence list is used for description. Another manner of maintaining the card is not limited in this application.

S6: The data management module creates a card stack based on the sequence list and the received card.

In some examples, each card stack corresponds to one sequence list, and each sequence list includes at least one card. When the user views the card in the card stack in an interface of the mobile phone, each card in the sequence list is displayed to the user in the card stack based on the sequence list.

S7: The data management module binds the card stack.

In some examples, sequence lists of cards displayed in different card stacks are different. For example, the user creates a plurality of card stacks on the home screen of the mobile phone, and cards included in all the card stacks are different. Therefore, in the card display method provided in this application, each card stack is bound to the data management module, so that the data management module can maintain a sequence list of each card stack, to facilitate management of the card stack.

S8: The data management module controls a card display module to display the card corresponding to the display information in the card stack.

Figure 7A:
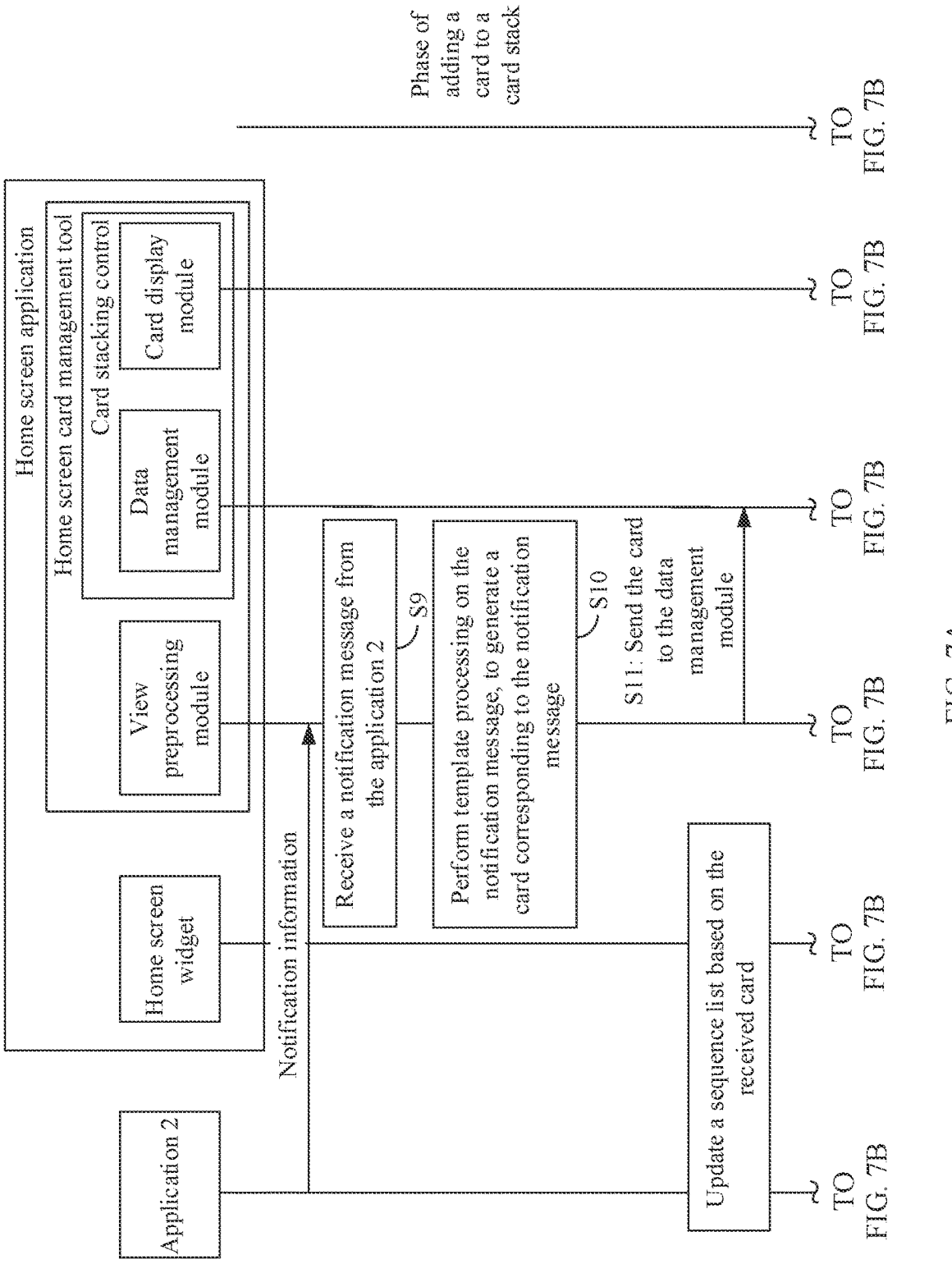
FIG. 7A and FIG. 7B are a schematic flowchart 2 of a notification message display method according to this application.
Figure 7B:
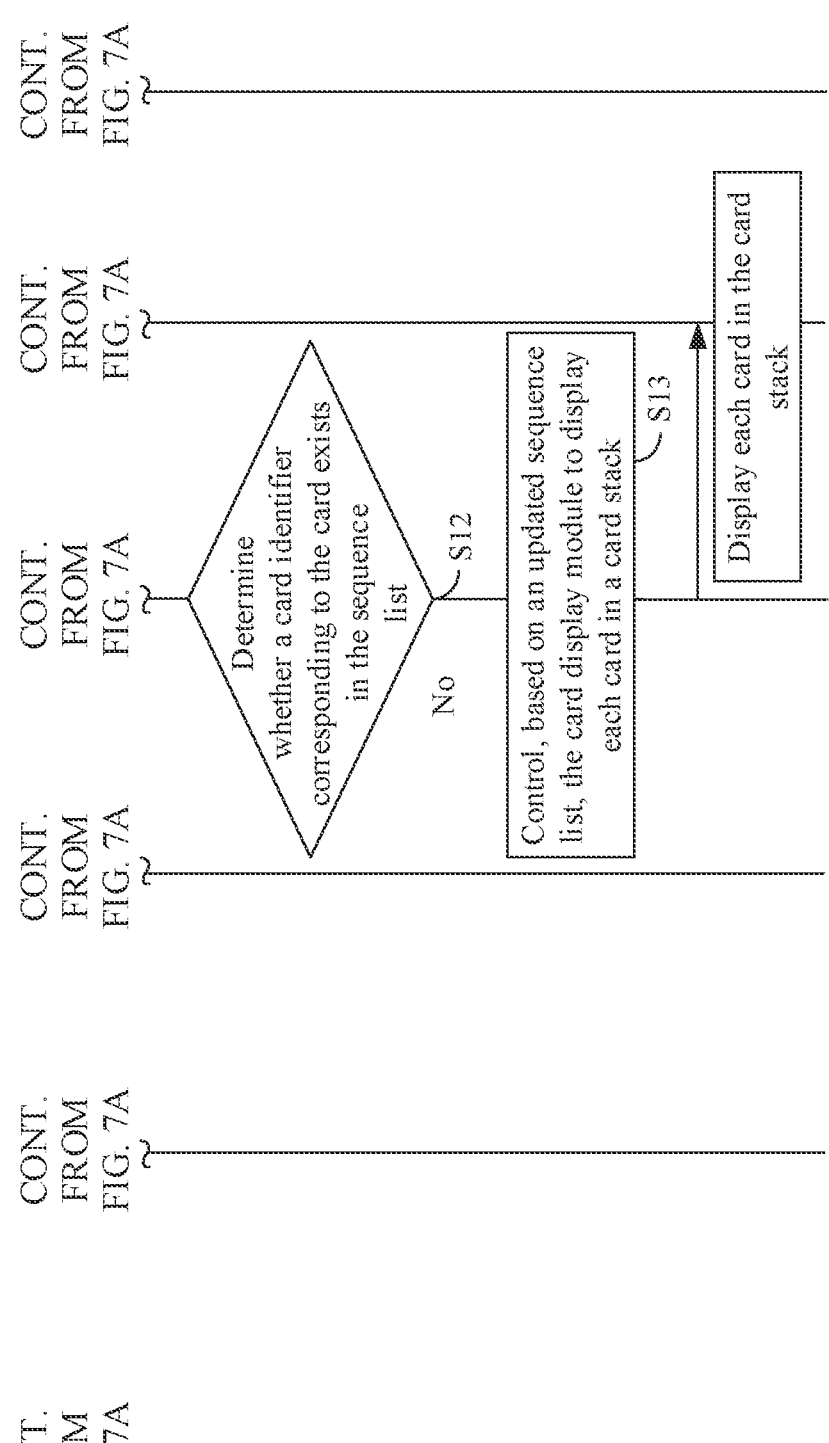

In some examples, after the "procedure of creating a card stack" is performed, the card stack is created for the first time. In this case, the card stack includes only the card corresponding to the display information, for example, the initial card, to identify the display location of the card stack on the home screen. Then, if another card needs to be added to the card stack, the card may be added to the card stack based on the "procedure of adding a card to the card stack", to help the user view the notification message. Specifically, as shown in FIG. 7A and FIG. 7B, the "procedure of adding a card to the card stack" includes S9~S13.

S9: The view preprocessing module receives a notification message from an application 2.

In some examples, the second application may also be referred to as the application 2. When the application 2 provides display information to the view preprocessing module, the second card is a card corresponding to the display information provided by the application 2. When the application 2 provides a notification message to the view preprocessing module, the second card is a card corresponding to the notification message provided by the application 2. The application 2 sends a notification message to the home screen application, for example, the application 2 sends the notification message to the view preprocessing module in the home screen application. The view preprocessing module, the data management module, and the card display module cooperate with each other, to add a card corresponding to the notification message to the card stack. Therefore, the user may view another card, for example, the card corresponding to the notification message, while the user views the card corresponding to the display information. The first application may also be referred to as the application 2, and the application 2 may be the application 1, or may be any application other than the application 1 installed in the mobile phone, for example, a calendar application or a weather application Specifically, the application 2 establishes a communication connection to the home screen application, so that the view preprocessing module in the home screen application can receive the notification message from the application 2. For example, the application 2 establishes a communication connection to the home screen application in a cross-process manner (for example, in an Android system, the application 2 uses a RemoteViews cross-process transfer manner, or in an Android system, the application 2 uses a Binder communication manner). Alternatively, the application 2 establishes a communication connection to the home screen application in a broadcast manner.

For example, with reference to the foregoing example, the cross-process manner is RemoteViews cross-process transfer. The application 2 establishes a communication connection to the view preprocessing module in the home screen application by using RemoteViews cross-process transfer. Therefore, when the application 2 has a notification message, the notification message may be sent to the view preprocessing module in the home screen application. Then, the view preprocessing module, the data management module, and the card display module cooperate with each other, to add a card corresponding to the notification message to the card stack.

It should be noted that the foregoing example is described by using an example in which the application 2 sends the notification message to the home screen application. In some other examples, the application 2 may send a notification message to a notification bar of the mobile phone, and the home screen application may obtain the notification message from the application 2 from the notification bar of the mobile phone. For example, the view preprocessing module in the home screen application periodically synchronizes the notification message in the notification bar of the mobile phone. When it is determined that there is a new notification message, the view preprocessing module, the data management module, and the card display module directly cooperate with each other, to add a card corresponding to the notification message to the card stack, so as to facilitate viewing by the user.

S10: The view preprocessing module performs template processing on the notification message, to generate a card corresponding to the notification message.

S11: The view preprocessing module sends the card to the data management module.

It should be noted that descriptions of S10 are similar to the descriptions of S3 in which "the view preprocessing module performs template processing on the display information, to generate the card corresponding to the display information", and descriptions of S11 are similar to the descriptions of S4. Details are not described herein.

S12: The data management module updates the sequence list when determining, based on the received card, that a card identifier corresponding to the card does not exist in the sequence list.

In some examples, after generating the card corresponding to the display information, the view preprocessing module may send the card to the data management module, so that the data management module maintains the card. When the data management module receives a new card, the data management module allocates a card identifier to the new card, so that the data management module can determine a new sequence list based on a card identifier of each card. For example, the data management module determines whether the card identifier corresponding to the new card exists in the sequence list. When the data management module determines that the card identifier does not exist in the sequence list, an entry of the new card is added to the sequence list, for example, a card name and the card identifier, so that the data management module determines a new sequence list.

With reference to the foregoing example, an example in which the notification message further includes the card identifier and the card identifier is an id is used for description. After the "procedure of creating a card stack" is performed, the card stack is created for the first time. In this case, the card stack includes only the card corresponding to the display information, for example, the initial card, that is, the sequence list includes only an entry of the initial card. For example, the entry includes a card name and an id. The card name of the initial card is a card 1, and the corresponding id is 1. Subsequently, after the view preprocessing module receives the notification message from the application 2, for example, a travel application, the view preprocessing module generates, based on the notification message, the card corresponding to the notification message. For example, the card is referred to as a card 2. Then, the view preprocessing module sends the card 2 and an id to the data management module. In the notification message, the id is 2. When the data management module determines that an entry whose id is equal to 2 does not exist in the sequence list, an entry of the card corresponding to the notification message is added to the sequence list: A card name is the card 2, and the corresponding id is 2. In this way, the data management module completes update of the sequence list.

Specifically, a process in which the data management module allocates the card identifier to the new card in S12 is similar to the process in which the data management module allocates the card identifier to the card in S5. Details are not described herein. A process of generating the sequence list in S12 is similar to the process of generating the sequence list in S5. Details are not described herein.

S13: The data management module controls, based on an updated sequence list, the card display module to display each card in the card stack.

Figure 8:
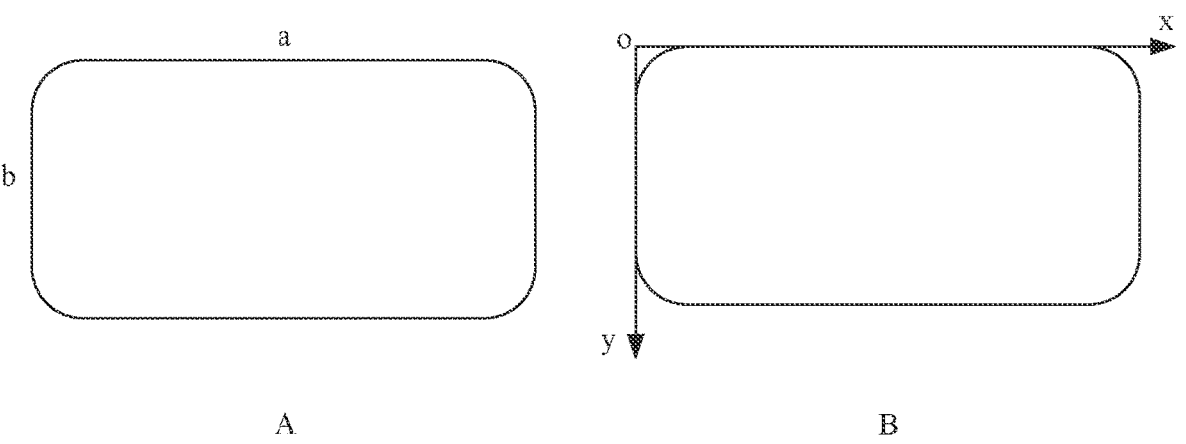
FIG. 8 is a schematic diagram of a card module and a coordinate system in a notification message display method according to this application.
Figure 9:
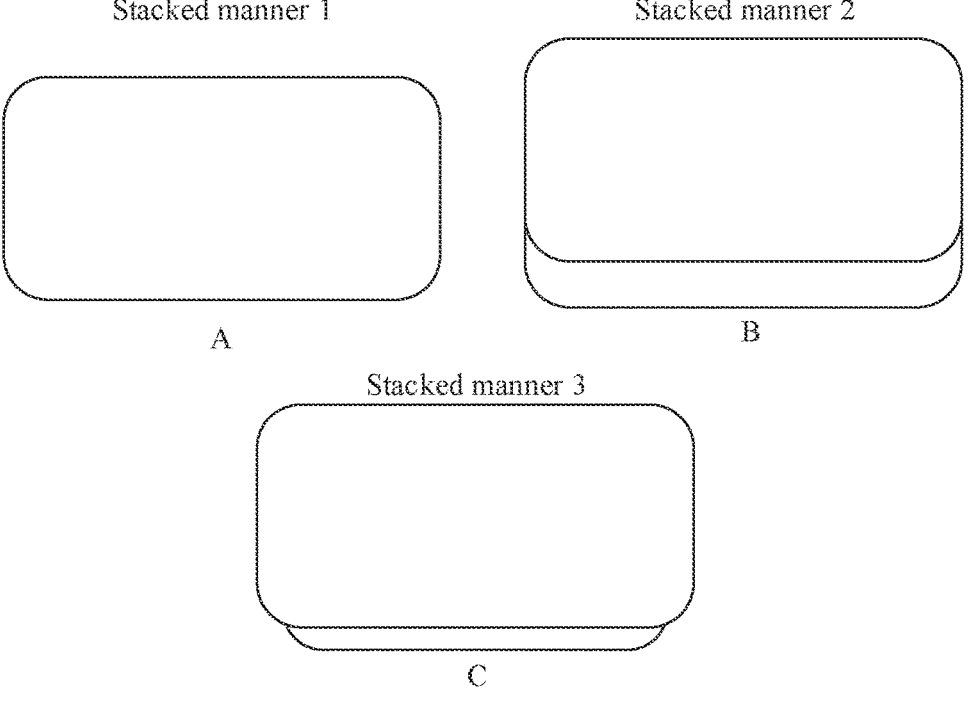
FIG. 9 is a schematic diagram of a stacked manner in a notification message display method according to this application.

In some examples, to remind the user that there are currently a plurality of cards of notification messages, that is, when a quantity of cards displayed in the card stack is greater than or equal to 2, the card display module displays each card in the card stack in a specified manner. For example, the specified manner is a stacked manner or a crossed manner. An example in which the specified manner is the stacked manner is used for description. As shown in A in FIG. 8, a coordinate system shown in B in FIG. 8 is established along an edge a and an edge b of the card. The stacked manner includes at least three manners shown in FIG. 9. The three stacked manners are a stacked manner 1, a stacked manner 2, and a stacked manner 3. With reference to the coordinate system shown in B in FIG. 8, as shown in A in FIG. 9, when the card display module displays each card in the card stack in the stacked manner 1, coordinate origins of all the cards completely overlap, and x axes and y axes of all the cards also completely overlap. With reference to the coordinate system shown in B in FIG. 8, as shown in B in FIG. 9, when the card display module displays each card in the card stack in the stacked manner 2, coordinate origins of all the cards completely overlap, x axes and y axes of all the cards also completely overlap, and a card located below a currently displayed card is translated by a first preset distance, for example, 8 dp, in a y axis direction. With reference to the coordinate system shown in B in FIG. 8, as shown in C in FIG. 9, when the card display module displays each card in the card stack in the stacked manner 3, coordinate origins of all the cards completely overlap, x axes and y axes of all the cards also completely overlap, a card located below a currently displayed card is scaled based on a preset ratio, for example, the preset ratio is 10%, a scaled card is translated by a second preset distance, for example, 8 dp, in an x axis direction of the currently displayed card, and the scaled card is translated by a third preset distance, for example, 8 dp, in a y axis direction of the currently displayed card.

Figure 10A:
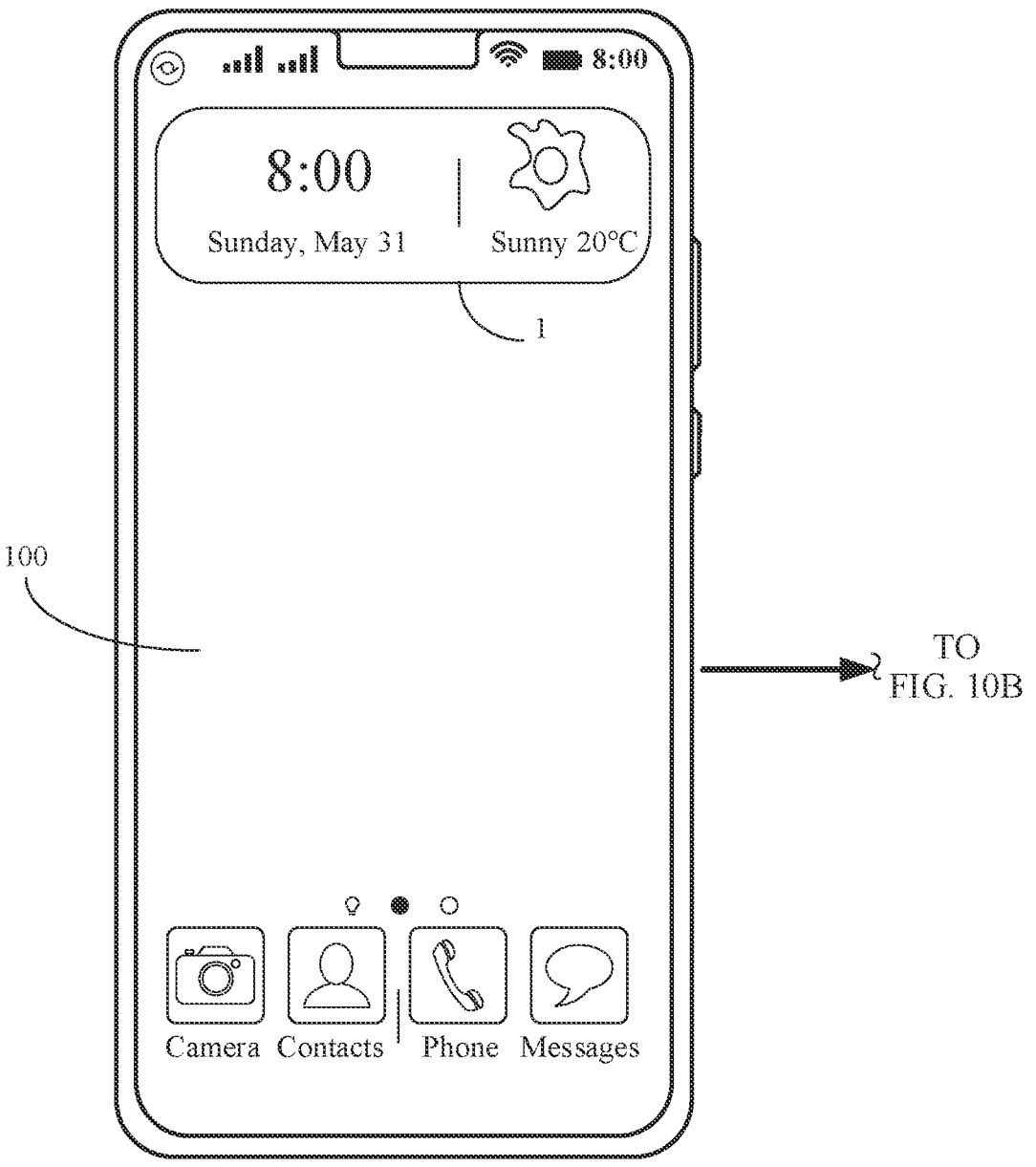
FIG. 10A, FIG. 10B, and FIG. 10C are a schematic diagram 2 of a scenario of a notification message display method according to this application.

For example, with reference to the foregoing example, the application 2 is a travel application, and the card display module displays each card in the card stack in the stacked manner 3. After the "procedure of creating a card stack" is performed, the card 1 corresponding to the display information shown in FIG. 10A is displayed on a home screen

Figure 10B:
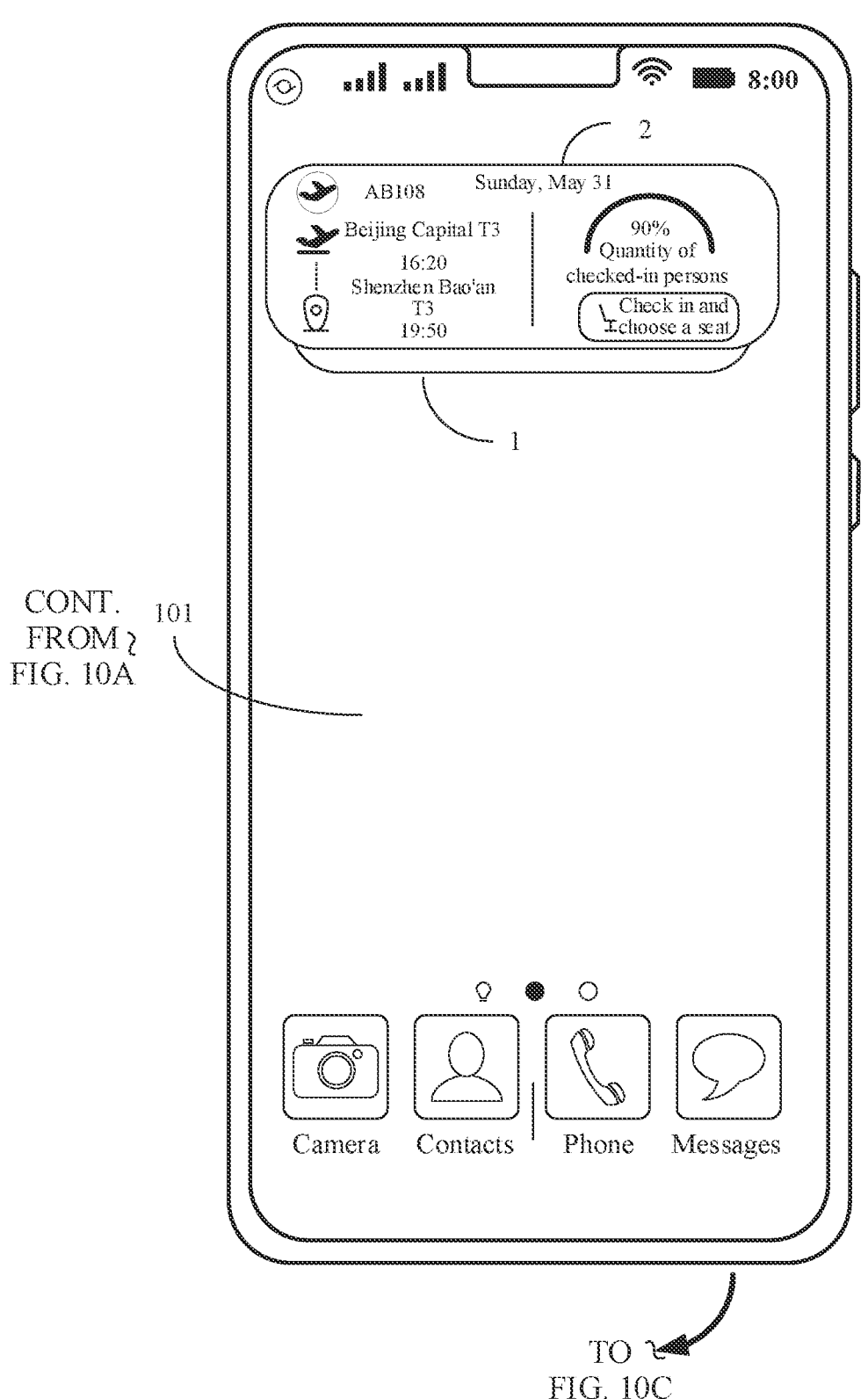
Figure 10C:
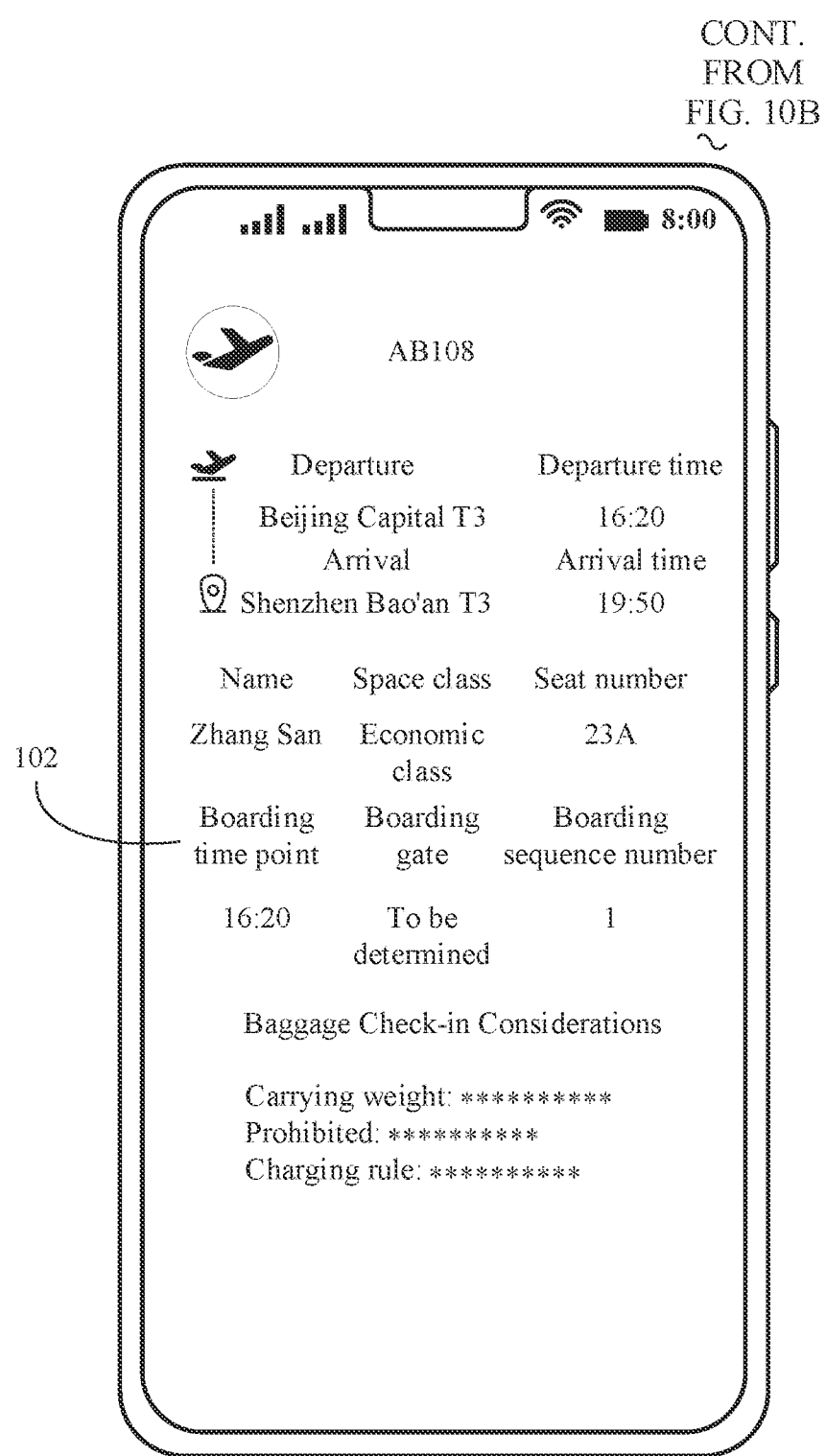

100 of the mobile phone. When receiving the notification message from the travel application, the home screen application performs the "procedure of adding a card to the card stack", to generate the travel card 2 corresponding to the notification message. In this case, the mobile phone displays a home screen 101 shown in FIG. 10B, and the card display module displays each card in the card stack in the stacked manner 3. When the user needs to view details of the travel card 2, the user performs a view operation, for example, taps the travel card 2. In this case, the card display module receives the view operation, for example, the tap operation, on the travel card 2. In response to the tap operation, as shown in FIG. 10C, the mobile phone displays a details page corresponding to the travel card 2.

In some examples, for ease of management, display sizes of all cards displayed on top may be the same. For example, when the display size includes a length and a width, lengths of all the cards displayed on top are equal, and widths of all the cards displayed on top are equal.

Figure 11:
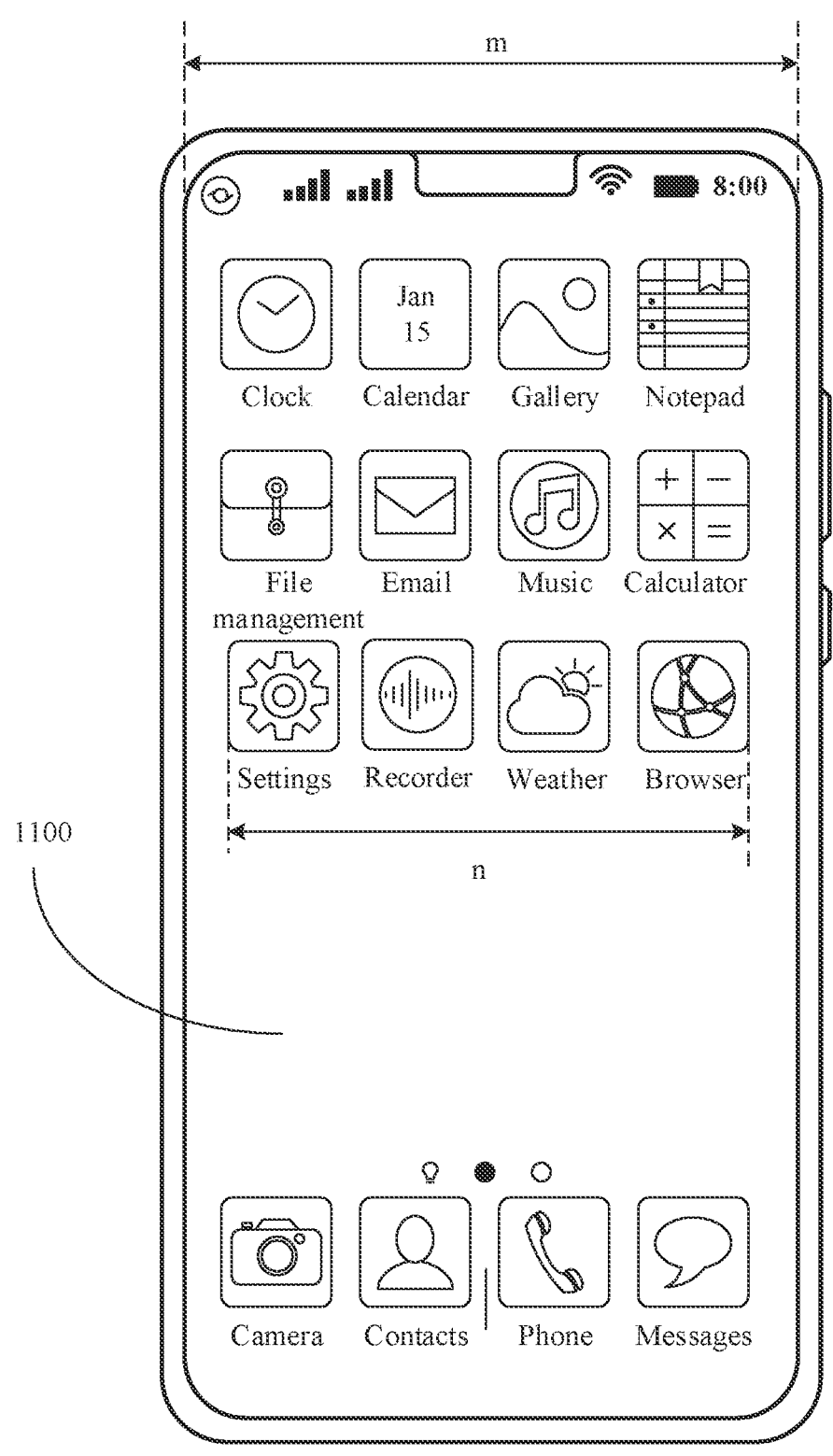
FIG. 11 is a schematic diagram 3 of a scenario of a notification message display method according to this application.

As shown in C in FIG. 6, a length of the card template is k, and a width of the card template is 1. The length of the card template is less than or equal to a length of a display of the mobile phone. The mobile phone displays an interface 700 shown in FIG. 7A and FIG. 7B, and the length of the display is equal to m. That is, k≤m. In some examples, to ensure aesthetics of the home screen, the length of the card template is equal to a distance between a first application icon and a last application icon that are located in a same row in a length direction of the display. For example, the distance between the first application icon and the last application icon is equal to a distance between a side that is of the first application icon and that is close to an outer side of the display and a side that is of the last application icon and that is close to the outer side of the display. For example, in an interface 1100 shown in FIG. 11, in the length direction of the display, when determining is performed based on a left-to-right sequence, and when the first application icon located in the same row is a settings application icon, the last application icon is a browser application icon. That is, the length of the card template is equal to n, that is, k is equal to n.

In addition, to avoid a case in which inconvenience is brought to viewing by the user because an excessively large quantity of cards are displayed in the card stack, the card display method provided in this application may further include the "procedure of deleting a card from the card stack". The "procedure of deleting a card from the card stack" includes a plurality of manners for deleting the card from the card stack. For example, "in a manner 1 of deleting a card from the card stack", the user may delete an unnecessary card, in a manner 2 of deleting a card from the card stack, the application 2 deletes the card corresponding to the notification message sent by the application 2 from the card stack, and in a manner 3 of deleting a card from the card stack, a system notification service deletes a card corresponding to a notification message sent by the system notification service from the card stack, to help the user view the card.

Figure 12:
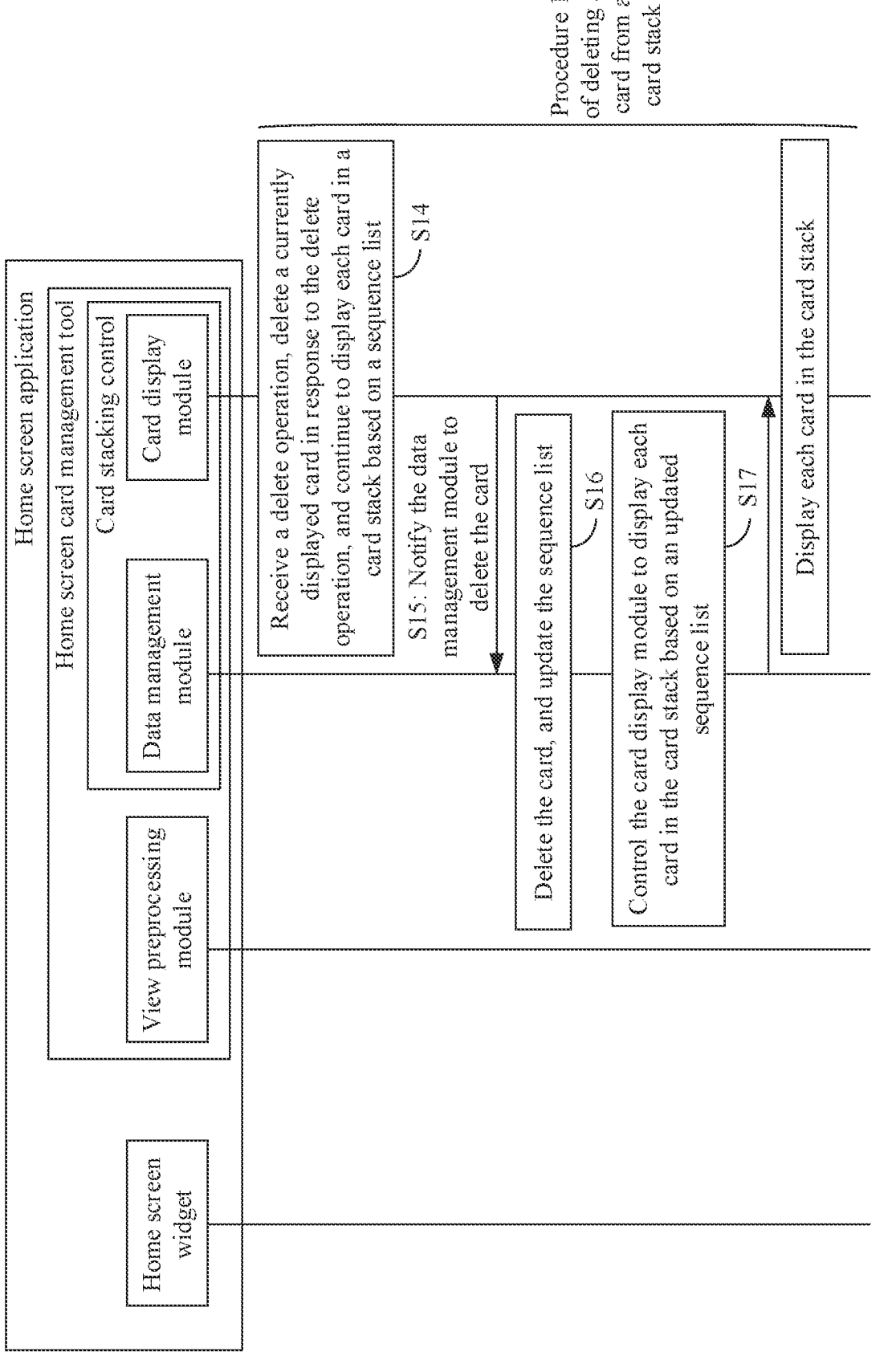
FIG. 12 is a schematic flowchart 3 of a notification message display method according to this application.

Specifically, as shown in FIG. 12, the "manner 1 of deleting a card from the card stack" may include S14-S17.

S14: The card display module receives a delete operation, deletes a currently displayed card in response to the delete operation, and continues to display each card in the card stack based on the sequence list.

In some examples, when the user views a card in the card stack, and determines that the currently viewed card is no longer needed, the user may perform a delete operation on the mobile phone. The card display module receives the delete operation, deletes the currently displayed card in response to the delete operation, and keeps displaying each card in the card stack based on the sequence list, to help the user view the card. With reference to the foregoing example, an example in which the card display module displays each card in the card stack in the stacked manner 3 is used for description. For example, the sequence list includes two cards: the card 1 and the card 2. When the card currently displayed by the card display module is the card 2, and the card display module receives the delete operation, it indicates that the user no longer needs the card 2. The card display module deletes the card 2 in response to the delete operation. The card display module keeps displaying each card in the card stack based on the sequence list. Only the card 1 remains in the card stack. Therefore, the card display module no longer displays the card in the stacked manner. For example, the card display module displays the card 1 in a manner shown in FIG. 10A.

For example, the delete operation may be an operation in which a movement distance of sliding the currently displayed card in a predetermined direction is greater than a distance threshold, or an operation in which duration of pressing the currently displayed card is greater than a time threshold. The predetermined direction may be a direction from the card to a left edge of the display of the mobile phone, or the predetermined direction may be a direction from the card to a right edge of the display of the mobile phone. For example, the card display module deletes a card from the card stack when receiving an operation of sliding from the card to the left edge of the display of the mobile phone, or deletes a card from the card stack when receiving an operation of sliding from the card to the right edge of the display of the mobile phone. With reference to the foregoing example, an example in which the delete operation is that the movement distance of the currently displayed card in the predetermined direction is greater than the distance threshold and the predetermined direction may be the x axis direction is used for description. For each card displayed in the card stack, the coordinate system shown in B in FIG. 8 is established, and the movement distance of the card in the predetermined direction is a movement distance of a central point of the card in the x axis direction. When determining that the movement distance of the central point of the card in the x axis direction is greater than the distance threshold, the card display module deletes the currently displayed card. It is assumed that there are two cards in the sequence list: the card 1 and the card 2. It is specified that the card 2 is currently displayed on top, and the card 1 is displayed after the card 2 is deleted. The card display module cyclically displays each card in the card stack. When the card 2 is deleted, the card 1 needs to be displayed. Therefore, after deleting the card 2, the card display module displays the card 1.

Figure 13A:
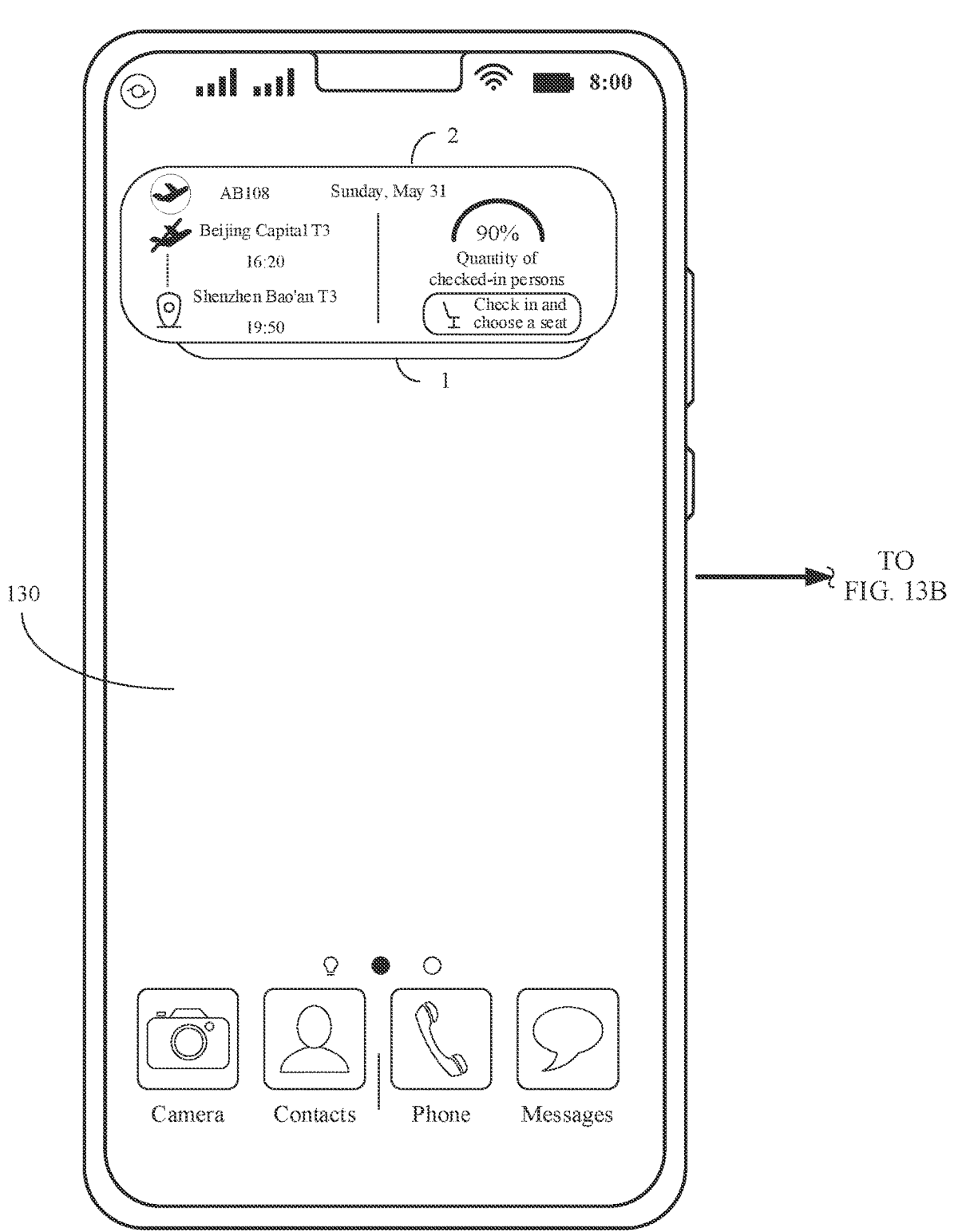
FIG. 13A, FIG. 13B, FIG. 13C, FIG. 13D, FIG. 13E, and FIG. 13F are a schematic diagram 4 of a scenario of a notification message display method according to this application.
Figures 13A, 13B, 13C:
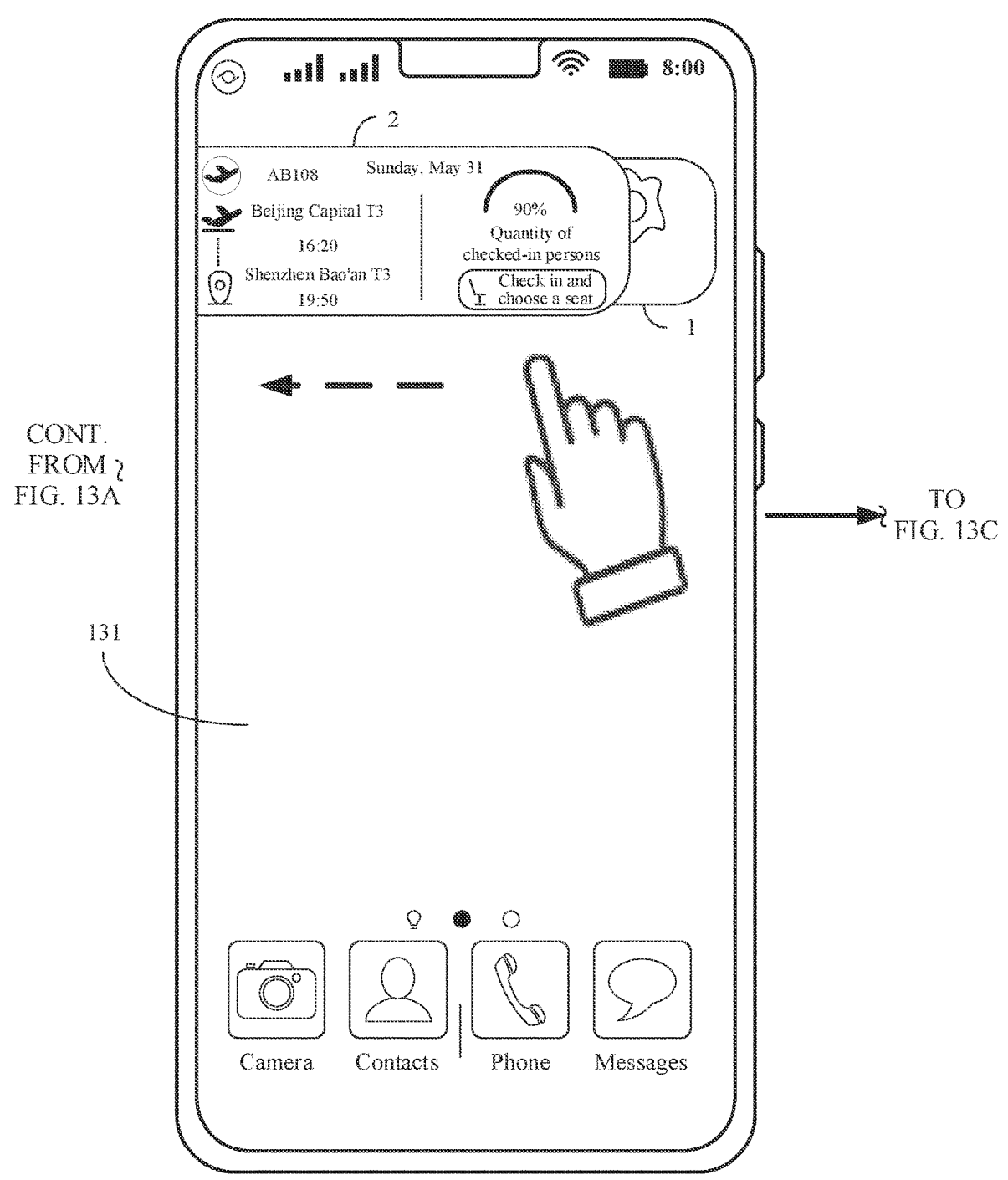
Figure 13C:
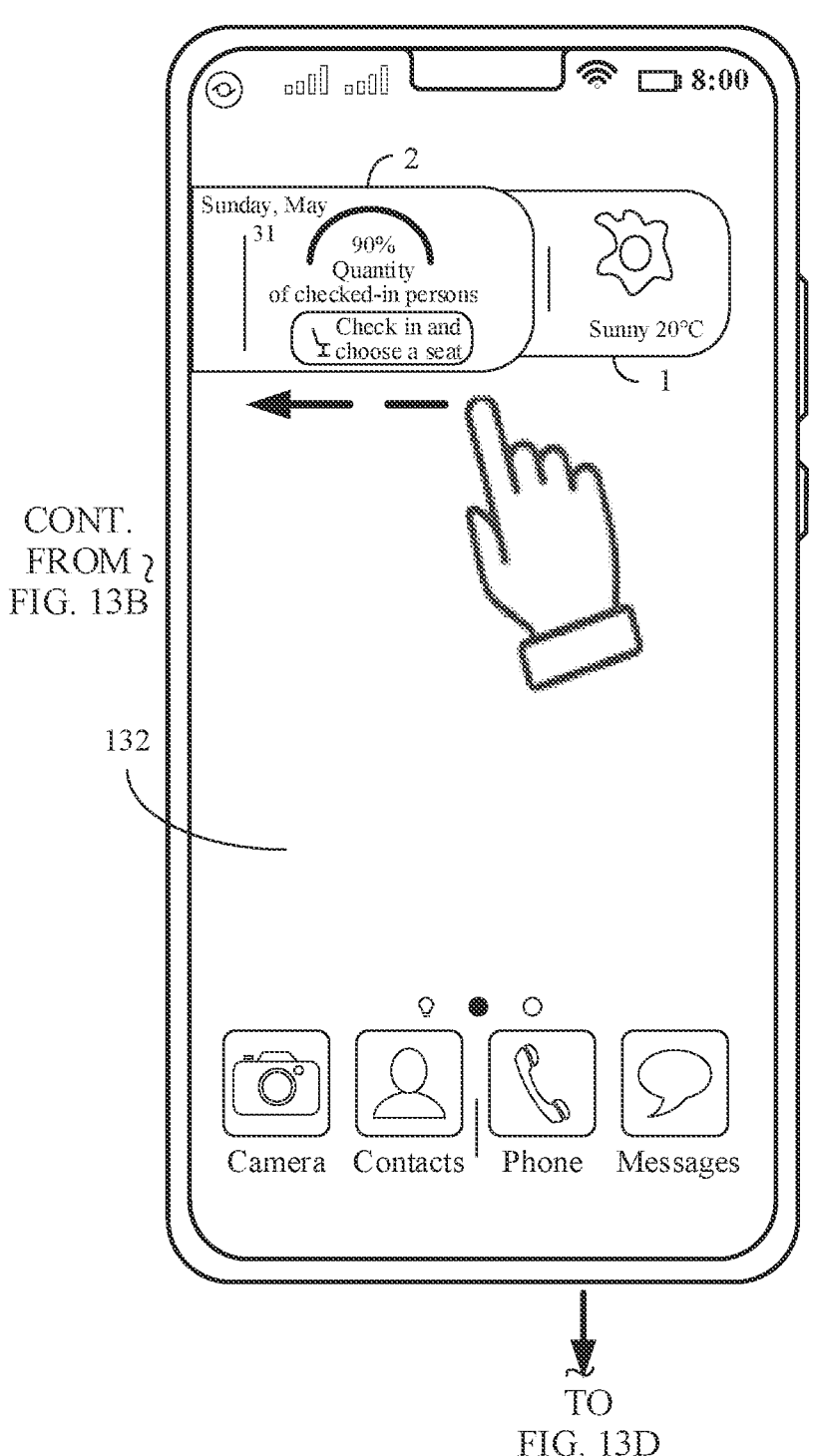
Figure 13D:
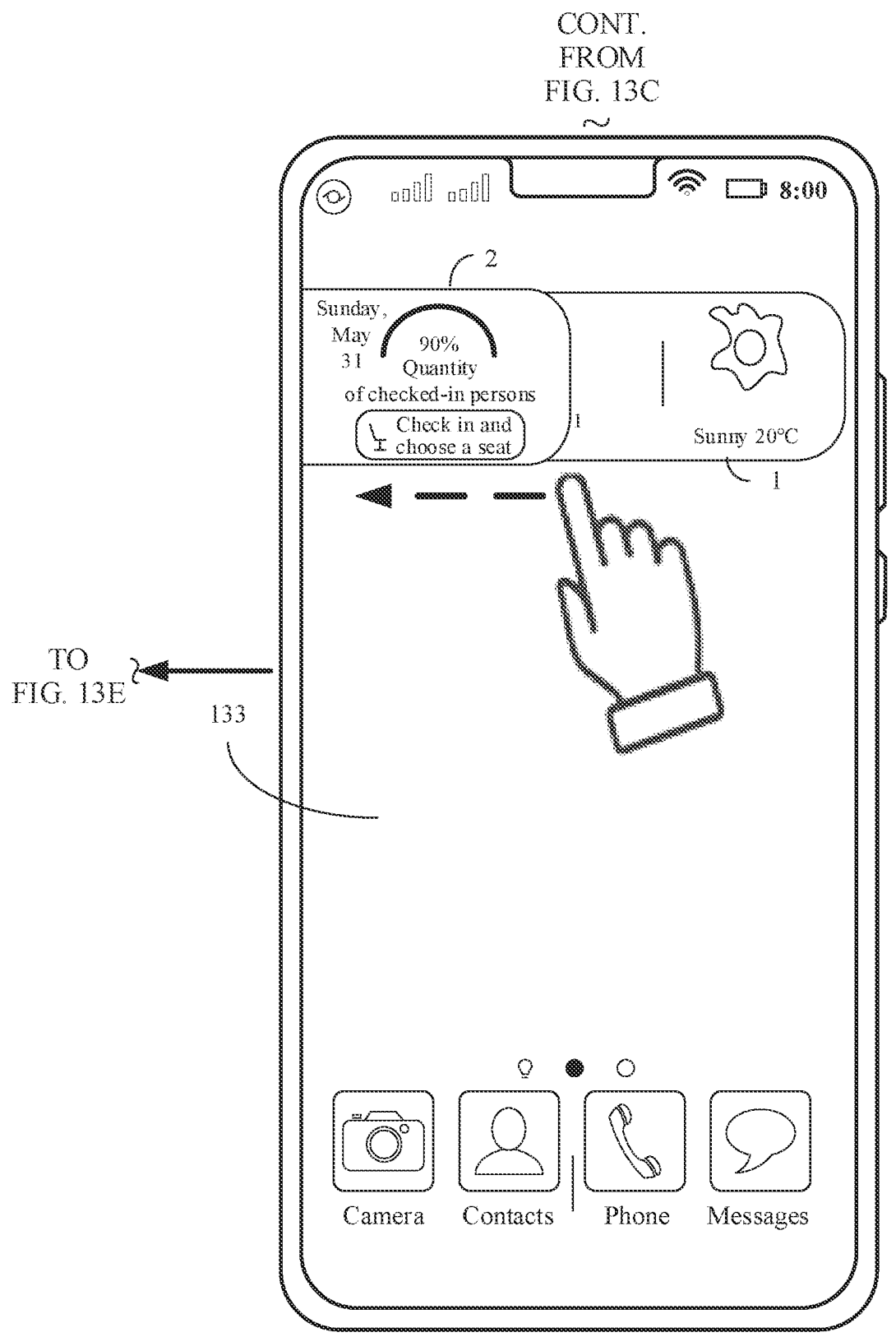
Figure 13E:
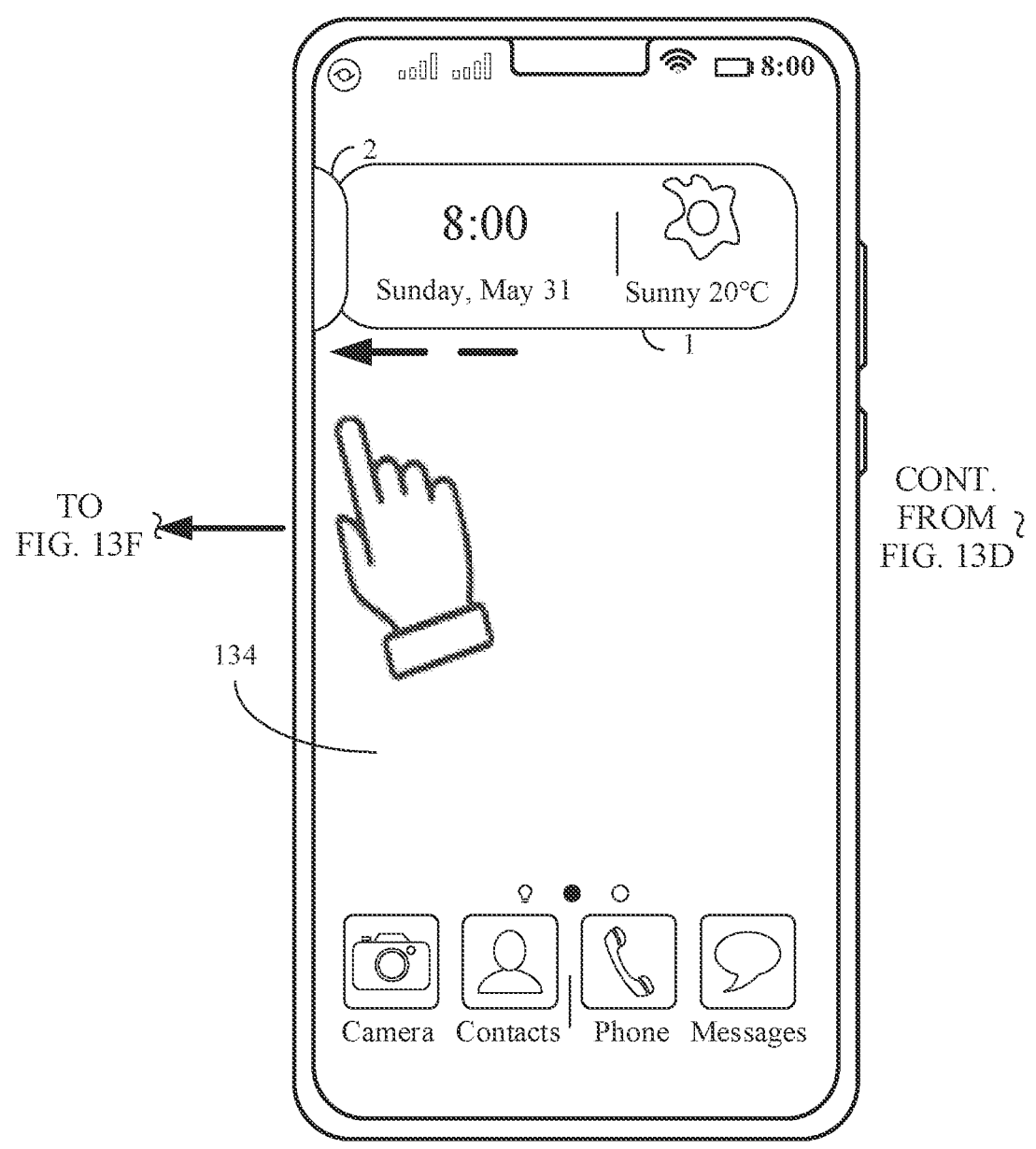
Figure 13F:
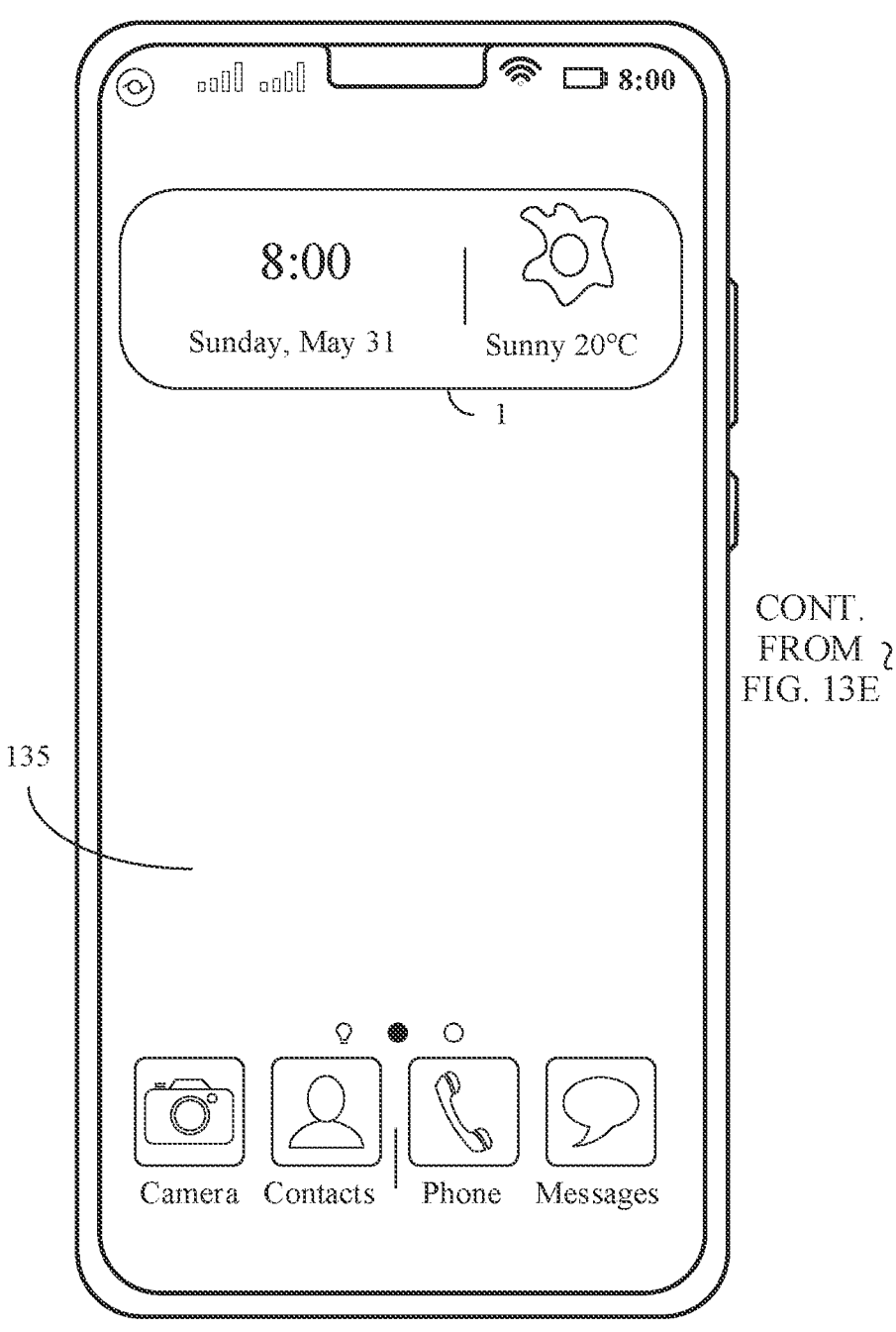

With reference to the foregoing example, an example in which the central point of the card is a central point of a rectangle corresponding to the card is used for description. As shown in FIG. 13A, cards currently displayed in the card stack in an interface 130 are the card 2 and the card 1. When the user no longer needs the travel card, as shown in FIG. 13B, the user may drag the card 2 in an interface 131 of the mobile phone to move in the predetermined direction. In this case, the card display module determines that a movement distance of the card 2 in the predetermined direction is less than or equal to the distance threshold, and the card display module does not delete the card 2. As shown in FIG. 13C, the user may continue to drag the card 2 in an interface 132 of the mobile phone to move in the predetermined direction. In this case, the card display module determines that the movement distance of the card 2 in the predetermined direction is less than or equal to the distance threshold, and the card display module does not delete the card 2. As shown in FIG. 13D, the user may continue to drag the card 2 in an interface 133 of the mobile phone to move in the predetermined direction. In this case, the card display module determines that the movement distance of the card 2 in the predetermined direction is less than or equal to the distance threshold, and the card display module does not delete the card 2. As shown in FIG. 13E, the user may continue to drag the card 2 in an interface 134 of the mobile phone to move in the predetermined direction. In this case, the card display module determines that the movement distance of the card 2 in the predetermined direction is greater than the distance threshold, and the card display module deletes the card 2. Then, as shown in FIG. 13F, the card display module continues to display each card in the card stack based on the sequence list in an interface 135. For example, the card is the card 1. Therefore, the user may delete an unnecessary card.

The foregoing example is described by using an example in which the card display module receives the delete operation, deletes the currently displayed card in response to the delete operation, and continues to display each card in the card stack based on the sequence list. In some other examples, the card display module receives a switching operation, and in response to the switching operation, switches the currently displayed card to a next card that needs to be displayed, to keep displaying each card in the card stack based on the sequence list. For example, the switching operation is an operation in which a movement distance of sliding the currently displayed card in a specified direction is greater than a distance threshold. The specified direction may be a direction from the card to an upper edge of the display of the mobile phone, or the specified direction may be a direction from the card to a lower edge of the display of the mobile phone. For example, the card display module receives an operation of sliding from the card to the upper edge of the display of the mobile phone, and switches the currently displayed card to the next card that needs to be displayed, to keep displaying each card in the card stack based on the sequence list. Alternatively, the card display module receives an operation of sliding from the card to the lower edge of the display of the mobile phone, and switches the currently displayed card to the next card that needs to be displayed, to keep displaying each card in the card stack based on the sequence list.

Specifically, in some examples, to distinguish between the delete operation and the switching operation, the predetermined direction is perpendicular to the specified direction.

S15: The card display module notifies the data management module to delete the card.

In some examples, the card identifier corresponds to the card. Therefore, the card display module may send the card identifier to the data management module, so that after receiving the card identifier sent by the card display module, the data management module deletes an entry corresponding to the card identifier, to update the sequence list.

S16: The data management module deletes the card, and updates the sequence list.

In some examples, the card display module sends the card identifier to the data management module, so that after receiving the card identifier sent by the card display module, the data management module deletes, based on the card identifier sent by the card display module, the entry corresponding to the card identifier, for example, a card name and the card identifier, to update the sequence list. For example, with reference to the foregoing example in S12, after the data management module updates the sequence list, the card display module receives the delete operation, deletes the currently displayed card, and keeps displaying each card in the card stack based on the sequence list. The card display module notifies the data management module to delete a card corresponding to an id. For example, the id is equal to 2. After receiving the card identifier sent by the card display module, the data management module determines that an entry whose id is equal to 2 exists in the sequence list, and the data management module deletes the entry whose id is equal to 2. In this way, the data management module completes update of the sequence list.

S17: The data management module controls the card display module to display each card in the card stack based on an updated sequence list.

It should be noted that an implementation process of S17 is similar to the implementation process of S13. Details are not described herein.

Figure 14:
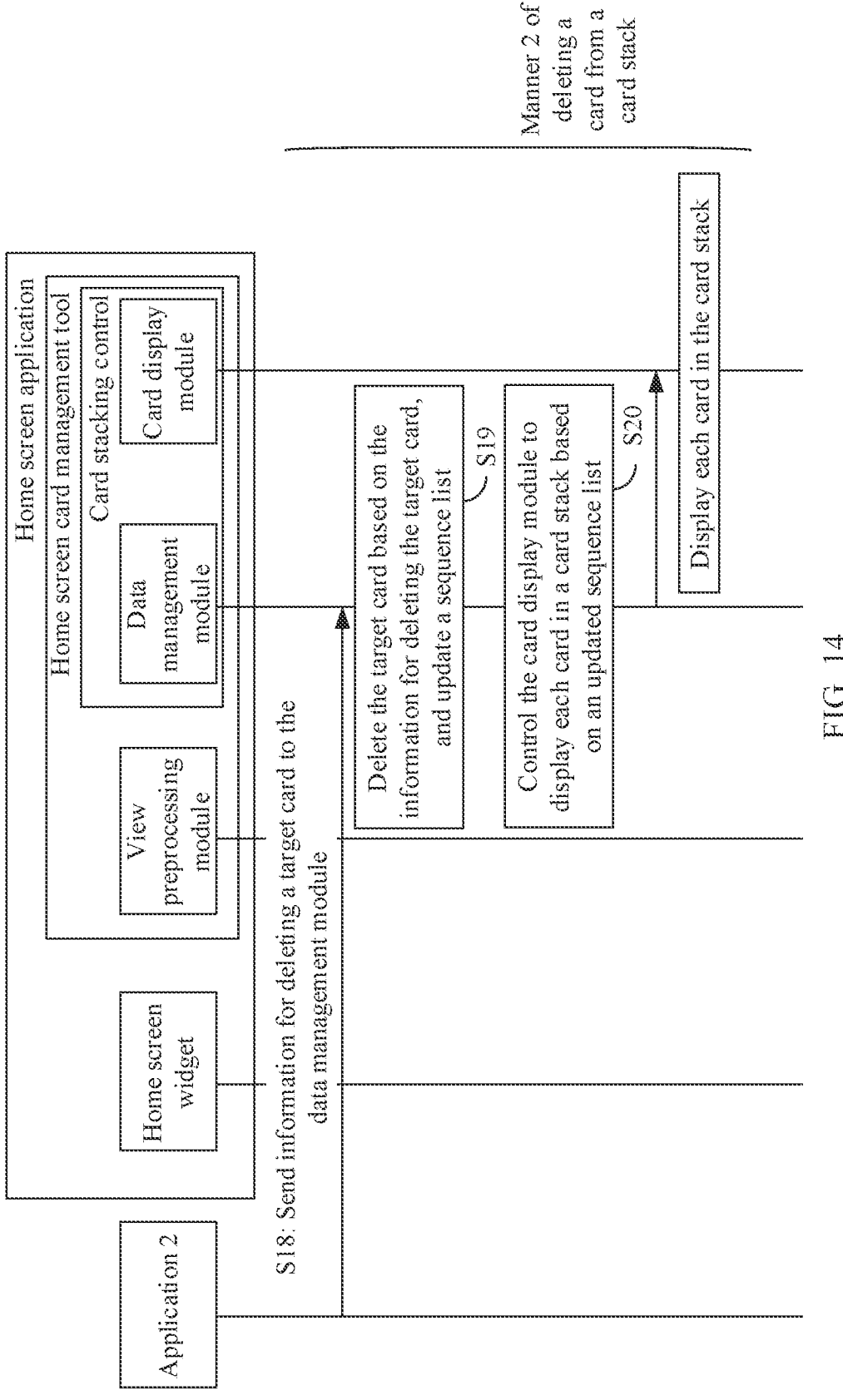
FIG. 14 is a schematic flowchart 4 of a notification message display method according to this application.

Specifically, as shown in FIG. 14, the manner 2 of deleting a card from the card stack may include S18~S20.

S18: The application 2 sends information for deleting a target card to the data management module.

In some examples, the application 2 can delete only a card corresponding to the application 2. The card corresponding to the application 2 is a card that corresponds to a notification message and that is generated after the application 2 sends the notification message to the view preprocessing module and the view preprocessing module performs template processing on the notification message.

In some examples, a card, for example, a travel card, has a display period. When the display period of the travel card ends, the travel card is still displayed in the card stack. Consequently, there are a relatively large quantity of cards in the card stack, and it is inconvenient for the user to view the card. Therefore, in the card display method provided in this application, when determining that a display period of the card corresponding to the application 2 ends, the application 2 sends the information, for example, a card identifier of the target card, for deleting the target card to the data management module. Therefore, the data management module deletes, based on the card identifier sent by the application 2, an entry corresponding to the card identifier, for example, a card name and the card identifier. In this way, the data management module completes update of the sequence list. A quantity of cards in the card stack is reduced, and it is convenient for the user to view the card.

S19: The data management module deletes the target card based on the information for deleting the target card, and updates the sequence list.

In some examples, each card corresponds to one card identifier, and the information for deleting the target card includes the card identifier of the target card. In this way, after receiving the card identifier of the target card, the data management module deletes the entry corresponding to the card identifier, and updates the sequence list. Specifically, an implementation process of S19 in which "the data management module deletes the target card and updates the sequence list" is similar to the implementation process of S13 in which "the data management module deletes the card and updates the sequence list". Details are not described herein.

S20: The data management module controls the card display module to display each card in the card stack based on an updated sequence list.

It should be noted that an implementation process of the manner 2 of deleting a card from the card stack is similar to the implementation process of the manner 1 of deleting a card from the card stack. Details are not described herein.

Figure 15A:
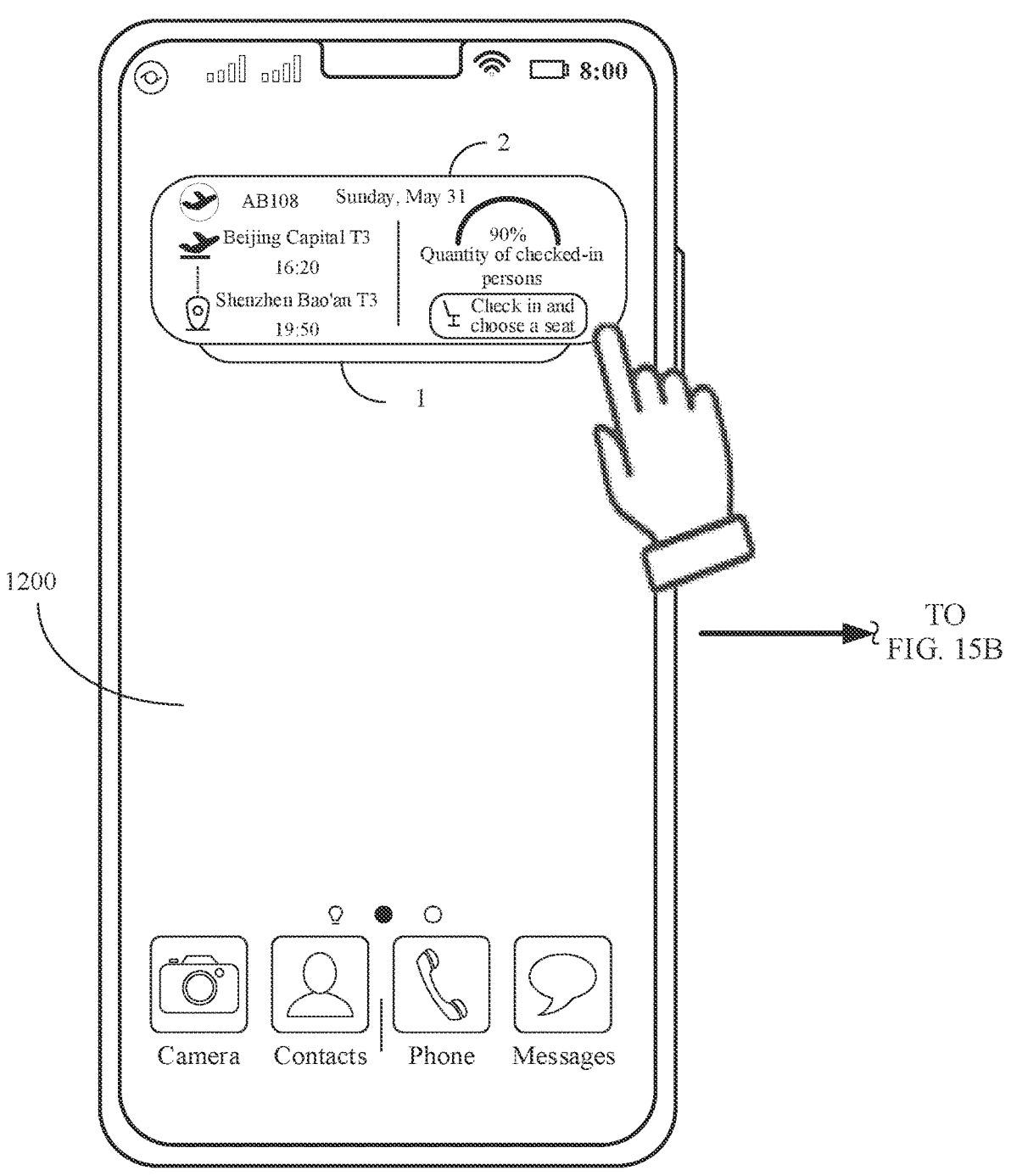
FIG. 15A, FIG. 15B, and FIG. 15C are a schematic diagram 5 of a scenario of a notification message display method according to this application.
Figures 15A, 15B:
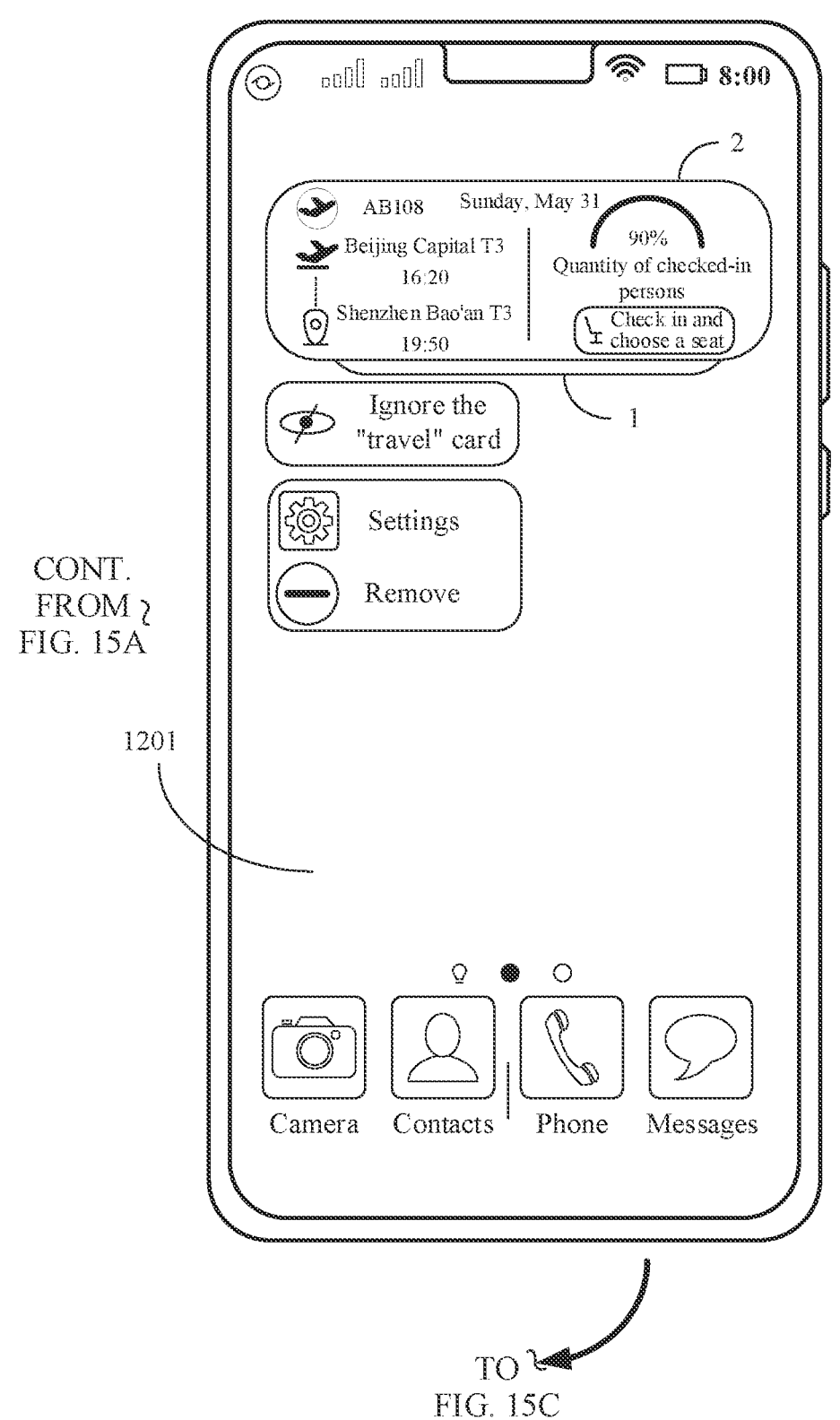
Figures 15B, 15C:
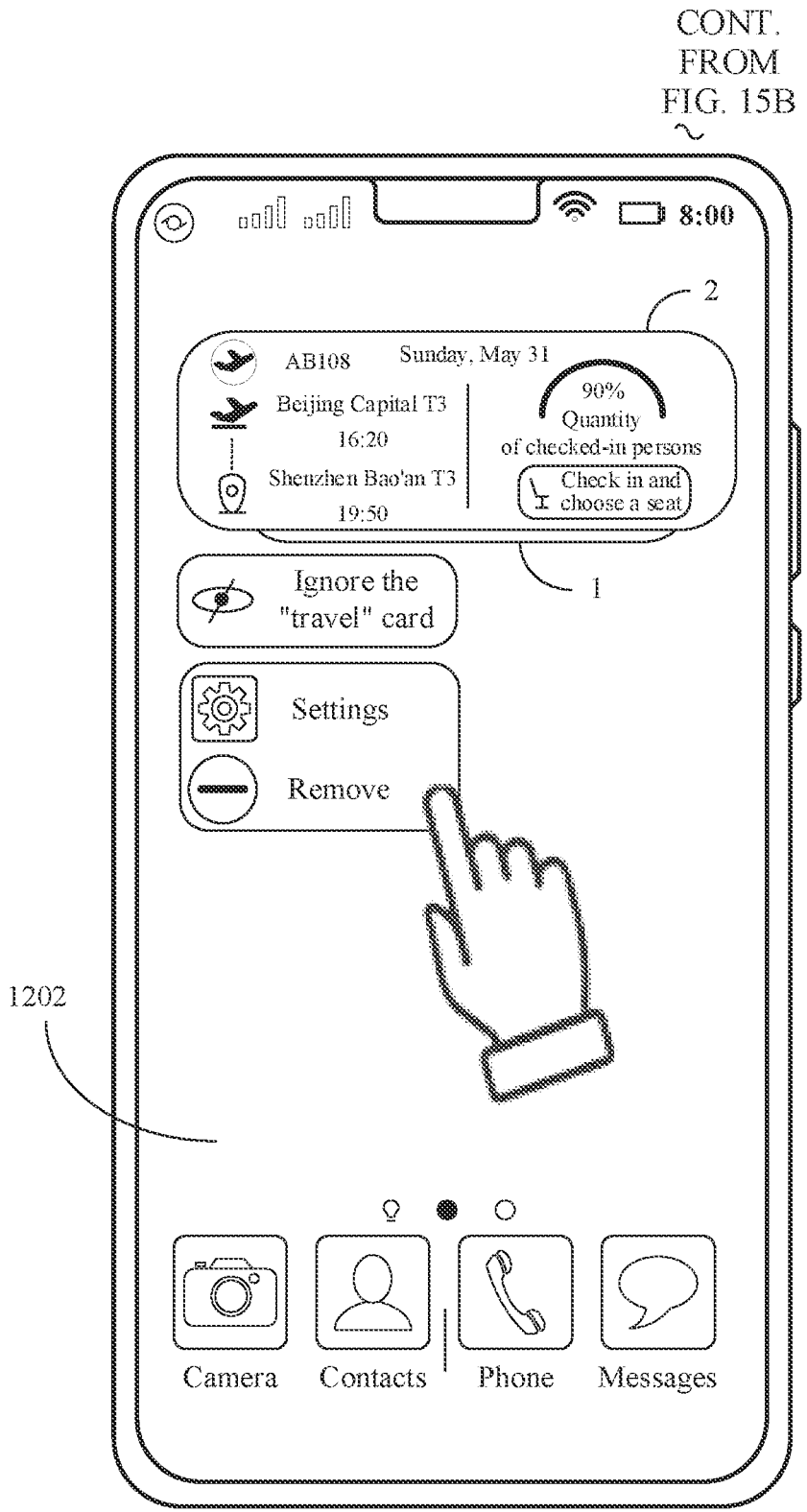

The foregoing example is described by using an example in which the delete operation may be the operation in which the movement distance of sliding the currently displayed card in the predetermined direction is greater than the distance threshold. In some other examples, the delete operation may be the operation in which the duration of pressing the currently displayed card is greater than the time threshold. An example in which the currently generated sequence list includes the card 2 and the card 1, the mobile phone displays the card 2 on top of a current interface, and the delete operation may be the operation in which the duration of pressing the currently displayed card is greater than the time threshold is used for description. When the user no longer needs the card 2, as shown in FIG. 15A, the user presses the card 2 in an interface 1500 displayed on the mobile phone. When duration of pressing the card 2 by the user is greater than the time threshold, the card display module prompts the user whether to delete the card 2. As shown in FIG. 15B, there is an icon used to prompt the user to ignore the "travel" card, a settings icon, and a remove icon in an interface 1501 of the mobile phone. The user selects (for example, performs a tap operation on) the icon used to ignore the "travel" card, and then another "travel" card is no longer displayed in the card stack. After selecting the settings icon, the user may set the "travel" card. For example, items to be set include a display ranking and display duration. As shown in FIG. 15C, after the user selects the remove icon for the mobile phone in an interface 1502 displayed on the mobile phone, the card display module deletes the card 2 in the manner 1 of deleting a card from the card stack. In this way, only the card 1 is currently displayed in the interface of the mobile phone. In this case, if the user continues to delete the card 1 by performing the foregoing operation, the card 1 that identifies the display location of the card stack on the home screen is deleted. Therefore, the user cannot see the corresponding card stack on the home screen, that is, the card stack is deleted.

It should be noted that an implementation process of S20 is similar to the implementation process of S13. Details are not described herein.

Figure 16A:
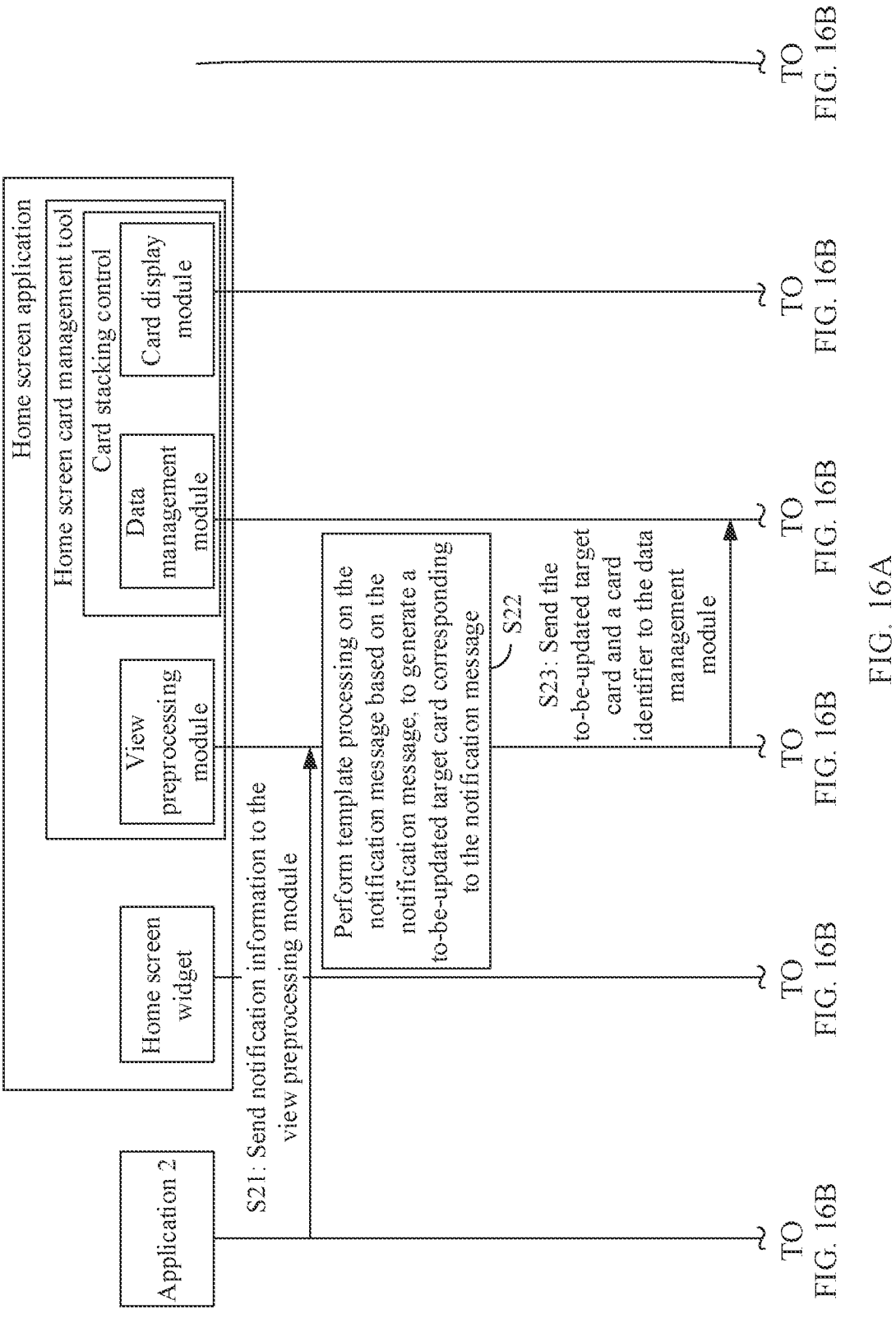
FIG. 16A and FIG. 16B are a schematic flowchart 5 of a notification message display method according to this application.
Figure 16B:
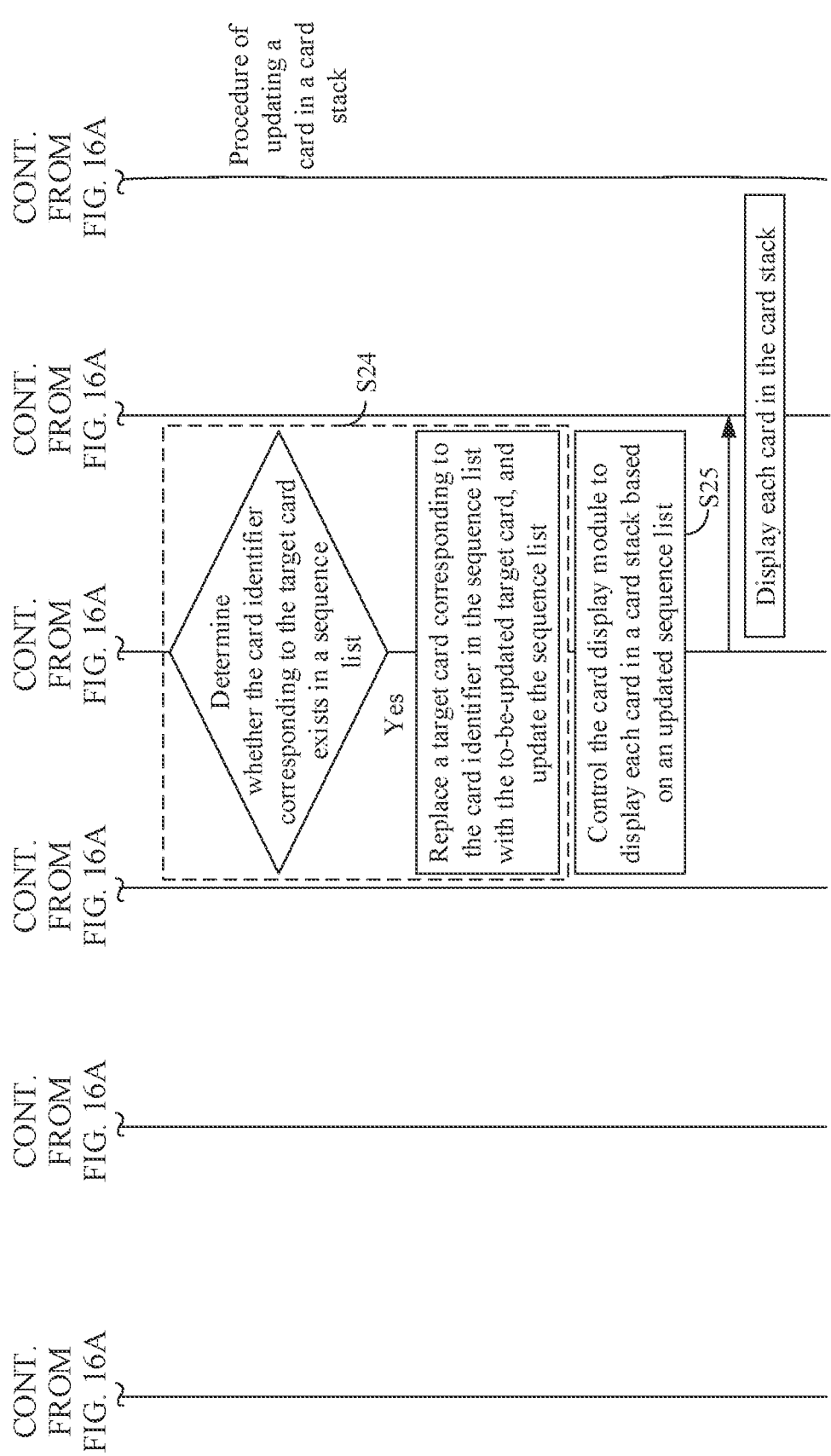

Specifically, as shown in FIG. 16A and FIG. 16B, the procedure of updating a card in the card stack may include S21-S25.

S21: The application 2 sends a notification message to the view preprocessing module.

In some examples, each card corresponds to one card identifier, and the notification message further includes a card identifier. In this way, after receiving the notification message from the application 2, the view preprocessing module determines a to-be-updated target card based on the notification message. Then, the view preprocessing module sends the to-be-updated target card and the card identifier to the data management module. The data management module replaces the target card corresponding to the card identifier in the sequence list with the to-be-updated target card based on the to-be-updated target card and the card identifier, to update the target card, so as to update the sequence list.

S22: The view preprocessing module performs template processing on the notification message based on the notification message, to generate the to-be-updated target card corresponding to the notification message.

It should be noted that an implementation process of S22 is similar to the implementation process of S3. Details are not described herein.

S23: The view preprocessing module sends the to-be-updated target card and the card identifier to the data management module.

S24: When determining, based on the to-be-updated target card and the card identifier, that the card identifier corresponding to the target card exists in the sequence list, the data management module replaces the target card corresponding to the card identifier in the sequence list with the to-be-updated target card, and updates the sequence list.

In some examples, after receiving the card identifier, the data management module determines whether the card identifier exists in the sequence list. When determining that the card identifier exists in the sequence list, the data management module replaces the existing card corresponding to the card identifier in the sequence list with the currently received card corresponding to the card identifier. In this way, the "procedure of updating a card in the card stack" can be implemented. With reference to the foregoing example, an example in which the notification message further includes the card identifier and the card identifier is an id is used for description, and weather data in a weather card needs to be periodically updated. In this way, the view preprocessing module periodically receives a notification message sent by the weather application. The view preprocessing module performs template processing on the notification message, to obtain a template-processed card. The view preprocessing module sends the template-processed card and the card identifier (the id is equal to 1) to the data management module. When determining that the card identifier (the id is equal to 1) exists in the sequence list, the data management module replaces an existing card corresponding to the card identifier (the id is equal to 1) in the sequence list with the card corresponding to the currently received card identifier (the id is equal to 1). In this way, the "procedure of updating a card in the card stack" can be implemented. In addition, information for updating the target card in this application may also be referred to as a card identifier.

It should be noted that when the card identifier is generated by the data management module, the data management module needs to notify the application 2 of the card identifier corresponding to the card. In this way, when the application 2 needs to perform the "procedure of updating a card in the card stack", the card may be updated based on the card identifier.

The foregoing example is described by using an example in which when determining that the card identifier exists in the sequence list, the data management module replaces the existing card corresponding to the card identifier in the sequence list with the currently received card corresponding to the card identifier. In some other examples, when determining that the card identifier exists in the sequence list, the data management module replaces a view of the existing card corresponding to the card identifier in the sequence list with a view of the currently received card corresponding to the card identifier, so that a new card does not need to be generated again to replace the existing card.

S25: The data management module controls the card display module to display each card in the card stack based on an updated sequence list.

It should be noted that an implementation process of S25 is similar to the implementation process of S13. Details are not described herein.

The foregoing example is described by using an example in which all notification messages are displayed in the card stack on the home screen in a form of a card. In some other examples, the user may select an application for which a notification message is to be displayed in the card stack in a form of a card. For example, the user may set, in a home screen card management tool, the application for which a notification message is to be displayed in the card stack in a form of a card. In this way, a notification message from an application that is not set in the home screen card management tool and for which a notification message is not to be displayed in the card stack in a form of a card may be displayed in a notification bar of the mobile phone, to implement hierarchical display of the notification message, so as to provide a notification message and a reminder with a highest priority to the user at a required time. For example, a travel message is more important than an information message. In this case, the travel application may be added to a whitelist in the home screen card management tool, so that after receiving a notification message from the travel application, the home screen application displays a card corresponding to the notification message in the card stack. A notification message from an information application is still displayed in the notification bar, to help the user view the notification message.

For ease of understanding, the notification message display method provided in this application is explained with reference to the "procedure of creating a card stack", the "procedure of adding a card to the card stack", the "procedure of deleting a card from the card stack", and the "procedure of updating a card in the card stack" included in the notification message display method provided in this application. An example in which the electronic device is a mobile phone, the application 1 is a weather application, and the application 2 is a calendar application is used for description. As shown in FIG. 5B, the user performs a two-finger pinch operation in an interface 502 of the mobile phone. After the home screen application receives the two-finger pinch operation performed by the user, the mobile phone may display, in response to the operation, an interface 503 that includes the home screen widget and that is shown in FIG. 5C. After receiving a select operation, the home screen widget may display, in response to the operation, an interface 504 that includes a card stack and that is shown in FIG. 5D. Subsequently, the user may perform a tap operation on the card stack on the mobile phone. After the mobile phone receives the tap operation on the card stack, the home screen application notifies the weather application to provide display information. Based on the foregoing "procedure of creating a card stack", a card, for example, referred to as an initial card, corresponding to the display information is displayed in an interface of the mobile phone, to identify a display location of the card in the card stack in the interface. For example, the initial card is an initial card 1 shown in FIG. 10A. Then, the application 2 sends a notification message to the home screen application. As shown in FIG. 10B, after receiving the notification message sent by the application 2, the home screen application adds a card (for example, which is referred to as a card 2) corresponding to the notification message to the card stack based on the foregoing "procedure of adding a card to the card stack", and displays the card on top. In this case, the stack includes two cards: the initial card and the card 2.

Then, the weather application sends a notification message to the home screen application, and after receiving the notification message sent by the weather application, the home screen application updates displayed content of the initial card based on the foregoing "procedure of updating a card in the card stack", so that the user can view, in real time, weather data provided by the weather application.

In a case, when the user no longer needs the card 2, the user may perform a delete operation on the mobile phone, as shown in FIG. 13A, FIG. 13B, FIG. 13C, FIG. 13D, FIG. 13E, and FIG. 13F. Then, the home screen application receives the delete operation entered by the user, and deletes the card 2 "in the manner 1 of deleting a card from the card stack". Then, the home screen application continues to display remaining cards, for example, the card 1, in the card stack in the interface of the mobile phone. In this way, the user can continue to view the remaining cards in the card stack.

In another case, a card, for example, the card 2, created by the calendar application has a display period. When the calendar application determines that the display period of the card 2 ends, the calendar application sends deletion information for deleting the card 2 to the home screen application. After receiving the deletion information for deleting the card 2, the home screen application deletes the card 2 "in the manner 2 of deleting a card from the card stack". Then, the home screen application continues to display remaining cards, for example, the card 1, in the card stack in the interface of the mobile phone. In this way, the user can continue to view the remaining cards in the card stack.

After the foregoing operation is performed, as shown in FIG. 15A, FIG. 15B, and FIG. 15C, if the user no longer needs the card stack, the user may perform, in the interface of the mobile phone, a delete operation of deleting a last remaining card in the card stack. The home screen application receives the delete operation entered by the user, and deletes the last remaining card in the card stack "in the manner 1 of deleting a card from the card stack". Then, the home screen application does not continue to display the card stack in the interface of the mobile phone.

In the card display method provided in this application, after receiving the notification message sent by the application 2, the home screen application performs template processing on the notification message by using the view preprocessing module, to obtain the template-processed card. Then, the view preprocessing module sends the template-processed card to the data management module. The data management module updates the sequence list based on the currently received card. The data management module controls, based on the updated sequence list, the card display module to display each card in the card stack, so that the user can view, on the home screen of the mobile phone, the card of the notification message sent by the application 2, and does not need to view the notification message from the application 2 in the notification bar of the mobile phone. This resolves a problem, in a related technology, that each time the user views a notification message on the mobile phone, the user needs to unlock the mobile phone on the mobile phone, and view the notification message in the notification bar.

In an example, FIG. 3 is a schematic diagram of composition of an electronic device 10 according to this application. As shown in FIG. 3, the electronic device 10 may include a view preprocessing module, a data management module, and a card display module.

The home screen widget receives an operation performed by a user on the control configured to create a card stack. The home screen widget sends indication information to the first application. The indication information is used to indicate the first application to provide display information. The view preprocessing module is configured to receive the display information sent by the first application. The view preprocessing module is further configured to generate a first card corresponding to the display information. The data management module creates a sequence list based on the first card generated by the view preprocessing module. The sequence list includes the first card and information used to indicate a display ranking of the first card. The data management module is configured to create a card stack corresponding to the sequence list. The card display module is configured to display the first card generated by the view preprocessing module. The view preprocessing module is configured to receive a notification message from the second application. The view preprocessing module is configured to generate a second card of the notification message. The data management module is configured to update the sequence list based on the generated second card. The sequence list further includes at least one second card and information used to indicate a display sequence of the at least one second card. The card display module is configured to display a card stack on a home screen of the electronic device. The card stack includes the first card and the at least one second card that are sequentially stacked based on the sequence list.

In a possible implementation, the sequence list further includes a card identifier used to indicate the first card or the second card, and when the view preprocessing module is further configured to generate the first card again, and the sequence list does not include the card identifier of the first card, the first card, the card identifier corresponding to the first card, and the information used to indicate the display ranking of the first card are added to the sequence list; or when the view preprocessing module is further configured to generate the first card again, and the sequence list includes the card identifier of the first card, and when the sequence list includes the card identifier of the first card, an existing card corresponding to the card identifier is replaced with the first card.

In a possible implementation, the data management module is further configured to receive information that is from the first application and that is used to indicate to delete a target card; and the data management module is further configured to delete the target card and information used to indicate a display ranking of the target card from the sequence list based on the information used to indicate to delete the target card; and that the card display module is further configured to display a card stack on a home screen of the electronic device, where the card stack includes the first card and the at least one second card that are sequentially stacked based on the sequence list includes: The home screen application displays a card stack on the home screen of the electronic device, where the card stack includes the first card and the at least one second card that are sequentially stacked based on a sequence list obtained after the target card is deleted.

In a possible implementation, the card display module is further configured to receive an operation used to indicate to delete a target card; the card display module is further configured to: delete the target card in response to the operation, and continue to display each card in the sequence list based on the sequence list; and the data management module is further configured to delete the target card and information used to indicate a display ranking of the target card from the sequence list; and that the card display module is further configured to display a card stack on a home screen of the electronic device, where the card stack includes the first card and the at least one second card that are sequentially stacked based on the sequence list includes: The home screen application displays a card stack on the home screen of the electronic device, where the card stack includes the first card and the at least one second card that are sequentially stacked based on a sequence list obtained after the target card is deleted.

In a possible implementation, the first application is a weather application, and the second application is a calendar application.

In another example, FIG. 3 is a schematic diagram of composition of an electronic device 10 according to this application. As shown in FIG. 3, the electronic device 10 may include a view preprocessing module, a data management module, and a card display module.

The view preprocessing module is configured to receive a notification message sent by a first application. The view preprocessing module is configured to: generate a first card corresponding to the notification message, and send the first card to the data management module. When an operation of unlocking the electronic device is received, the data management module is configured to control the card display module to display the first card on a home screen of the electronic device.

In a possible implementation, the electronic device further includes a second application; before the view preprocessing module receives the notification message sent by the first application, the view preprocessing module is further configured to receive display information sent by the second application; the view preprocessing module is further configured to: generate a second card corresponding to the notification message, and send the second card to the data management module; the data management module is further configured to create a sequence list based on the second card, where the sequence list includes at least one second card and information used to indicate a display sequence of the at least one second card; the data management module is further configured to create a card stack corresponding to the sequence list; the data management module is further configured to control the card display module to display the second card; and the data management module is further configured to update the sequence list when receiving again the first card sent by the view preprocessing module, where the sequence list further includes the first card and information used to indicate a display ranking of the first card; and when the operation of unlocking the electronic device is received, the data management module is further configured to control the card display module to sequentially stack and display the first card and the at least one second card on the home screen of the electronic device based on a sequence list corresponding to the card stack.

In a possible implementation, the home screen application further includes a home screen widget, the home screen widget includes a control configured to create a card stack, and before the view preprocessing module receives the display information sent by the first application, the home screen widget receives an operation performed by a user on the control configured to create a card stack; and the home screen widget sends indication information to the second application, where the indication information is used to indicate the second application to provide the display information.

In a possible implementation, the sequence list further includes a card identifier used to indicate the first card or the second card; and when the sequence list does not include the card identifier of the first card sent by the view preprocessing module, the data management module is further configured to add the first card, the card identifier corresponding to the first card, and the information used to indicate the display ranking of the first card to the sequence list; or when the sequence list includes the card identifier of the first card sent by the view preprocessing module, the data management module is further configured to replace an existing card corresponding to the card identifier with the first card.

In a possible implementation, the data management module is further configured to receive information that is from the first application and that is used to indicate to delete a target card; the data management module is further configured to delete the target card and information used to indicate a display ranking of the target card from the sequence list based on the information used to indicate to delete the target card; and the data management module is further configured to control the card display module to display, based on the sequence list obtained after the target card is deleted, each card in a sequence list obtained after the target card is deleted.

In a possible implementation, the card display module receives an operation used to indicate to delete a target card; the card display module is further configured to: delete the target card in response to the operation, and continue to display each card in the sequence list based on the sequence list; the data management module is further configured to delete the target card and information used to indicate a display ranking of the target card from the sequence list based on information that is used to delete the target card and that is sent by the card display module; and the data management module is further configured to control the card display module to display, based on the sequence list obtained after the target card is deleted, each card in a sequence list obtained after the target card is deleted.

In still another example, FIG. 3 is a schematic diagram of composition of an electronic device 10 according to this application. As shown in FIG. 3, the electronic device 10 may include a view preprocessing module, a data management module, and a card display module.

The view preprocessing module is configured to receive a notification message from the first application. The view preprocessing module is further configured to generate a first card of the notification message. The data management module is configured to update a sequence list based on the first card generated by the view preprocessing module. The sequence list includes the first card, at least one second card generated before the notification message is received, information used to indicate a display ranking of the first card, and information used to indicate a display sequence of the at least one second card. The card display module displays, on a home screen of the electronic device, a card stack generated by the data management module. The card stack includes the first card and the at least one second card that are sequentially stacked based on the sequence list. The card display module is further configured to receive a switching operation performed by a user on the card stack. The card display module is further configured to update a stacking sequence of the first card and the at least one second card in the card stack based on the sequence list in response to the switching operation.

In a possible implementation, the card display module is further configured to display the first card on top of the card stack before receiving the switching operation; and the card display module is further configured to: after receiving the switching operation, display, on top of the card stack, a next card located after the first card in the sequence list.

In a possible implementation, the electronic device further includes a second application, and the view preprocessing module is further configured to receive display information sent by the second application; the view preprocessing module is further configured to generate a second card corresponding to the notification message; the data management module is further configured to create a sequence list based on the second card generated by the view preprocessing module, where the sequence list includes the second card and information used to indicate a display ranking of the second card; the data management module is further configured to create a card stack corresponding to the sequence list; and the card display module displays the second view preprocessing module.

In a possible implementation, a home screen widget sends indication information to the second application, where the indication information is used to indicate the second application to provide the display information.

In a possible implementation, the sequence list further includes a card identifier used to indicate the first card or the second card; and the data management module is specifically configured to: when the sequence list does not include the card identifier of the first card, add the first card, the card identifier corresponding to the first card, and the information used to indicate the display ranking of the first card to the sequence list; or the data management module is specifically configured to: when the sequence list includes the card identifier of the first card, replace an existing card corresponding to the card identifier with the first card.

In a possible implementation, the data management module is further configured to receive information that is from the first application and that is used to indicate to delete a target card; and the data management module is further configured to delete the target card and information used to indicate a display ranking of the target card from the sequence list based on the information used to indicate to delete the target card; and the card display module displays a card stack on the home screen of the electronic device, where the card stack includes the first card and the at least one second card that are sequentially stacked based on a sequence list obtained after the target card is deleted.

In a possible implementation, the card display module is further used by the home screen application in the electronic device to receive an operation used to indicate to delete a target card; the card display module is further configured to: delete the target card in response to the operation, and continue to display each card in the sequence list based on the sequence list; and the data management module deletes the target card and information used to indicate a display ranking of the target card from the sequence list; and the card display module displays, on the home screen of the electronic device, a card stack generated by the data management module, where the card stack includes the first card and the at least one second card that are sequentially stacked based on a sequence list obtained after the target card is deleted.

Certainly, the electronic device 10 provided in this application includes but is not limited to the foregoing modules. For example, the electronic device 10 may further include a storage module. The storage module may be configured to store program code of the electronic device 10, and may be further configured to store data, for example, data in a write request, generated in a running process of the electronic device 10.

This application further provides an electronic device, and the electronic device may include a display, a memory, and one or more processors. The memory is configured to store computer program code, and the computer program code includes computer instructions. When the processor executes the computer instructions, the electronic device can perform the functions or steps performed by the mobile phone in the foregoing method embodiments. Certainly, the electronic device includes but is not limited to the foregoing display, memory, and one or more processors. For example, for a structure of the electronic device, refer to the structure of the electronic device 10 shown in FIG. 2.

Figure 17:
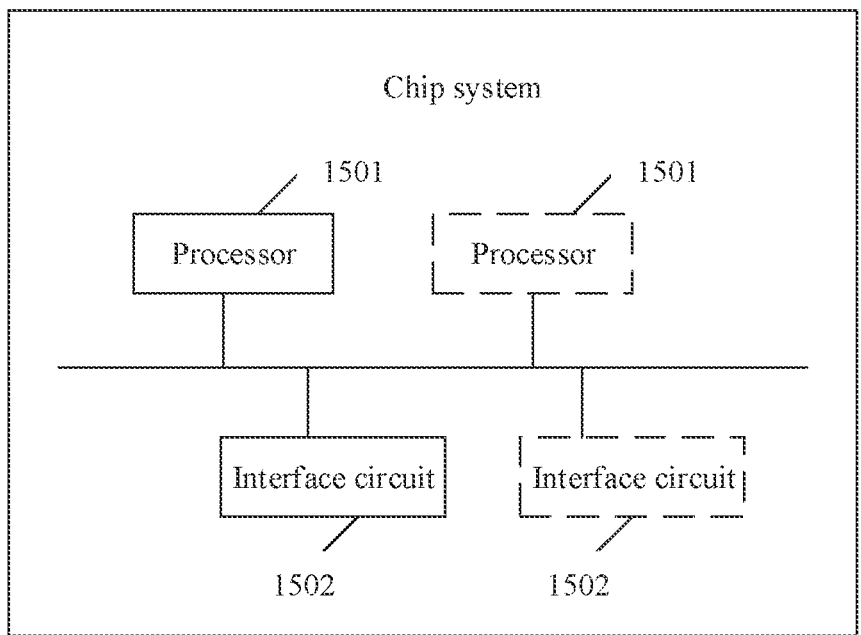
FIG. 17 is a schematic diagram of a chip system according to this application.

This application further provides a chip system, and the chip system may be applied to the electronic device in the foregoing example. As shown in FIG. 17, the chip system includes at least one processor 1501 and at least one interface circuit 1502. The processor 1501 may be the processor of the foregoing electronic device. The processor 1501 and the interface circuit 1502 may be connected to each other through a line. The processor 1501 may receive computer instructions from a memory of the electronic device through the interface circuit 1502, and execute the computer instructions. When the computer instructions are executed by the processor 1501, the electronic device may be enabled to perform the steps performed by the mobile phone in the foregoing example. Certainly, the chip system may further include another discrete component. This is not specifically limited in this embodiment of this application.

An embodiment of this application further provides a computer-readable storage medium, configured to store computer instructions to be run on the electronic device (for example, a mobile phone).

An embodiment of this application further provides a computer program product, including computer instructions to be run on the electronic device (for example, a mobile phone).

It may be clearly learned by a person skilled in the art from the foregoing descriptions of the implementations that for convenience and brevity of description, only division into the foregoing functional modules is used as an example for description. In actual application, the foregoing functions may be allocated to different functional modules for implementation according to a requirement, that is, an internal structure of an apparatus is divided into different functional modules, to complete all or some of the functions described above.

In the several embodiments provided in this application, it should be understood that the disclosed apparatus and method may be implemented in other manners. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may be one or more physical units, may be located in one place, or may be distributed in a plurality of different places. Some or all of the units may be selected according to an actual requirement to achieve the objectives of the solutions in the embodiments.

In addition, functional units in embodiments of this application may be integrated into one processing unit, or each unit may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, the part contributing to the conventional technology, or all or some of the technical solutions may be implemented in a form of a software product. The software product is stored in a storage medium and includes several instructions for enabling a device (which may be a single-chip microcomputer, a chip, or the like) or a processor to perform all or some of the steps of the methods described in the embodiments of this application. The storage medium includes various media that can store program code, for example, a USB flash drive, a removable hard disk, a read-only memory (ROM), a random access memory (RAM), a magnetic disk, or an optical disc.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A notification message display method, applied to an electronic device, wherein the electronic device comprises a home screen application, a first application, and a second application, wherein the home screen application comprises a home screen widget, wherein the home screen widget comprises a control configured to create a card stack, and wherein the method comprises:

receiving, by the home screen widget, an operation performed by a user on the control configured to create the card stack;

sending, by the home screen widget, indication information to the first application, wherein the indication information is used to indicate the first application to provide display information;

receiving, by the home screen application, the display information from the first application;

generating, by the home screen application, a first card corresponding to the display information;

creating, by the home screen application, a sequence list based on the first card, wherein the sequence list comprises the first card and information used to indicate a display ranking of the first card;

creating, by the home screen application, a card stack corresponding to the sequence list;

displaying, by the home screen application, the first card;

receiving, by the home screen application, a notification message from the second application;

in response to receiving the notification message, generating, by the home screen application in the electronic device, a second card of the notification message;

updating, by the home screen application in the electronic device, the sequence list based on the second card, wherein the updated sequence list further comprises the second card and information used to indicate a display sequence of the second card; and displaying, by the home screen application, a card stack on a home screen of the electronic device, wherein the card stack comprises the first card and the second card that are sequentially stacked based on the sequence list.

2. The method according to claim 1, wherein the sequence list further comprises a card identifier used to indicate the first card or the second card, and the method further comprises:

when the home screen application generates the first card again, and the sequence list does not comprise the card identifier of the first card, adding the first card, the card identifier corresponding to the first card, and the information used to indicate the display ranking of the first card to the sequence list; or when the home screen application generates the first card again, and the sequence list comprises the card identifier of the first card, and when the sequence list comprises the card identifier of the first card, replacing an existing card corresponding to the card identifier with the first card.

3. The method according to claim 1, wherein the method further comprises:

receiving, by the home screen application, information that is from the first application and that is used to indicate to delete a target card; and deleting, by the home screen application, the target card and the information used to indicate a display ranking of the target card from the sequence list based on the information used to indicate to delete the target card;

wherein the displaying, by the home screen application, the card stack on the home screen of the electronic device comprises:

displaying, by the home screen application, the card stack on the home screen of the electronic device, wherein the card stack comprises the first card and the second card that are sequentially stacked based on a sequence list obtained after the target card is deleted.

4. The method according to claim 1, wherein the method further comprises:

receiving, by the home screen application, an operation used to indicate to delete a target card;

deleting, by the home screen application, the target card in response to the operation, and continuing to display each card in the sequence list based on the sequence list; and deleting, by the home screen application, the target card and the information used to indicate a display ranking of the target card from the sequence list;

wherein the displaying, by the home screen application, the card stack on the home screen of the electronic device comprises:

displaying, by the home screen application, the card stack on the home screen of the electronic device, wherein the card stack comprises the first card and the second card that are sequentially stacked based on a sequence list obtained after the target card is deleted.

5. The method according to claim 1, wherein the first application is a weather application, and the second application is a calendar application.

6. A notification message display method, applied to an electronic device, wherein the electronic device comprises a home screen application and a first application, wherein the home screen application comprises software instructions executable by a processor configured to implement a set of modules including a view preprocessing module, a data management module, and a card display module, and wherein the method comprises:

receiving, by the view preprocessing module, display information from the second application;

generating, by the view preprocessing module, an initial card corresponding to the display message, and sending the initial card to the data management module;

creating, by the data management module, a sequence list based on the initial card, wherein the sequence list comprises the initial card and information used to indicate a display ranking of the initial card;

creating, by the data management module, a card stack corresponding to the sequence list;

receiving, by the view preprocessing module, a notification message from the first application;

in response to receiving the notification message, generating, by the view preprocessing module, a first card corresponding to the notification message, and sending the first card to the data management module; and controlling, by the data management module when an operation of unlocking the electronic device is received, the card display module to display the first card in a card stack on a home screen of the electronic device, wherein the card stack comprises the first card and a second card generated before the notification message is received, wherein an application corresponding to the first card is different from an application corresponding to the second card, and the second card comprises the initial card.

7. The method according to claim 6, wherein the electronic device further comprises the second application, and wherein before the receiving, by the view preprocessing module, the notification message from the first application, the method further comprises:

controlling, by the data management module, the card display module to display the initial card; and updating, by the data management module, the sequence list when receiving again the first card from the view preprocessing module, wherein the sequence list further comprises the first card and information used to indicate a display ranking of the first card;

wherein the controlling, by the data management module when the operation of unlocking the electronic device is received, the card display module to display the first card in the card stack on the home screen of the electronic device comprises:

controlling, by the data management module when the operation of unlocking the electronic device is received, the card display module to sequentially stack and display the first card and the second card on the home screen of the electronic device based on a sequence list corresponding to the card stack.

8. The method according to claim 7, wherein the home screen application further comprises a home screen widget, wherein the home screen widget comprises a control configured to create a card stack, and wherein before the receiving, by the view preprocessing module, the display information from the second application, the method further comprises:

receiving, by the home screen widget, an operation performed by a user on the control configured to create a card stack; and sending, by the home screen widget, indication information to the second application, wherein the indication information is used to indicate the second application to provide the display information.

9. The method according to claim 7, wherein the sequence list further comprises a card identifier used to indicate the first card or the second card, and the updating, by the data management module, the sequence list when receiving again the first card from the view preprocessing module comprises:

when the sequence list does not comprise the card identifier of the first card from the view preprocessing module, adding the first card, the card identifier corresponding to the first card, and the information used to indicate the display ranking of the first card to the sequence list; or when the sequence list comprises the card identifier of the first card from the view preprocessing module, replacing an existing card corresponding to the card identifier with the first card.

10. The method according to claim 7, wherein the method further comprises:

receiving, by the data management module, information that is from the first application and that is used to indicate to delete a target card;

deleting, by the data management module, the target card and the information used to indicate a display ranking of the target card from the sequence list based on the information used to indicate to delete the target card; and controlling, by the data management module, the card display module to display, based on the sequence list obtained after the target card is deleted, each card in a sequence list obtained after the target card is deleted.

11. The method according to claim 7, wherein the method further comprises:

receiving, by the card display module, an operation used to indicate to delete a target card;

deleting, by the card display module, the target card in response to the operation, and continuing to display each card in the sequence list based on the sequence list;

deleting, by the data management module, the target card and the information used to indicate a display ranking of the target card from the sequence list based on information that is used to delete the target card and that is from the card display module; and controlling, by the data management module, the card display module to display, based on the sequence list obtained after the target card is deleted, each card in a sequence list obtained after the target card is deleted.

12. A notification message display method, applied to an electronic device, wherein the electronic device comprises a home screen application and a first application, and wherein the method comprises:

receiving, by the home screen application in the electronic device, a notification message from the first application;

in response to receiving the notification message, generating, by the home screen application in the electronic device, a first card of the notification message;

updating, by the home screen application in the electronic device, a sequence list based on the first card, wherein the sequence list comprises the first card, a second card generated before the notification message is received, information used to indicate a display ranking of the first card, and information used to indicate a display sequence of the second card;

displaying, by the home screen application in the electronic device, a card stack on a home screen of the electronic device, wherein the card stack comprises the first card displayed on top based on the sequence list, and the second card sequentially stacked after the first card;

receiving, by the home screen application in the electronic device, a switching operation performed by a user on the card stack; and in response to the switching operation, displaying, by the home screen application in the electronic device on top of the card stack, a next card located after the first card in the sequence list, and sequentially stacking other cards after the next card after the first card.

13. The method according to claim 12, wherein the electronic device further comprises a second application, and wherein before the receiving, by the home screen application in the electronic device, the notification message from the first application, the method further comprises:

receiving, by the home screen application in the electronic device, display information from the second application;

generating, by the home screen application in the electronic device, a second card corresponding to the notification message;

creating, by the home screen application in the electronic device, a sequence list based on the second card, wherein the sequence list comprises the second card and information used to indicate a display ranking of the second card;

creating, by the home screen application in the electronic device, a card stack corresponding to the sequence list; and displaying, by the home screen application in the electronic device, the second card.

14. The method according to claim 13, wherein before the receiving, by the home screen application in the electronic device, the display information from the second application, the method further comprises:

sending, by the home screen application in the electronic device, indication information to the second application, wherein the indication information is used to indicate the second application to provide the display information.

15. The method according to claim 12, wherein the sequence list further comprises a card identifier used to indicate the first card or the second card, and wherein the updating, by the home screen application in the electronic device, the sequence list based on the first card comprises:

when the sequence list does not comprise the card identifier of the first card, adding, by the home screen application in the electronic device, the first card, the card identifier corresponding to the first card, and the information used to indicate the display ranking of the first card to the sequence list; or when the sequence list comprises the card identifier of the first card, replacing, by the home screen application in the electronic device, an existing card corresponding to the card identifier with the first card.

16. The method according to claim 12, wherein the method further comprises:

receiving, by the home screen application in the electronic device, information that is from the first application and that is used to indicate to delete a target card; and deleting, by the home screen application in the electronic device, the target card and the information used to indicate a display ranking of the target card from the sequence list based on the information used to indicate to delete the target card;

wherein the displaying, by the home screen application in the electronic device, the card stack on the home screen of the electronic device comprises:

displaying, by the home screen application in the electronic device, the card stack on the home screen of the electronic device, wherein the card stack comprises the first card and the second card that are sequentially stacked based on a sequence list obtained after the target card is deleted.

17. The method according to claim 12, wherein the method further comprises:

receiving, by the home screen application in the electronic device, an operation used to indicate to delete a target card;

deleting, by the home screen application in the electronic device, the target card in response to the operation, and continuing to display each card in the sequence list based on the sequence list; and deleting, by the home screen application in the electronic device, the target card and the information used to indicate a display ranking of the target card from the sequence list;

wherein the displaying, by the home screen application in the electronic device, the card stack on the home screen of the electronic device comprises:

displaying, by the home screen application in the electronic device, the card stack on the home screen of the electronic device, wherein the card stack comprises the first card and the second card that are sequentially stacked based on a sequence list obtained after the target card is deleted.

18. An electronic device, comprising a processor configured to perform the steps of the method according to claim 1.

19. An electronic device, comprising a processor configured to perform the steps of the method according to claim 6.

20. An electronic device, comprising a processor configured to perform the steps of the method according to claim 12.

* * * * *